(12) United States Patent
Hamaoka et al.

(10) Patent No.: US 11,411,279 B2
(45) Date of Patent: *Aug. 9, 2022

(54) POWER STORAGE MODULE AND METHOD FOR MANUFACTURING POWER STORAGE MODULE

(71) Applicant: KABUSHIKI KAISHA TOYOTA JIDOSHOKKI, Kariya (JP)

(72) Inventors: Satoshi Hamaoka, Kariya (JP); Kojiro Tamaru, Kariya (JP); Hirokazu Kotake, Kariya (JP); Hiroki Maeda, Kariya (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 306 days.

This patent is subject to a terminal disclaimer.

(21) Appl. No.: 16/489,241

(22) PCT Filed: Feb. 22, 2018

(86) PCT No.: PCT/JP2018/006508
§ 371 (c)(1),
(2) Date: Aug. 27, 2019

(87) PCT Pub. No.: WO2018/159456
PCT Pub. Date: Sep. 7, 2018

(65) Prior Publication Data
US 2020/0067044 A1  Feb. 27, 2020

(30) Foreign Application Priority Data

Feb. 28, 2017 (JP) .............................. JP2017-036264
Feb. 28, 2017 (JP) .............................. JP2017-036265
(Continued)

(51) Int. Cl.
*H01M 50/325* (2021.01)
*H01M 10/04* (2006.01)
(Continued)

(52) U.S. Cl.
CPC ...... *H01M 50/325* (2021.01); *H01M 10/0418* (2013.01); *H01M 50/183* (2021.01); *H01G 11/78* (2013.01); *H01M 2220/20* (2013.01)

(58) Field of Classification Search
CPC ........... H01M 10/0418; H01M 50/183; H01M 50/325
See application file for complete search history.

(56) References Cited

U.S. PATENT DOCUMENTS

2006/0177735 A1* 8/2006 Nilsson ............... H01M 50/183
429/185
2008/0090146 A1* 4/2008 Batson ............... B23K 11/0026
429/200
(Continued)

FOREIGN PATENT DOCUMENTS

EP       1568089 A1    8/2005
JP     2006-508518 A    3/2006
(Continued)

OTHER PUBLICATIONS

International Search Report for PCT/JP2018/006508 dated Apr. 24, 2018 [PCT/ISA/210].
International Preliminary Report on Patentability issued from the International Bureau in counterpart International Application No. PCT/JP2018/006508, dated Sep. 12, 2019.

*Primary Examiner* — Jonathan G Jelsma
(74) *Attorney, Agent, or Firm* — Sughrue Mion, PLLC

(57) ABSTRACT

A power storage module 12 according to a first aspect includes: a laminated body 30 in which bipolar electrodes 32 including an electrode plate 34, a positive electrode 36, and a negative electrode 38, are laminated; a frame body 50 provided with an opening 50a communicated with a plurality of internal spaces V; and a pressure adjustment valve 60 connected to the opening 50a. The pressure adjustment valve 60 includes a base member 70 connected to the opening 50a and provided with a plurality of communication holes 74 respectively communicated with the plurality of
(Continued)

internal spaces V, a valve body 80 arranged to shut opening ends 76*a* of the plurality of communication holes 74, and a cover member 90 pressing the valve body 80 against the base member 70.

18 Claims, 41 Drawing Sheets

(30) Foreign Application Priority Data

| | | | |
|---|---|---|---|
| Feb. 28, 2017 | (JP) | ............................. | JP2017-036268 |
| Feb. 28, 2017 | (JP) | ............................. | JP2017-036902 |
| Mar. 22, 2017 | (JP) | ............................. | JP2017-055889 |

(51) Int. Cl.
*H01M 50/183* (2021.01)
*H01G 11/78* (2013.01)

(56) References Cited

U.S. PATENT DOCUMENTS

| | | | |
|---|---|---|---|
| 2013/0209850 A1 | 8/2013 | Yokoyama et al. | |
| 2014/0106187 A1* | 4/2014 | Miura | H01M 50/308 |
| | | | 429/53 |
| 2014/0349147 A1* | 11/2014 | Shaffer, II | H01M 10/0468 |
| | | | 429/56 |

FOREIGN PATENT DOCUMENTS

| | | |
|---|---|---|
| JP | 2010-277907 A | 12/2010 |
| JP | 2010-287451 A | 12/2010 |
| JP | 2014-010983 A | 1/2014 |
| JP | 5968211 B2 | 8/2016 |
| WO | 2004/051767 A1 | 6/2004 |

\* cited by examiner

Fig.7
(A)
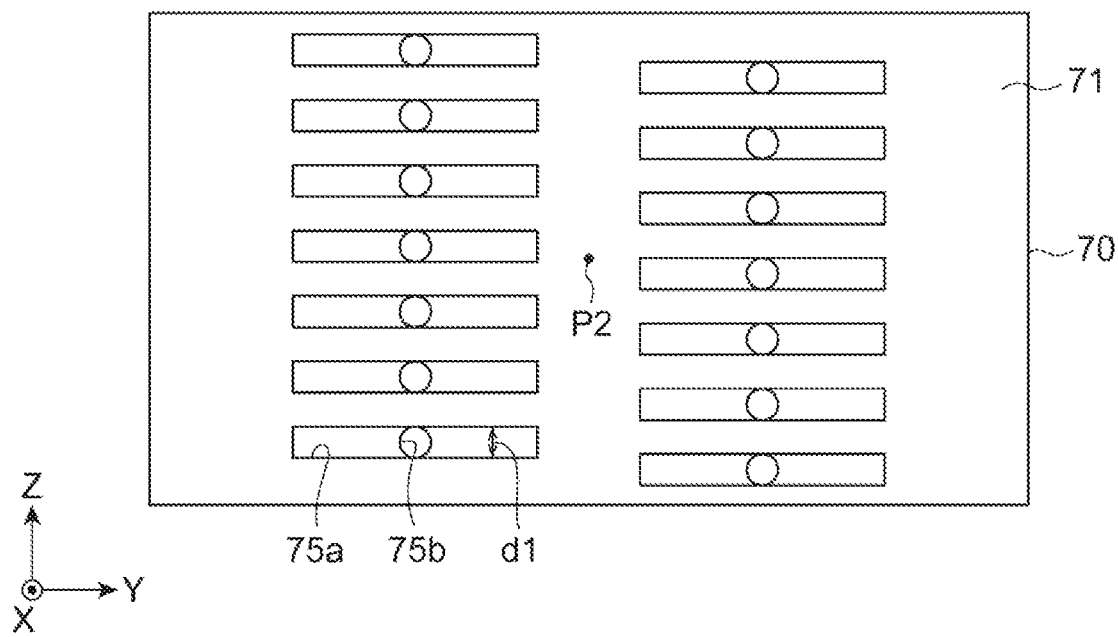
(B)
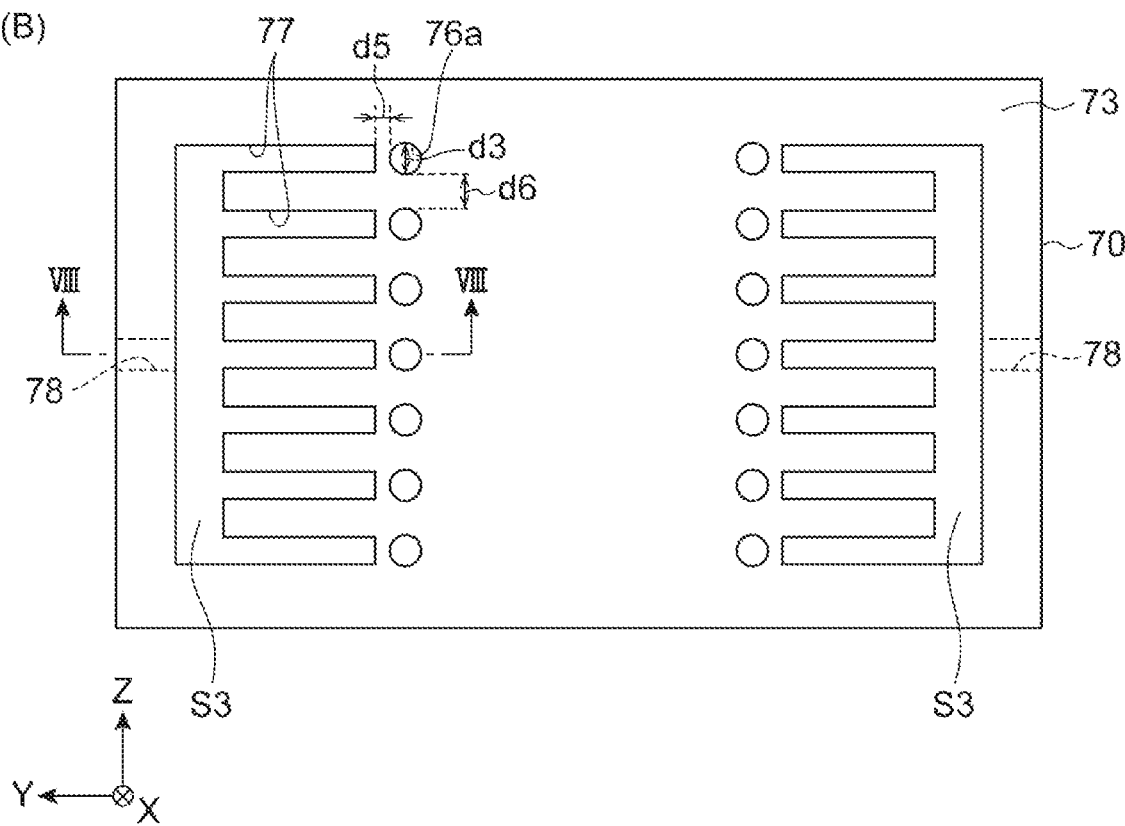

Fig.8
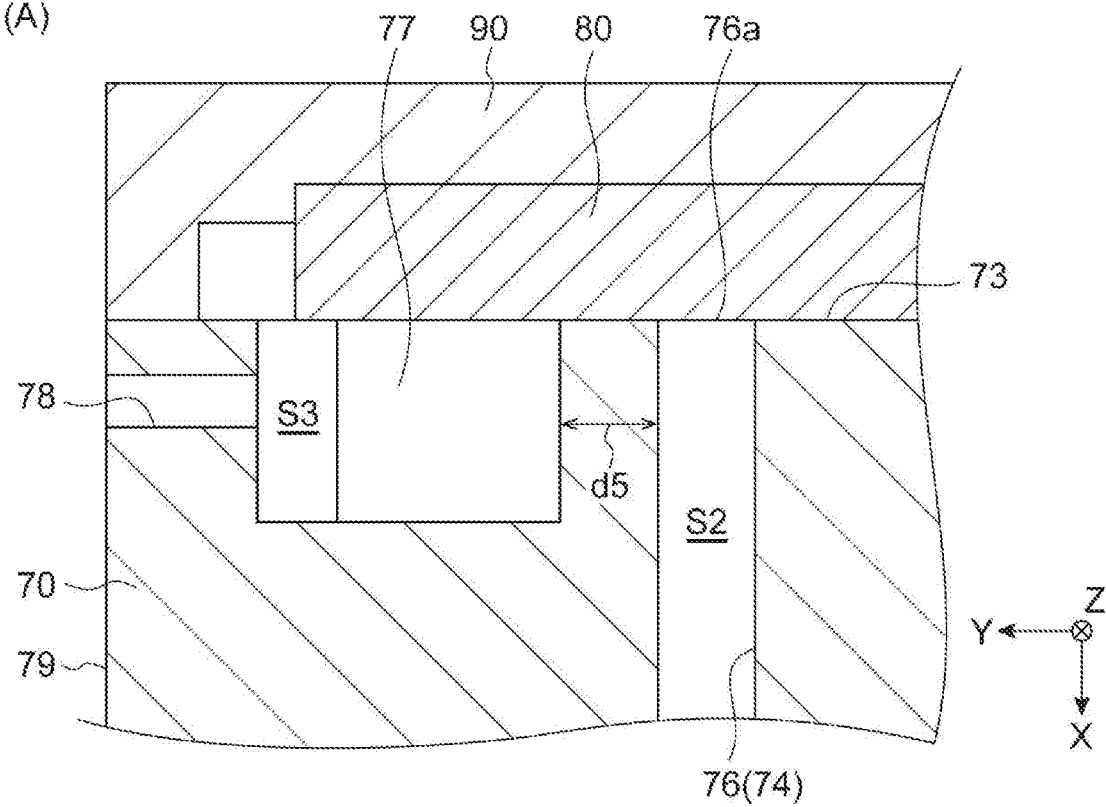
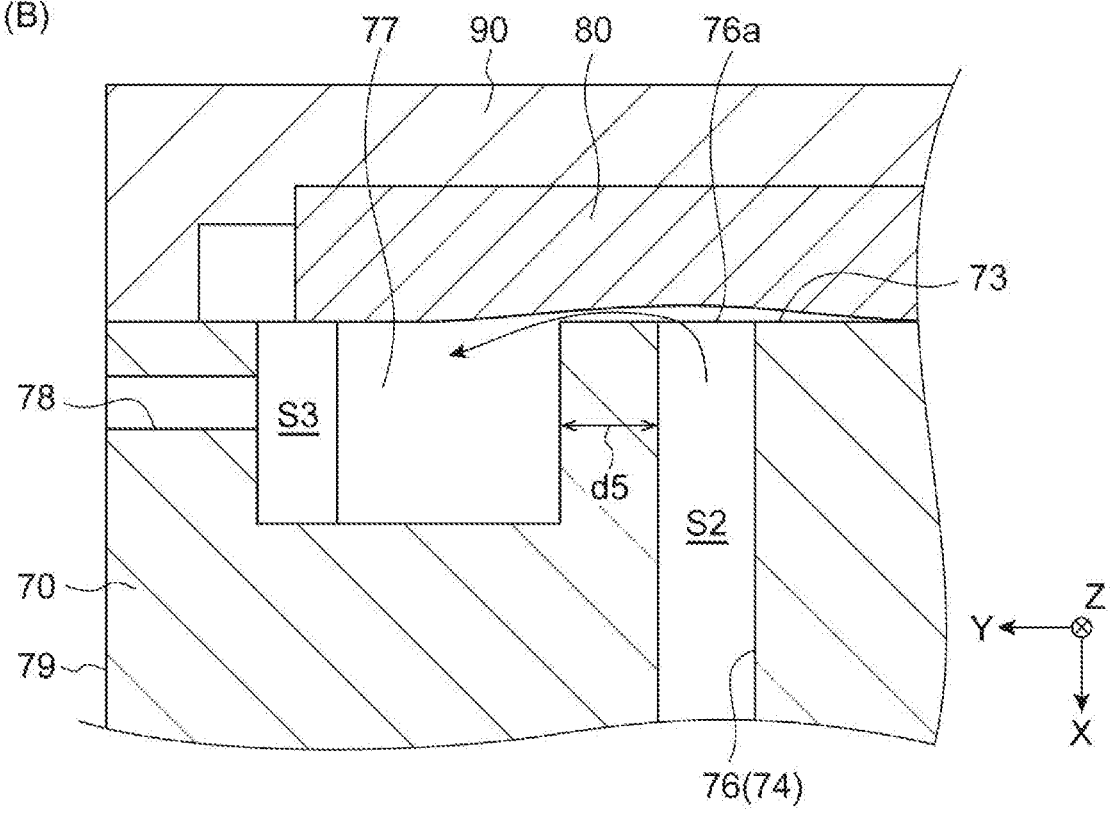

Fig.12
(A)
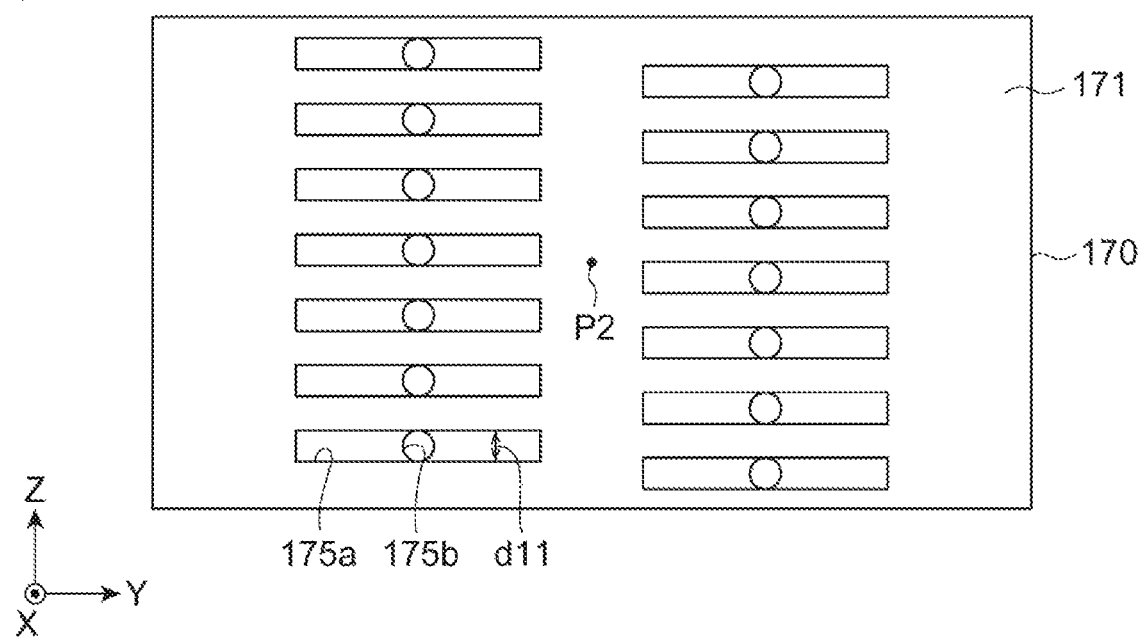
(B)
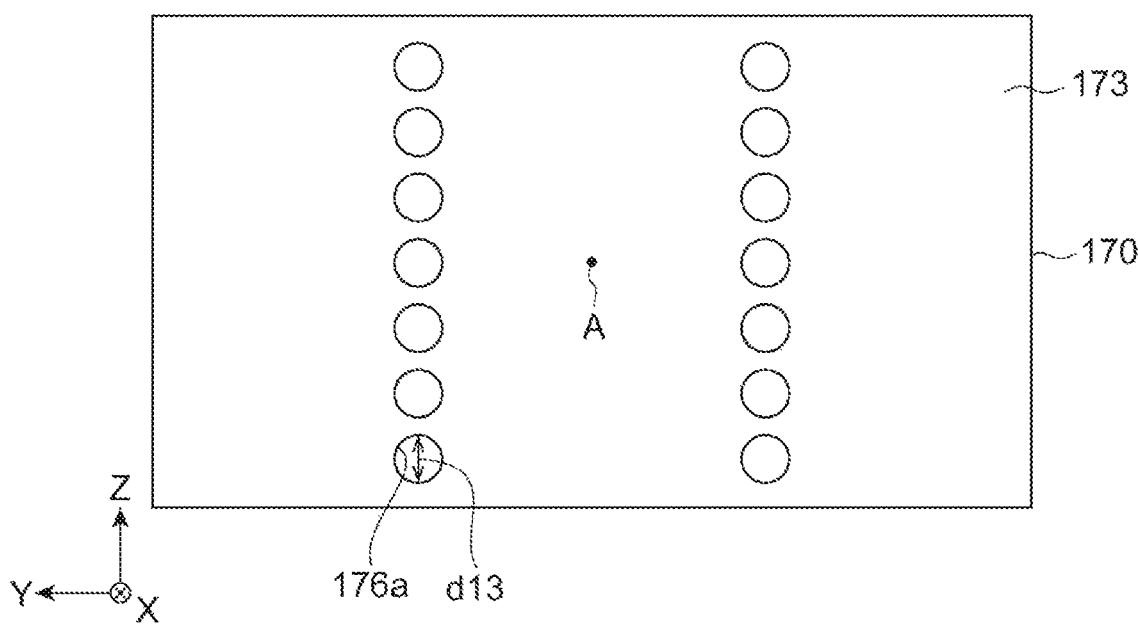

*Fig.13*
(A)
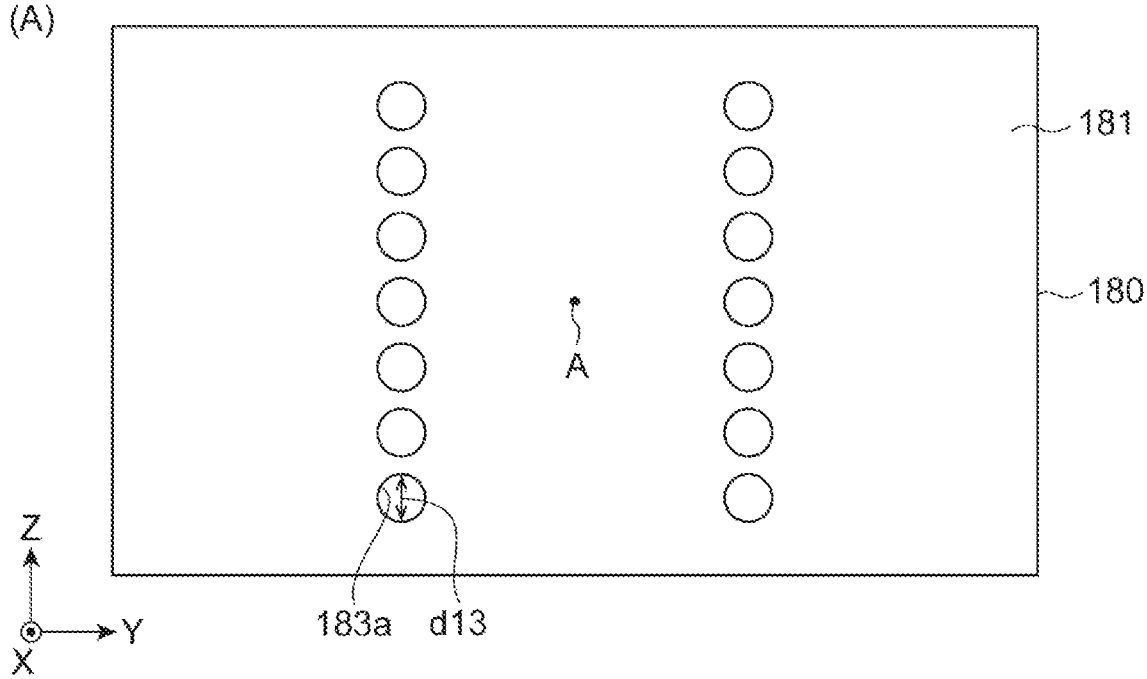
(B)
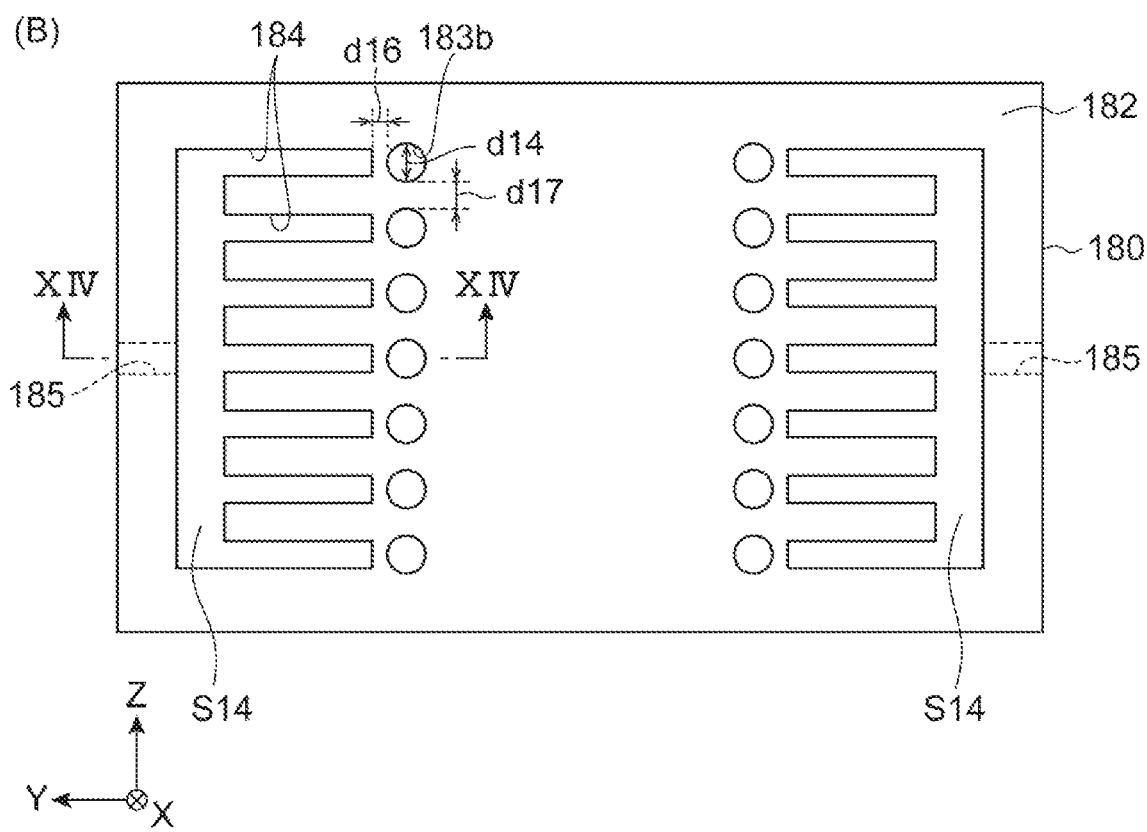

Fig.14
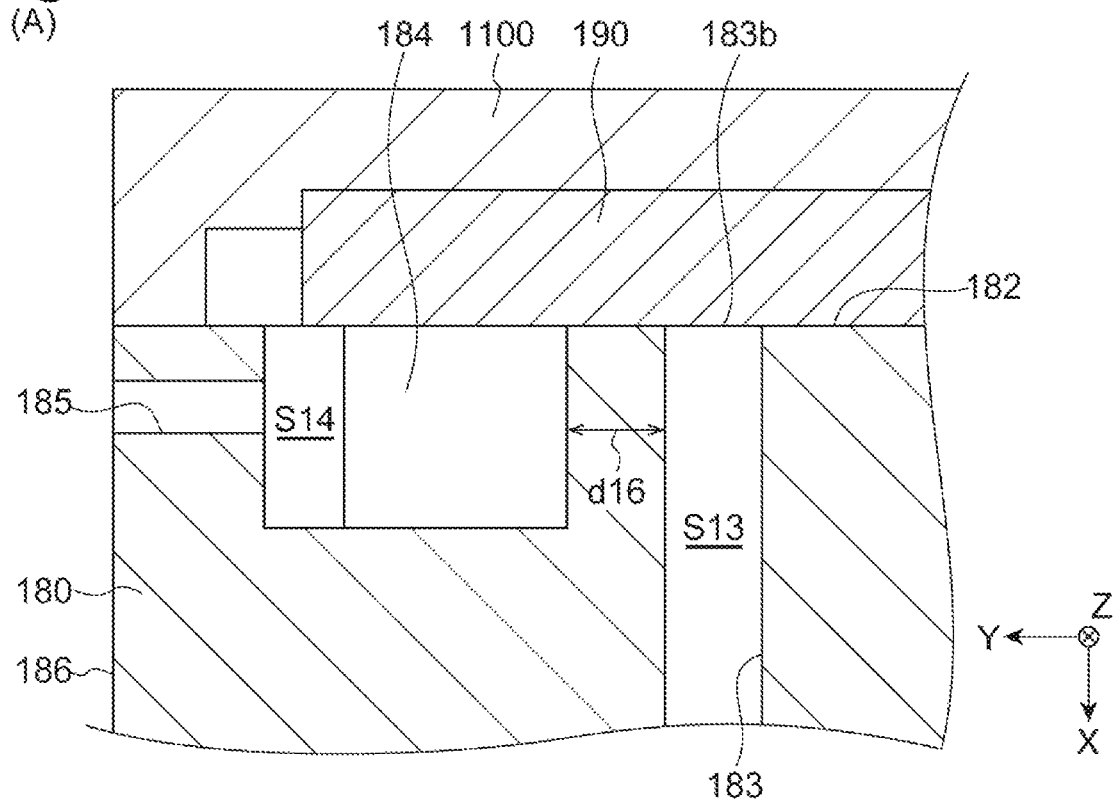
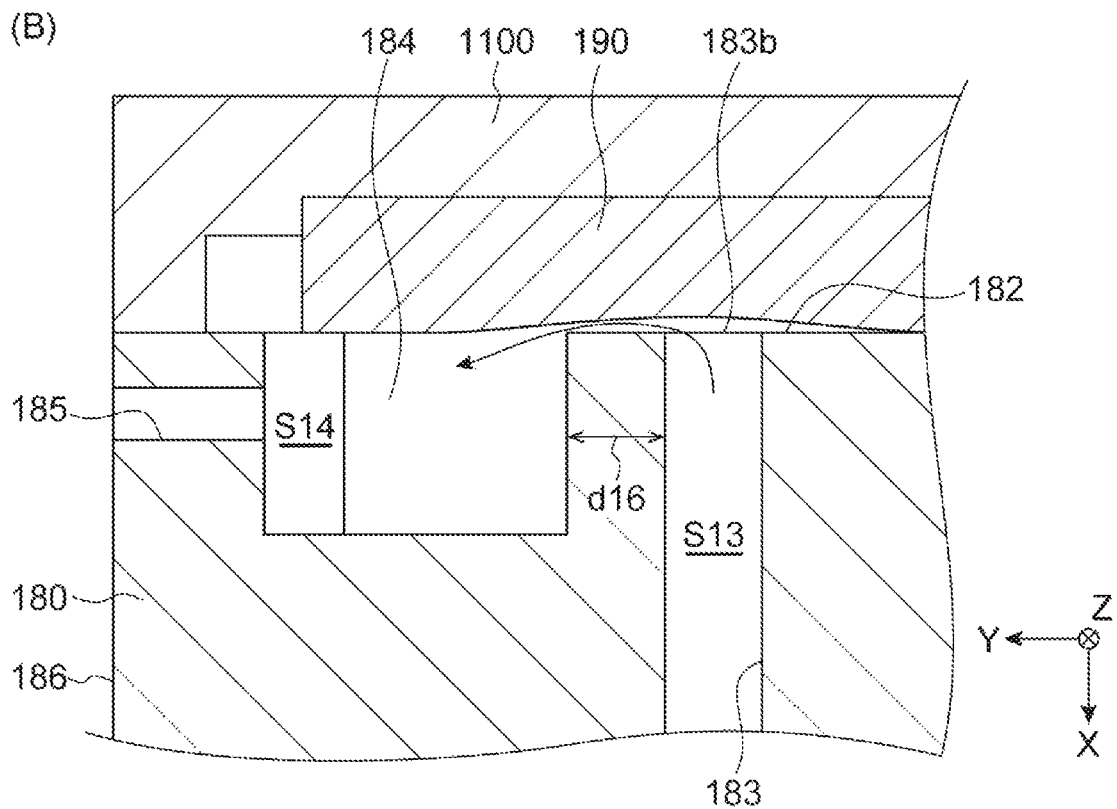

Fig.15
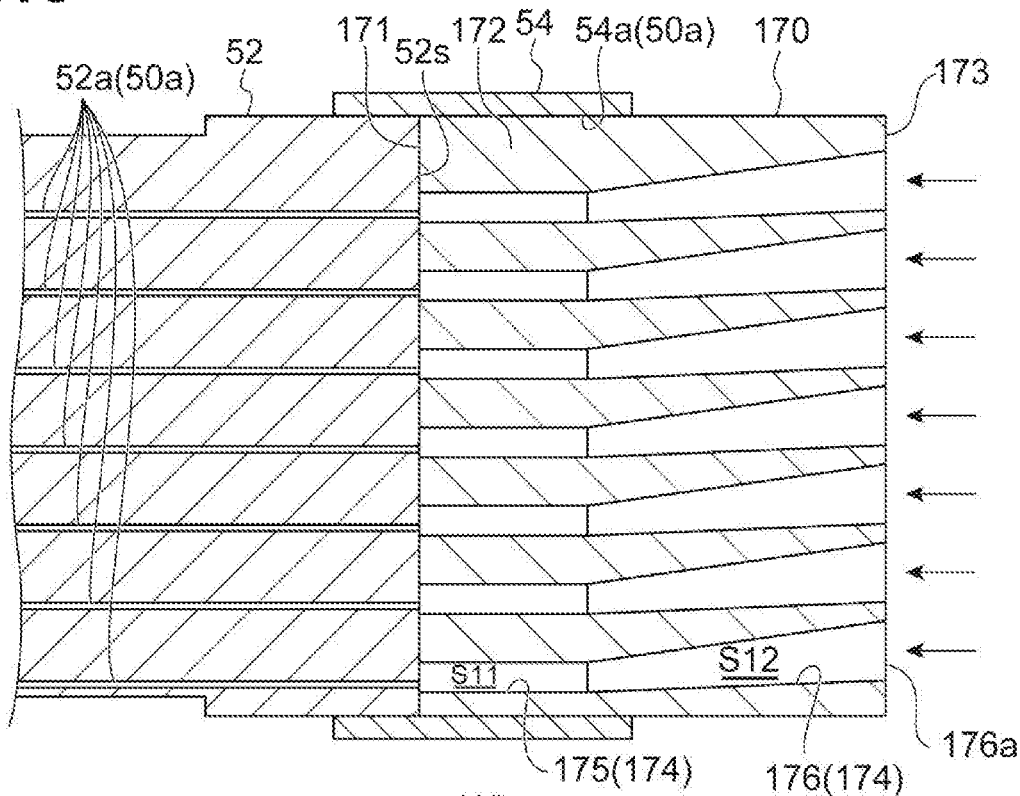
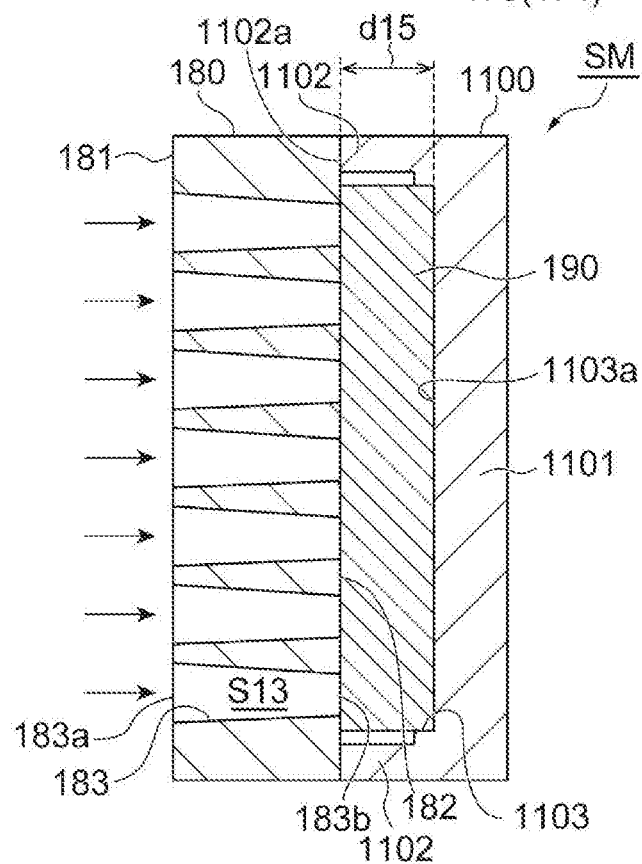

Fig. 20
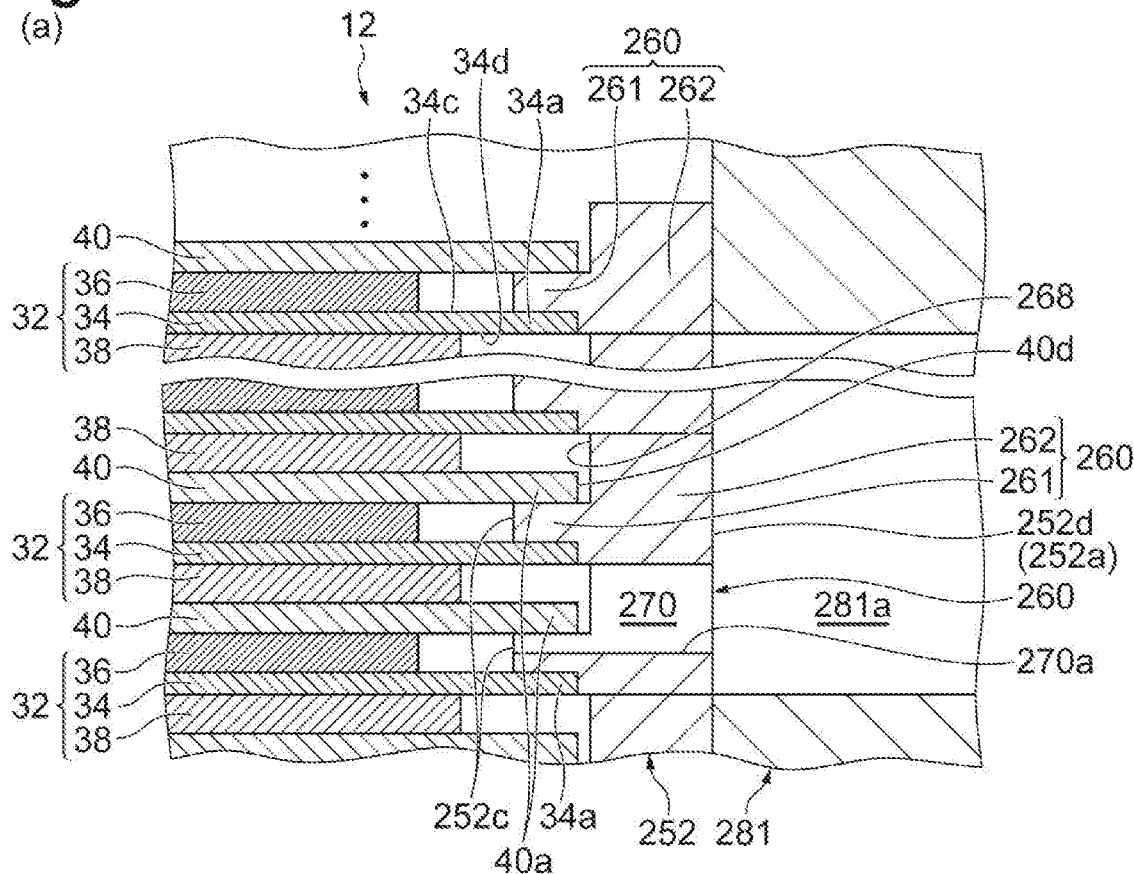
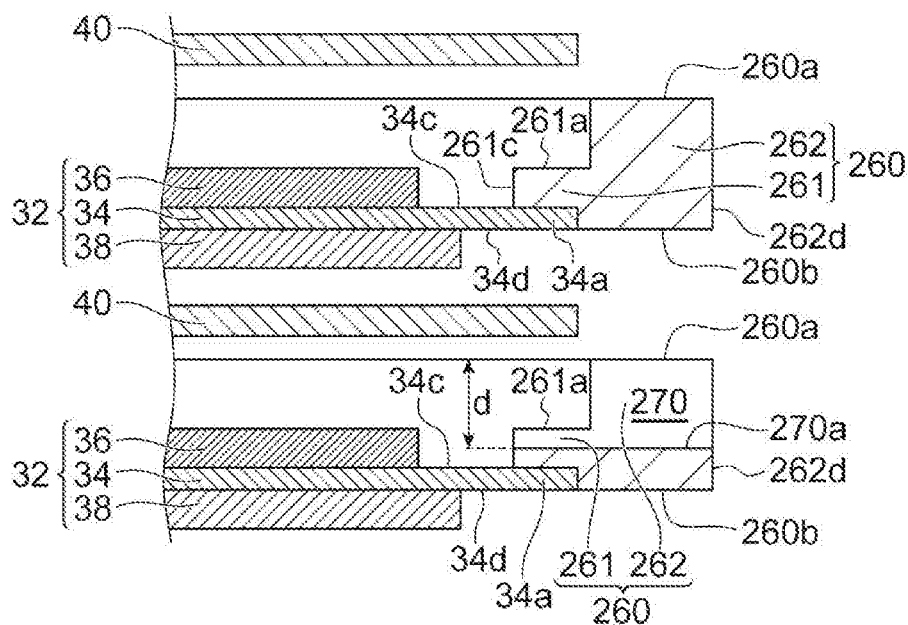

*Fig.21*
(a)
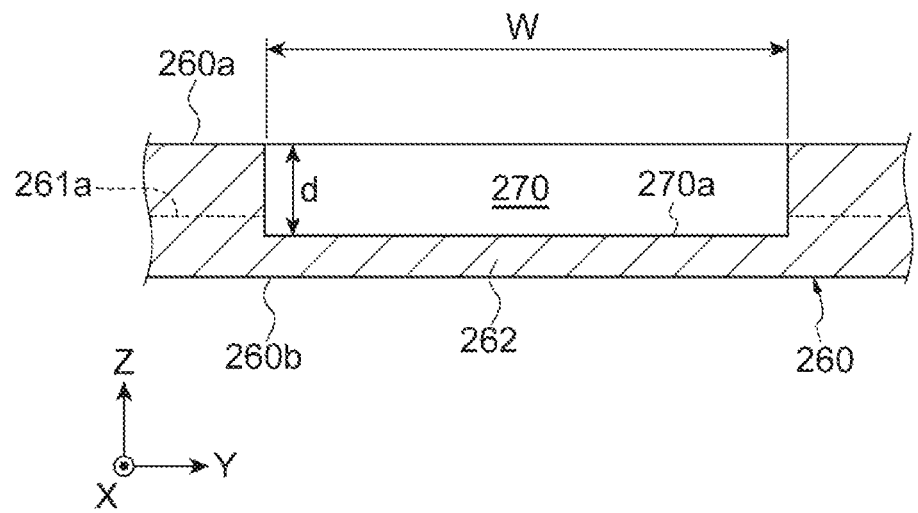
(b)
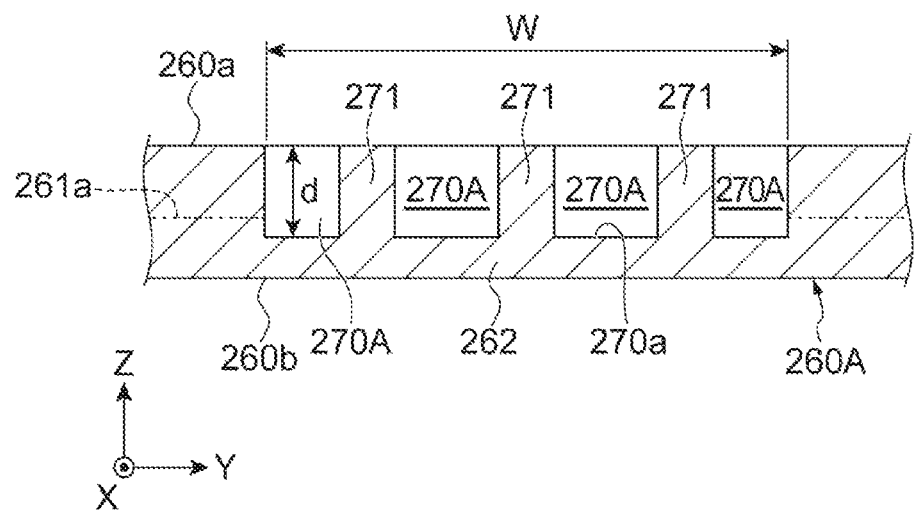

Fig.28
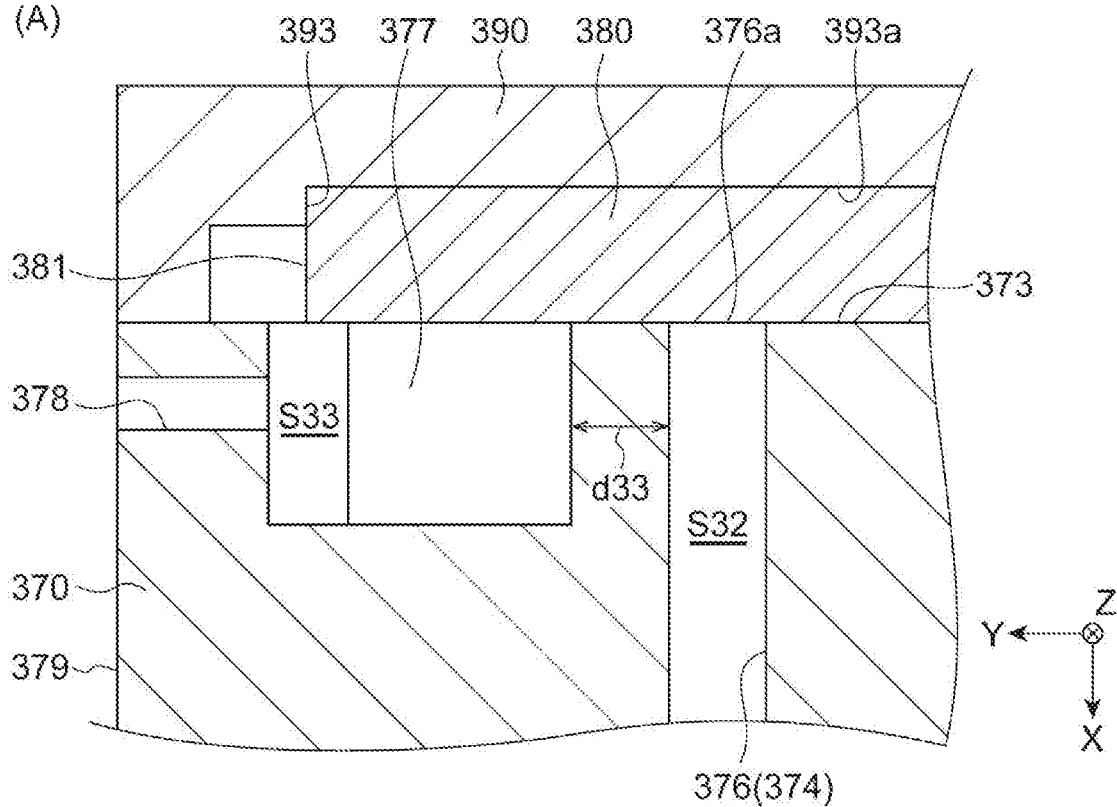
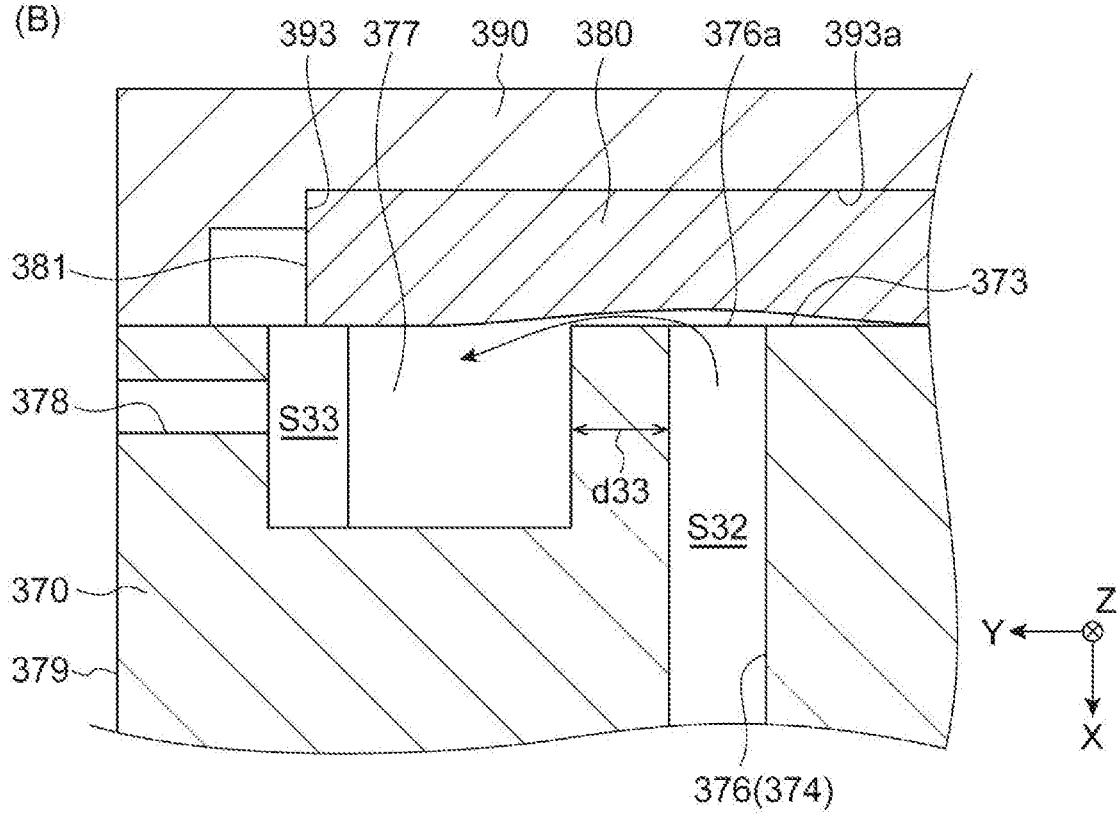

Fig.33
(A)
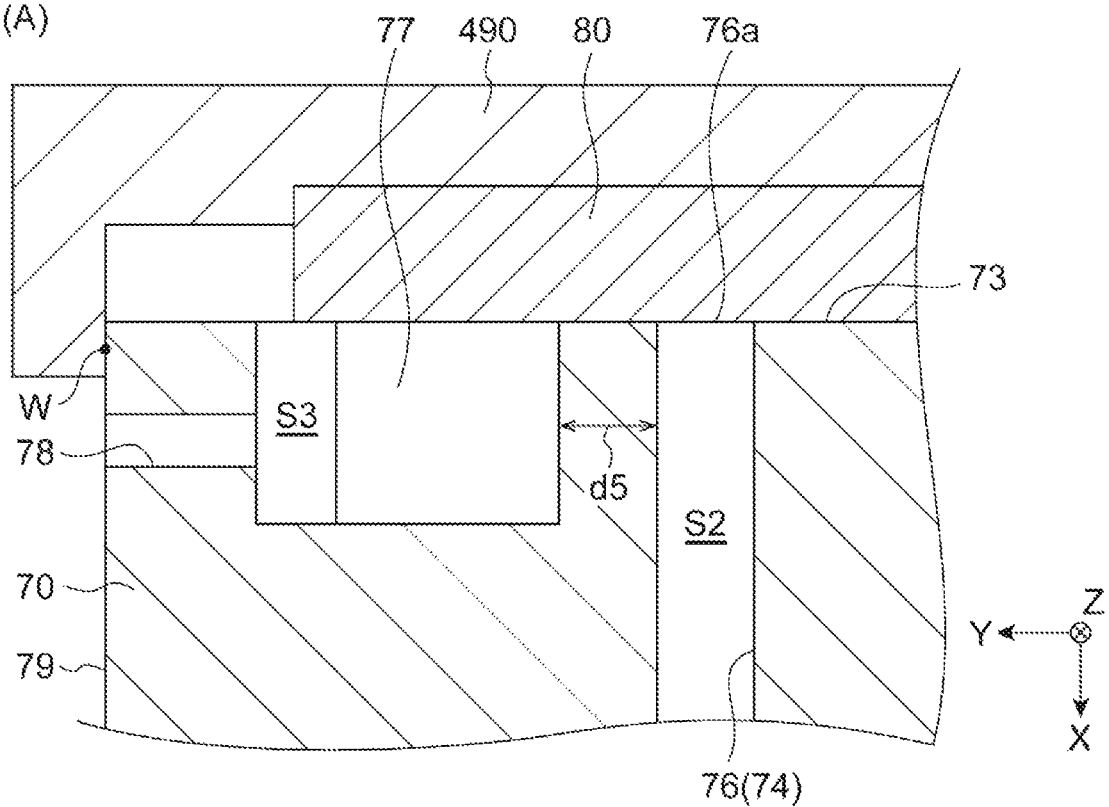
(B)
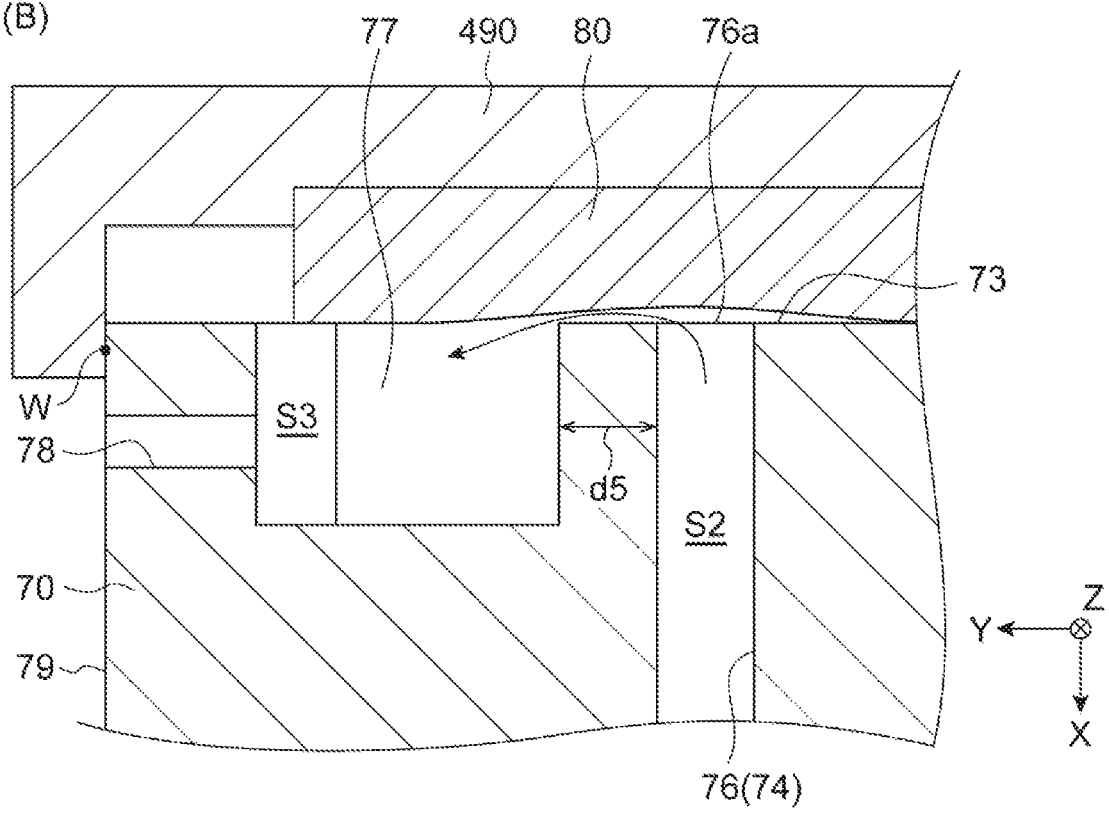

Fig.38
(A)
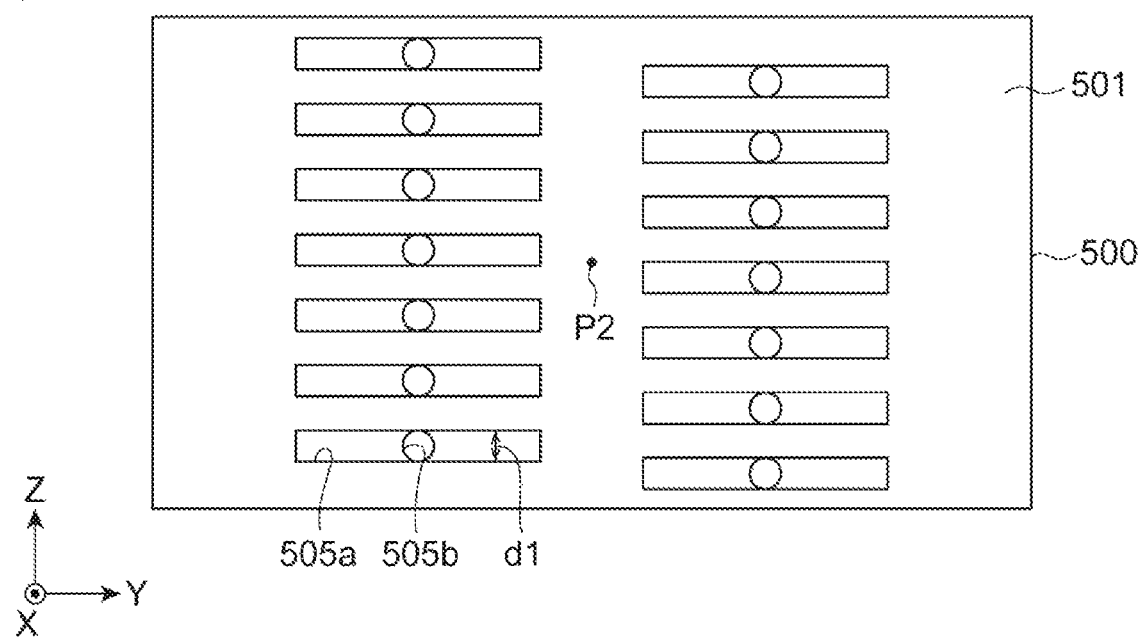
(B)
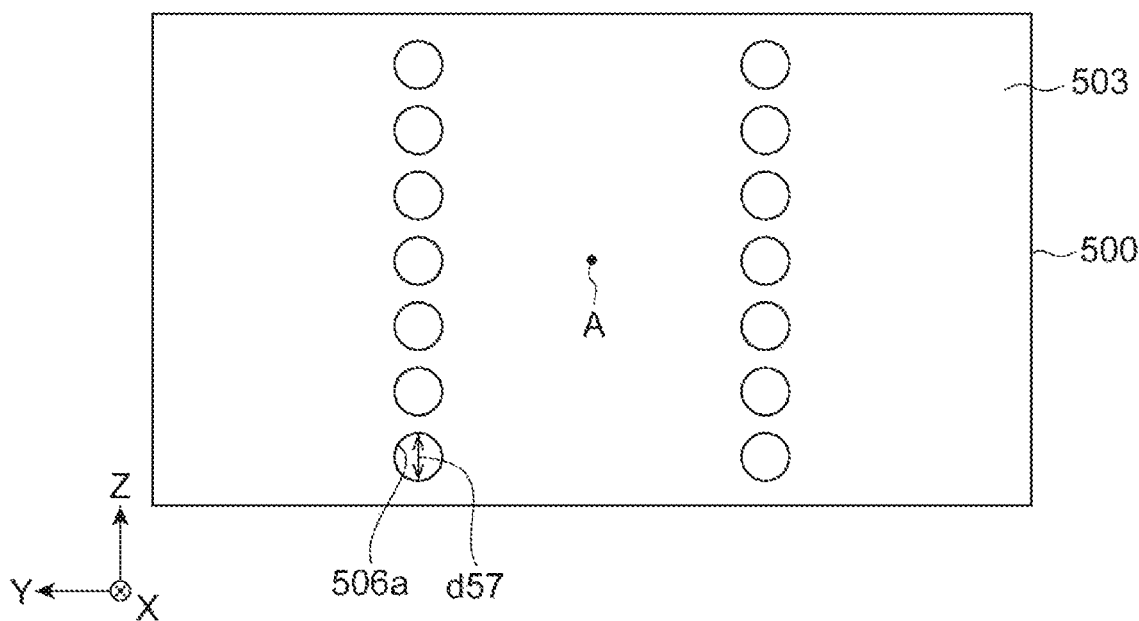

*Fig.39*
(A)
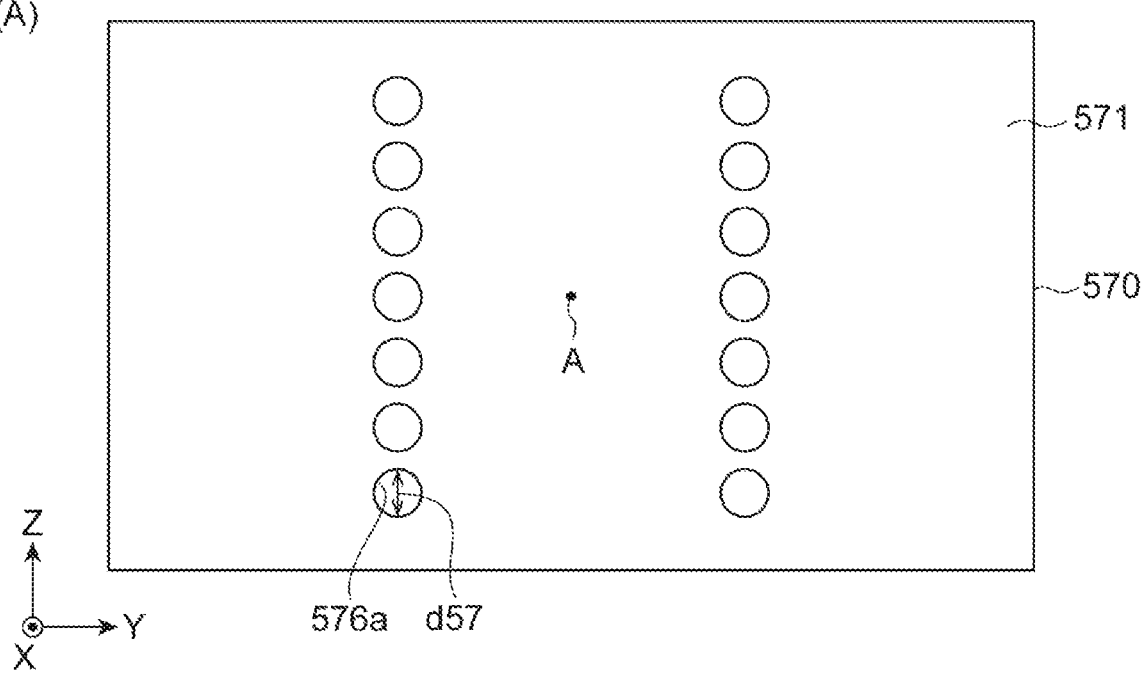
(B)
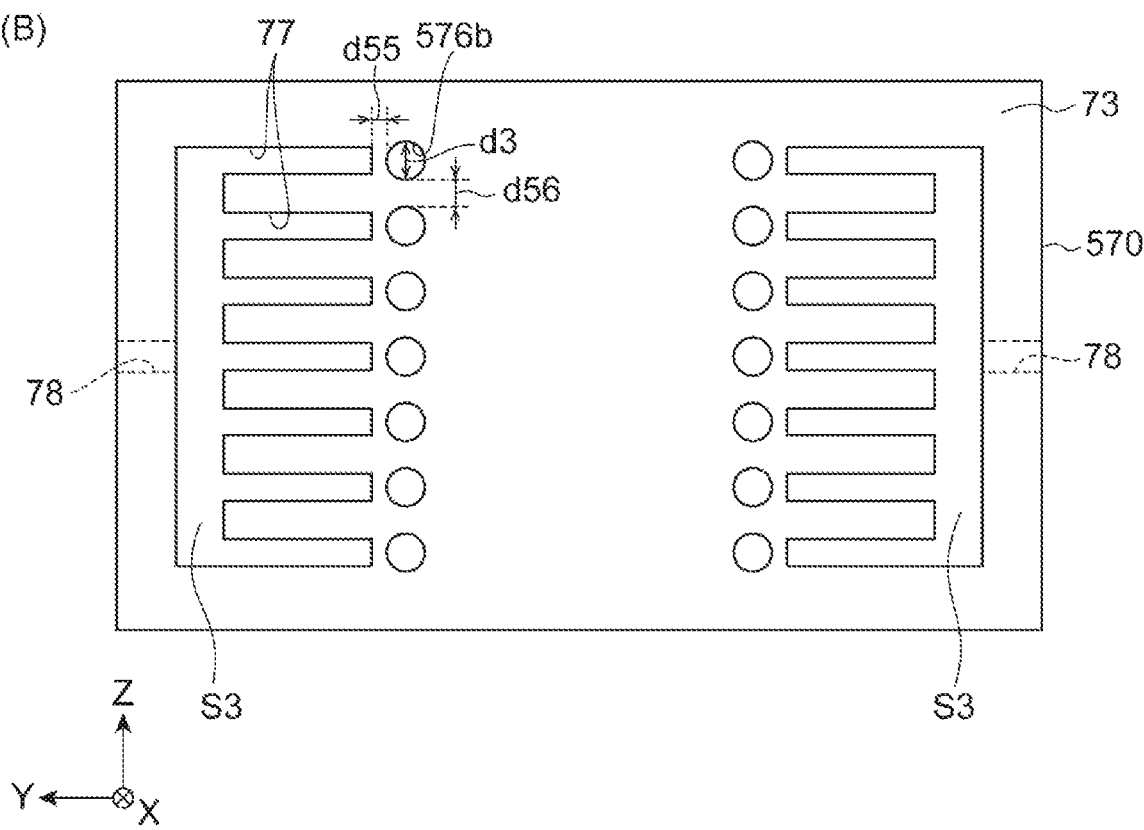

POWER STORAGE MODULE AND METHOD FOR MANUFACTURING POWER STORAGE MODULE

CROSS REFERENCE TO RELATED APPLICATIONS

This application is a National Stage of International Application No. PCT/JP2018/006508 filed Feb. 22, 2018, claiming priority based on Japanese Patent Application Nos. 2017-036265 filed Feb. 28, 2017, 2017-036268 filed Feb. 28, 2017, 2017-036264 filed Feb. 28, 2017 and 2017-036902 filed Feb. 28, 2017 and 2017-055889 filed Mar. 22, 2017.

TECHNICAL FIELD

One aspect of the present invention relates to a power storage module and a method for manufacturing a power storage module.

BACKGROUND ART

A bipolar battery (a power storage module) including a bipolar electrode in which a positive electrode is formed on one surface of a current collector, and a negative electrode is formed on the other surface, is known (refer to Patent Literature 1). In the battery, an electrolytic solution is enclosed within an internal space partitioned by a separator, the current collector, and a seal member. The bipolar electrode is laminated through an electrolyte layer including the separator impregnated with the electrolytic solution. A tube penetrating through a seal portion, is provided in the battery. One end of the tube faces the internal space, and the other end faces an external space of the battery. In a case where the pressure of the internal space increases while the battery is used, the tube functions as a pressure adjustment valve.

CITATION LIST

Patent Literature

Patent Literature 1: Japanese Unexamined Patent Publication No. 2010-287451

SUMMARY OF INVENTION

Technical Problem (First Problem)

In order to secure a normal operation of the pressure adjustment valve, it is preferable to confirm in advance that a pressure (a valve opening pressure) when the pressure adjustment valve releases gas of the internal space, is a setting value set in advance. However, in many cases, the pressure adjustment valve is in a state of being capable of exhibiting the function, after the pressure adjustment valve is assembled to the bipolar battery. For this reason, there is a case where it is difficult to examine in advance the pressure adjustment valve.

(Second Problem)

For example, a configuration in which an opening communicated with an internal space between the bipolar electrodes, is provided on a lateral surface of a laminated body of the bipolar electrodes, is considered as the configuration of the bipolar battery. In this configuration, the opening functions as a liquid injection port to which the electrolytic solution is injected, and also functions as a connection port of the pressure adjustment valve for adjusting the pressure of the internal space. In such a configuration, a mechanism capable of suitably and easily performing a liquid injection operation of the electrolytic solution with respect to each of the internal spaces, is required. On the other hand, in order to secure the normal operation of the pressure adjustment valve, it is preferable to confirm in advance that the valve opening pressure is the setting value set in advance. However, in many cases, the pressure adjustment valve is in a state of being capable of exhibiting the function, after the pressure adjustment valve is assembled to the bipolar battery. For this reason, there is a case where it is difficult to examine in advance the pressure adjustment valve.

(Third Problem)

As with the bipolar battery described above, the pressure adjustment valve is provided, and thus, it is possible to evacuate the pressure (an internal pressure) of the internal space in a case where cell abnormality occurs. It is possible to prevent the breakage of a housing or the scattering of the electrolytic solution inside due to an increase in the internal pressure. However, in the bipolar battery described above, it is necessary to attach the tube to the seal portion. On the other hand, a structure in which a frame body joined to a circumferential edge portion of an electrode plate, is laminated in a lamination direction, and thus, a tubular first seal portion is formed, is considered. In such a structure, a structure in which the internal pressure of the cell is evacuated, and thus, the internal pressure is stabilized, is required for the first seal portion.

(Fourth Problem)

In the bipolar battery as described above, on the structure, a space that can be used for installing the pressure adjustment valve, is small, and thus, the space necessary for installing the pressure adjustment valve is required to be as small as possible. As a measure thereof, it is considered that the pressure adjustment valve is not individually provided in each of the internal spaces, but one common pressure adjustment valve is provided in a plurality of internal spaces. For example, a configuration in which a gas discharge port (an opening) of each of the plurality of internal spaces is sealed with one valve body (for example, a rubber plate or the like), is considered. However, in a case of adopting such a configuration, a variation is capable of occurring in a pressure (a seal pressure) at which the valve body seals the gas discharge port, due to the position of the gas discharge port. Then, a part of the internal space is not sealed with a suitable seal pressure due to a variation in the seal pressure, and thus, the pressure is not suitably adjusted.

(Fifth Problem)

In order to secure the normal operation of the pressure adjustment valve, it is preferable that the valve opening pressure is the setting value set in advance. For example, there is a case where the pressure adjustment valve includes a base member in which a communication hole communicated with the internal space, is provided, an elastic member arranged to block an opening end of the communication hole, and a pressing member pressing the elastic member against the base member. In this case, each design dimension of the base member, the elastic member, and the pressing member is adjusted such that a compression rate of the elastic member in a pressing direction, is a predetermined value, and thus, it is possible to determine the valve opening pressure. However, there is a case where the valve opening pressure of the pressure adjustment valve is not a desired value, due to a dimension tolerance or the like of each of the members.

An object of one aspect of the present invention is to improve the functionality of a power storage module including the pressure adjustment valve described above. An object of a first aspect of the present invention is to provide a power storage module and a method for manufacturing a power storage module, in which the examination of a pressure adjustment valve can be easily performed before the pressure adjustment valve is assembled. An object of a second aspect of the present invention is to provide a power storage module and a method for manufacturing a power storage module, in which the operability of liquid injection of an electrolytic solution can be improved, and the examination of the pressure adjustment valve can be easily performed before the pressure adjustment valve is assembled. An object of a third aspect of the present invention is to provide a power storage module in which an internal pressure is stabilized. An object of a fourth aspect of the present invention is to provide a power storage module in which it is possible to suitably perform pressure adjustment of each internal space by one pressure adjustment valve common in a plurality of internal spaces. An object of a fifth aspect of the present invention is to provide a power storage module and a method for manufacturing a power storage module, in which a valve opening pressure of the pressure adjustment valve can be adjusted to a desired value.

Solution to Problem (First Aspect)

A power storage module according to a first aspect of the present invention includes: a laminated body in which a plurality of bipolar electrodes are laminated, wherein each of the plurality of bipolar electrodes includes an electrode plate having a first surface and a second surface on a side opposite to the first surface, a positive electrode provided on the first surface, and a negative electrode provided on the second surface; a frame body retaining an edge portion of the electrode plate and provided with an opening communicated with a plurality of internal spaces between the adjacent bipolar electrodes in the laminated body; and a pressure adjustment valve to be connected to the opening, in which the pressure adjustment valve includes a base member to be connected to the opening and provided with a plurality of communication holes respectively communicated with the plurality of internal spaces through the opening, wherein the plurality of communication holes have first opening ends on the opening side and second opening ends positioned on a side opposite to the first opening ends, an elastic member arranged to shut the second opening ends of the plurality of communication holes, and a pressing member pressing the elastic member against the base member.

In the power storage module, the pressure adjustment valve includes the base member in which the plurality of communication holes are provided, the elastic member, and the pressing member, and thus, it is possible to execute the examination of the pressure adjustment valve before the pressure adjustment valve is connected to the opening of the frame body. For example, air is sent into the communication holes from the first opening ends of the communication holes of the base member, and thus, it is possible to confirm a pressure value when the blocking of the second opening ends of the communication holes by the elastic member, is released. Therefore, according to the power storage module described above, it is possible to easily perform the examination of the pressure adjustment valve before the pressure adjustment valve is assembled.

The power storage module described above may further include: a plurality of the pressure adjustment valves, wherein a plurality of the openings may be provided in the frame body, the pressure adjustment valves may be respectively connected to the plurality of the openings, and the plurality of openings may be respectively communicated with the internal spaces different from each other for each of the openings. The plurality of openings are provided in the frame body, and thus, it is possible to reduce the number of internal spaces communicated with one opening (that is, the number of internal spaces required for performing pressure adjustment by one pressure adjustment valve, and the number of communication holes required to be provided in one pressure adjustment valve), compared to a case where only one opening is provided. Accordingly, it is possible to increase a sectional area per one communication hole of the pressure adjustment valve, and to smoothly circulate air in the communication hole.

A width of the first opening end in a lamination direction of the bipolar electrodes, may be greater than or equal to a multiplication value of a width of one of the internal spaces and one of the electrode plates in the lamination direction, and the number of openings. As a configuration in which the plurality of openings are provided in the frame body, and sets of internal spaces communicated with each of the openings are different from each other, a configuration in which the internal space that is a communication target of each of the openings, is shifted by one stage for each of the openings, or the like is considered. In such a case, the width of the first opening end in the lamination direction is set as described above, and thus, the same pressure adjustment valve can be used for any opening. Accordingly, it is possible to reduce the number of components. In addition, it is not necessary to prepare pressure adjustment valves having different structures for each of the openings, and thus, it is possible to prevent the occurrence of misassembly such as connecting a pressure adjustment valve of a standard not suitable for the opening.

A plurality of the first opening ends may be arranged point-symmetrically with respect to an axis orthogonal to a first lateral surface of the base member facing the opening, through the center of the first lateral surface. According to such a configuration, in both of two states (postures) of the pressure adjustment valve in an inversion relationship with respect to the axis described above, the arrangement of the plurality of first opening ends with respect to the opening is the same. For this reason, in both of two states described above, it is possible to normally connect the pressure adjustment valve to the opening. As a result thereof, it is possible to easily perform the connection of the pressure adjustment valve with respect to the opening. In addition, it is also possible to prevent the occurrence of misassembly such as connecting the pressure adjustment valve to the opening in an incorrect direction.

A plurality of groove portions may be provided on a second lateral surface of the base member facing the elastic member, the plurality of groove portions may respectively correspond to a plurality of the second opening ends, and the second opening end of the communication hole and the groove portion corresponding to the second opening end may be arranged to be communicated with each other by separating a part of the elastic member from the second lateral surface, in accordance with an increase in a pressure of the internal space communicated with the communication hole. According to such a configuration, it is possible to discharge gas in the internal space from the second opening end of the communication hole to the groove portion through the communication hole of the base member, communicated with the internal space, in accordance with an increase in the pressure of the internal space. Accordingly, it is possible to suitably adjust the pressure in the internal space.

A distance between the second opening end and the groove portion corresponding to the said second opening end, may be shorter than a distance between the said second opening end and the other second opening end adjacent to the said second opening end. According to such a configuration, in a case where a part of the elastic member is separated from the second lateral surface, in accordance with an increase in the pressure of the internal space, it is possible to communicate the second opening end with the groove portion without communicating the said second opening end of the communication hole communicated with the internal space, with the other second opening end adjacent to the said second opening end (that is, the second opening end of the communication hole communicated with another internal space). Accordingly, when the pressure adjustment is performed by the pressure adjustment valve, it is possible to suitably prevent interference (the inflow and the outflow of gas, or the like) between the internal spaces different from each other.

A circulation space connected to the plurality of groove portions may be partitioned in the base member, and the circulation space may be configured to circulate gas discharged from the internal space, and an exhaust port communicating the circulation space with the outside of the base member, may be provided in the base member. According to such a configuration, the gas discharged to one groove portion in accordance with an increase in the pressure of the internal space, flows in the circulation space that is commonly provided in the plurality of groove portions, and is discharged to the outside from the exhaust port. Therefore, it is possible to suitably discharge the gas generated in the internal space, to the outside, with a simple configuration.

The frame body may include a first seal portion retaining the edge portion of the electrode plate, and a second seal portion provided around the first seal portion when seen from the lamination direction of the bipolar electrode, the opening may include a plurality of first openings provided in the first seal portion and communicated with the internal spaces different from each other, and a second opening provided in the second seal portion and communicated with the plurality of first openings, a part of the base member may be inserted into the second opening, the plurality of communication holes may be communicated with the internal spaces different from each other, through the plurality of first openings, the first opening may be in the shape of a rectangle, the first opening end may be formed to have a size including the first opening when seen from a connection direction of the opening and the pressure adjustment valve, and the second opening end may be in the shape of a circle.

A method for manufacturing a power storage module according to the first aspect of the present invention, is a method for manufacturing a power storage module provided with a plurality of bipolar electrodes each including an electrode plate provided with a first surface, and a second surface on a side opposite to the first surface, a positive electrode provided on the first surface, and a negative electrode provided on the second surface, the method including: a step of obtaining a laminated body by laminating the plurality of bipolar electrodes; a step of forming a frame body retaining an edge portion of the electrode plate, in which openings communicated with a plurality of internal spaces between the adjacent bipolar electrodes in the laminated body, are provided; a step of preparing a pressure adjustment valve including a base member to be connected to the opening, in which a plurality of communication holes respectively communicated with the plurality of internal spaces through the opening, are provided, an elastic member arranged to block second opening ends of the plurality of communication holes, positioned on a side opposite to first opening ends on the opening side, and a pressing member pressing the elastic member against the base member; a step of examining the pressure adjustment valve by sending air into each of the communication holes from the first opening ends of each of the communication holes; and a step of connecting the pressure adjustment valve which has been examined, to the opening.

In the method for manufacturing a power storage module, the pressure adjustment valve includes the base member in which the plurality of communication holes are provided, the elastic member, and the pressing member, and thus, it is possible to execute the examination of the pressure adjustment valve before the pressure adjustment valve is connected to the opening of the frame body. Therefore, according to the method for manufacturing a power storage module described above, it is possible to easily perform the examination of the pressure adjustment valve before the pressure adjustment valve is assembled.

(Second Aspect)

A power storage module according to a second aspect of the present invention includes: a laminated body in which a plurality of bipolar electrodes each including an electrode plate provided with a first surface, and a second surface on a side opposite to the first surface, a positive electrode provided on the first surface, and a negative electrode provided on the second surface; a frame body retaining an edge portion of the electrode plate, in which openings communicated with a plurality of internal spaces between the adjacent bipolar electrodes in the laminated body, are provided; and a pressure adjustment valve to be connected to the opening, in which the pressure adjustment valve includes a first base member to be connected to the opening and provided with a plurality of first communication holes respectively communicated with the plurality of internal spaces through the opening, a second base member to be connected to a lateral surface of the first base member on a side opposite to the opening side and provided with a plurality of second communication holes respectively communicated with the plurality of first communication holes, an elastic member arranged to shut opening ends of the plurality of second communication holes, positioned on a side opposite to opening ends on the first base member side of the plurality of second communication holes, and a pressing member pressing the elastic member against the second base member.

In the power storage module, it is possible to perform liquid injection of an electrolytic solution with respect to each of the internal spaces, by using the first base member in which the plurality of first communication holes respectively communicated with plurality of internal spaces. Specifically, when the power storage module is manufactured, the first base member is connected to the opening of the frame body before the first base member is joined to the second base member, and thus, it is possible to perform the liquid injection of the electrolytic solution with respect to each of the internal spaces, through each of the first communication holes. In addition, it is possible to execute the examination of the pressure adjustment valve by using the second base member in which the plurality of second communication holes are provided. Specifically, it is possible to execute the examination with respect to a unit (the pressure adjustment valve submodule) including the second base member, the elastic member, and the pressing member. For example, it is possible to confirm the pressure value when the blocking of the opening end of the second communication hole (the opening end on the elastic member side) by the elastic member, is released, by sending air into the second communication hole from the opening ends of each of the second communication holes of the second base member on the first base member side (that is, a side to be connected to the first communication hole). Therefore, according to the power storage module described above, it is possible to improve the operability of the liquid injection of the electrolytic solution, and to easily perform the examination of the pressure adjustment valve before the pressure adjustment valve is assembled.

The power storage module described above may further include: a plurality of the pressure adjustment valves, in which a plurality of the openings to which the pressure adjustment valves are respectively connected, may be provided in the frame body, and the plurality of openings may be respectively communicated with the internal spaces different from each other for each of the openings. The plurality of openings are provided in the frame body, and thus, it is possible to reduce the number of internal spaces communicated with one opening (that is, the number of internal spaces required for performing pressure adjustment by one pressure adjustment valve, and the number of communication holes required to be provided in one pressure adjustment valve), compared to a case where only one opening is provided. Accordingly, it is possible to increase a sectional area per one communication hole of the pressure adjustment valve, and to smoothly circulate air in the communication hole.

A width of the opening end of the first communication hole on the opening side in a lamination direction of the bipolar electrodes, may be greater than or equal to a multiplication value of a width of one of the internal spaces and one of the electrode plates in the lamination direction, and the number of openings. As a configuration in which the plurality of openings are provided in the frame body, and sets of internal spaces communicated with each of the openings are different from each other, a configuration in which the internal space that is a communication target of each of the openings, is shifted by one stage for each of the openings, or the like is considered. In such a case, the width of the opening end of the first communication hole on the opening side (the opening side of the frame body) in the lamination direction, is set as described above, and thus, the same pressure adjustment valve can be used for any opening. Accordingly, it is possible to reduce the number of components. In addition, it is not necessary to prepare pressure adjustment valves having different structures for each of the openings, and thus, it is possible to prevent the occurrence of misassembly such as connecting a pressure adjustment valve of a standard not suitable for the opening.

The opening ends of the plurality of first communication holes on the opening side may be arranged point-symmetrically with respect to an axis orthogonal to a first lateral surface of the first base member facing the opening, through the center of the first lateral surface. According to such a configuration, in both of two states (postures) of the first base member (the pressure adjustment valve) in an inversion relationship with respect to the axis described above, the arrangement of the plurality of opening ends (the opening ends of the first communication holes on the opening side) with respect to the opening is the same. For this reason, in both of two states described above, it is possible to normally connect the first base member to the opening. As a result thereof, it is possible to easily perform the connection of the first base member with respect to the opening. In addition, it is also possible to prevent the occurrence of misassembly such as connecting the first base member to the opening in an incorrect direction.

The opening ends of the plurality of first communication holes on the second base member side, and the opening ends of the plurality of second communication holes on the first base member side, may be arranged point-symmetrically with respect to the axis. According to such a configuration, in both of two states (postures) of the first base member (or the second base member) in an inversion relationship with respect to the axis described above, the arrangement of the opening ends of the plurality of second communication holes on the first base member side with respect to the opening ends of the plurality of first communication holes on the second base member side, is the same. For this reason, in both of two states described above, it is possible to normally join the second base member to the first base member. As a result thereof, it is possible to easily perform the joining of the second base member with respect to the first base member. In addition, it is also possible to prevent the occurrence of misassembly such as joining the second base member to the first base member in an incorrect direction.

A plurality of groove portions respectively corresponding to the opening ends of the plurality of second communication holes on the elastic member side, may be provided on a second lateral surface of the second base member facing the elastic member, and the opening end and the groove portion corresponding to the opening end may be arranged to be communicated with each other by separating a part of the elastic member from the second lateral surface, in accordance with an increase in a pressure of the internal space communicated with the second communication hole. According to such a configuration, it is possible to discharge gas in the internal space from the opening end of the second communication hole on the elastic member side to the groove portion through the second communication hole communicated with the internal space, in accordance with an increase of the pressure in the internal space. Accordingly, it is possible to suitably adjust the pressure in the internal space.

A distance between the opening end of the second communication hole on the elastic member side and the groove portion corresponding to the said opening end, may be shorter than a distance between the said opening end and another opening end adjacent to the said opening end. According to such a configuration, in a case where a part of the elastic member is separated from the second lateral surface, in accordance with an increase in the pressure in the internal space, it is possible to communicate the opening end with the groove portion without communicating the said opening end of the second communication hole on the elastic member side, communicated with the internal space, with another opening end adjacent to the said opening end (that is, the opening end of the second communication hole communicated with another internal space). Accordingly, when the pressure adjustment is performed by the pressure adjustment valve, it is possible to suitably prevent interference (the inflow and the outflow of gas, or the like) between the internal spaces different from each other.

A circulation space connected to the plurality of groove portions and configured to circulate gas discharged from the internal space, may be partitioned in the second base member, and an exhaust port communicating the circulation space with the outside of the second base member, may be provided in the second base member. According to such a configuration, the gas discharged to one groove portion in accordance with an increase in the pressure of the internal space, flows in the circulation space that is commonly provided in the plurality of groove portions, and is discharged to the outside from the exhaust port. Therefore, it is possible to suitably discharge the gas generated in the internal space, to the outside, with a simple configuration.

At least a portion of the first communication hole on the second base member side, may be formed in a tapered shape in which a sectional area increases from the opening side to the second base member side, and the second communication hole may be formed in a tapered shape in which a sectional area decreases from the first base member side to the elastic member side. The tapered shape as described above is adopted, and thus, it is possible to perform the molding of the first communication hole and the second communication hole by injection molding or the like. In addition, a flow path from the internal space to the elastic member side is provided such that a sectional area decreases after increasing once, and thus, it is possible to suppress a pressure loss, and to smoothly circulate the gas in the communication hole (the first communication hole and the second communication hole).

An opening area of the opening end of the second communication hole on the elastic member side, may be greater than an opening area of the opening end of the portion of the first communication hole on the opening side, formed in the tapered shape. According to such a configuration, the sectional area of the flow path from the internal space to the elastic member side, on an outlet side is greater than the sectional area on an inlet side, and thus, it is possible to more effectively suppress a pressure loss.

At least a portion of the first communication hole on the second base member side, may be formed in a tapered shape in which a sectional area increases from the opening side to the second base member side, and the second communication hole may be formed in a tapered shape in which a sectional area increases from the first base member side to the elastic member side. The tapered shape as described above is adopted, and thus, it is possible to perform the molding of the first communication hole and the second communication hole by injection molding or the like. In addition, the sectional area of the flow path from the internal space to the elastic member side, is provided to increase from the inlet side to the outlet side, and thus, it is possible to more effectively suppress a pressure loss.

A width of the opening end of the first communication hole on the second base member side in the lamination direction of the bipolar electrodes, may be greater than a width of the opening end of the first communication hole on the opening side in the lamination direction. According to such a configuration, it is possible to suitably ensure an opening width of a joint portion between the first communication hole and the second communication hole. Accordingly, for example, in a case where the first base member and the second base member are joined to each other by heat (for example, hot plate welding), it is possible to prevent the opening of the joint portion from being blocked.

The frame body may include a first seal portion retaining the edge portion of the electrode plate, and a second seal portion provided around the first seal portion when seen from the lamination direction of the bipolar electrode, the opening may include a plurality of first openings provided in the first seal portion and communicated with the internal spaces different from each other, and a second opening provided in the second seal portion and communicated with the plurality of first openings, at least a part of the first base member may be inserted into the second opening, and the plurality of first communication holes are communicated with the internal spaces different from each other, through the plurality of first openings, the first opening may be in the shape of a rectangle, the opening end of the first communication hole on the opening side may be formed to have a size including the first opening when seen from a connection direction of the opening and the pressure adjustment valve, and the opening end of the second communication hole on the elastic member side may be in the shape of a circle.

A method for manufacturing a power storage module according to the second aspect of the present invention, is a method for manufacturing a power storage module provided with a plurality of bipolar electrodes each including an electrode plate provided with a first surface, and a second surface on a side opposite to the first surface, a positive electrode provided on the first surface, and a negative electrode provided on the second surface, the method including: a step of obtaining a laminated body by laminating the plurality of bipolar electrodes; a step of forming a frame body retaining an edge portion of the electrode plate, in which openings communicated with a plurality of internal spaces between the adjacent bipolar electrodes in the laminated body, are provided; a step of connecting a first base member to be connected to the opening, in which a plurality of first communication holes respectively communicated with the plurality of internal spaces through the opening, are provided, to the opening; a step of injecting an electrolytic solution into each of the plurality of internal spaces through the plurality of first communication holes; a step of preparing a pressure adjustment valve submodule including a second base member in which a plurality of second communication holes for being respectively communicated with the plurality of first communication holes, an elastic member arranged to block opening ends of the plurality of second communication holes, positioned on a side opposite to a side to be connected to the first communication holes, and a pressing member pressing the elastic member against the second base member; a step of examining the pressure adjustment valve submodule by sending air into each of the second communication holes from the opening ends of each of the second communication holes on the side to be connected to the first communication holes; and a step of joining the first base member to the second base member of the pressure adjustment valve submodule which has been examined, such that the first communication hole is communicated with the second communication hole.

In the method for manufacturing a power storage module, in the step of injecting the electrolytic solution, it is possible to perform the liquid injection of the electrolytic solution with respect to each of the internal spaces, by using the first base member in which the plurality of first communication holes communicated with each of the plurality of internal spaces, are provided. In addition, in the step of examining the pressure adjustment valve submodule, examination with respect to the pressure adjustment valve submodule that is a unit including the second base member, the elastic member, and the pressing member is executed, and thus, it is possible to examine a function as the pressure adjustment valve. Therefore, according to the method for manufacturing a power storage module described above, it is possible to improve the operability of the liquid injection of the electrolytic solution, and to easily perform the examination of the pressure adjustment valve before the pressure adjustment valve is assembled.

(Third Aspect)

A power storage module according to a third aspect of the present invention is a power storage module in which a plurality of bipolar electrodes are laminated through a separator, wherein each of the plurality of bipolar electrodes includes an electrode plate, a positive electrode provided on a first surface of the electrode plate, and a negative electrode provided on a second surface of the electrode plate, the module including: a tubular seal portion which extends in a lamination direction of the plurality of bipolar electrodes, and contains the plurality of bipolar electrodes, in which an internal space is formed between the plurality of bipolar electrodes and the seal portion, the seal portion includes a tubular first seal portion joined to a circumferential edge portion of the electrode plate, and a tubular second seal portion provided outside the first seal portion, in a direction intersecting with the lamination direction, the first seal portion has a structure in which a frame body is laminated in the lamination direction, wherein the frame body is joined to the circumferential edge portion of the electrode plate, the frame body includes a first end surface and a second end surface which are respectively in contact with two other frame bodies adjacent in the lamination direction, and a groove portion which is formed on at least one of the first end surface and the second end surface, extends in the direction intersecting with the lamination direction, and penetrates the inside and the outside of the frame body, the second seal portion includes an opening provided in a position corresponding to the groove portion of the frame body, and a pressure adjustment valve is provided in the opening of the second seal portion, wherein the pressure adjustment valve is connected to the internal space through the groove portion, and is configured to adjust a pressure of the internal space.

According to the power storage module, the frame body joined to the circumferential edge portion of the electrode plate, is laminated in the lamination direction, and thus, the first seal portion is formed. The groove portion is formed on at least one side of the first end surface and the second end surface of the frame body. The groove portion extends in the direction intersecting with lamination direction, and penetrates the inside and the outside of the frame body. The frame bodies are in contact with the first end surface and the second end surface in the lamination direction, and thus, the sectional area of the groove portion as a communication flow path, is ensured. Accordingly, the pressure of the internal space, that is, the internal pressure is easily evacuated to the outside of the frame body through the groove portion. At this time, the pressure adjustment valve is operated, and thus, the internal pressure is adjusted. According to the configuration described above in which the groove portion is provided in the first seal portion, a pressure loss between the internal space and the pressure adjustment valve when the internal pressure increases, is reduced. According to the power storage module described above, it is possible to stabilize the internal pressure by cooperation between the groove portion and the pressure adjustment valve.

The separator may be provided such that an outer circumferential end of the separator is positioned outside an inner circumferential end of the first seal portion, the frame body may have a thickness greater than a thickness of the separator in the lamination direction, a step portion is formed in the frame body for arranging the outer circumferential end of the separator on at least one of the first end surface and the second end surface, and a depth of the groove portion in the lamination direction, may be greater than a depth of the step portion in the lamination direction. In this case, because the depth of the groove portion is greater, it is possible to further reduce a pressure loss in the groove portion.

One or a plurality of protrusions may be provided in a bottom portion of the groove portion. In this case, the modification of the groove portion is prevented, and the sectional area of the groove portion as the communication flow path, is ensured.

The groove portion may be in the shape of a rectangle, and an aspect ratio of the groove portion may be greater than or equal to 5, on a vertical sectional surface in the direction intersecting with the lamination direction. In this case, it is possible to preferably form the groove portion as the communication flow path, with respect to a bipolar electrode (a cell) having a limited thickness.

(Fourth Aspect)

A power storage module according to a fourth aspect of the present invention includes: a laminated body in which a plurality of bipolar electrodes each including an electrode plate provided with a first surface, and a second surface on a side opposite to the first surface, a positive electrode provided on the first surface, and a negative electrode provided on the second surface, are laminated; a frame body retaining an edge portion of the electrode plate, in which openings communicated with a plurality of internal spaces between the adjacent bipolar electrodes in the laminated body, are provided; and a pressure adjustment valve to be connected to the opening, in which the pressure adjustment valve includes a base member to be connected to the opening, in which a plurality of communication holes respectively communicated with the plurality of internal spaces through the opening, are provided, a plate-like elastic member arranged to block second opening ends of the plurality of communication holes, positioned on a side opposite to first opening ends on the opening side of the plurality of communication holes, and a pressing member pressing the elastic member against the base member, from a side opposite to a side of the elastic member facing the base member, and the pressing member includes a positioning portion positioning the elastic member with respect to the pressing member.

In the power storage module, one ends (the first opening ends) of the plurality of communication holes provided in the base member, are respectively communicated with the internal spaces of the laminated body of the bipolar electrodes, through the opening of the frame body, and the other ends (the second opening ends) of the plurality of communication holes are blocked by the elastic member that is pressed by the pressing member. Accordingly, it is possible to perform the pressure adjustment (exhaust) of the internal space for each of the internal spaces. In addition, the positioning of the elastic member is performed by the positioning portion provided in the pressing member side. Accordingly, it is possible to realize a configuration in which a portion of the elastic member on the base member side does not interfere with the positioning portion. As a result thereof, it is difficult for a variation to occur in a pressure for pressing the base member with the elastic member, in each position of the elastic member. That is, a variation in a pressure when the gas is discharged (a valve opening pressure at which the blocking of the elastic member is released), for each of the second opening ends, is reduced. Therefore, according to the power storage module described above, it is possible to suitably perform pressure adjustment of each of the internal spaces by one pressure adjustment valve common in the plurality of internal spaces.

A plurality of groove portions respectively corresponding to a plurality of the second opening ends, may be provided on a lateral surface of the base member on the elastic member side, and the second opening end of the communication hole and the groove portion corresponding to the second opening end may be arranged to be communicated with each other by separating a part of the elastic member from the lateral surface, in accordance with an increase in a pressure of the internal space communicated with the communication hole. According to such a configuration, it is possible to discharge gas in the internal space from the second opening end of the communication hole to the groove portion through the communication hole of the base member, communicated with the internal space, in accordance with an increase in the pressure of the internal space. Accordingly, it is possible to suitably adjust the pressure in the internal space.

A distance between the second opening end and the groove portion corresponding to the said second opening end, may be shorter than a distance between the said second opening end and the other second opening end adjacent to the said second opening end.

According to such a configuration, in a case where a part of the elastic member is separated from the second lateral surface, in accordance with an increase in the pressure in the internal space, it is possible to communicate the second opening end with the groove portion without communicating the said second opening end of the communication hole communicated with the internal space, with the other second opening end adjacent to the said second opening end (that is, the second opening end of the communication hole communicated with another internal space). Accordingly, when the pressure adjustment is performed by the pressure adjustment valve, it is possible to suitably prevent interference (the inflow and the outflow of gas, or the like) between the internal spaces different from each other.

A circulation space connected to the plurality of groove portions, and configured to circulate gas discharged from the internal space, may be partitioned in the base member, and an exhaust port communicating the circulation space with the outside of the base member, may be provided in the base member. According to such a configuration, the gas discharged to one groove portion in accordance with an increase in the pressure of the internal space, flows in the circulation space commonly provided in the plurality of groove portions, and is discharged to the outside from the exhaust port. Therefore, it is possible to suitably discharge the gas generated in the internal space, to the outside, with a simple configuration.

The positioning portion may be a concave groove portion to which the elastic member is fitted. According to such a configuration, it is possible to position the elastic member with a simple configuration in which the groove portion is provided in the pressing member.

The lateral surface of the base member and a surface of the pressing member, facing each other through the elastic member, may be parallel to each other. According to such a configuration, in the direction orthogonal to lateral surface of the base member, it is possible to press any portion of the valve body against the base member with an approximately equal force, and thus, it is possible to effectively reduce a variation in the valve opening pressures for each of the internal spaces.

(Fifth Aspect)

A power storage module according to a fifth aspect of the present invention includes: a laminated body in which a plurality of bipolar electrodes each including an electrode plate provided with a first surface, and a second surface on a side opposite to the first surface, a positive electrode provided on the first surface, and a negative electrode provided on the second surface, are laminated; a frame body retaining an edge portion of the electrode plate, in which openings communicated with a plurality of internal spaces between the adjacent bipolar electrodes in the laminated body, are provided; and a pressure adjustment valve to be connected to the opening, in which the pressure adjustment valve includes a base member to be connected to the opening, in which a plurality of communication holes respectively communicated with the plurality of internal spaces through the opening, are provided, an elastic member arranged to block second opening ends of the plurality of communication holes, positioned on a side opposite to first opening ends on the opening side, and a pressing member pressing the elastic member against the base member, and the base member and the pressing member are fixed to each other, in a region in which the base member and the pressing member overlap with each other when seen from a direction orthogonal to a pressing direction of the pressing member.

In the power storage module, the base member and the pressing member are fixed to each other in the region described above. For this reason, it is possible to perform the fixing between the base member and the pressing member, after the pressing member is relatively moved to a desired position in the pressing direction, with respect to the base member. In a case where the pressing member is relatively moved in the pressing direction, it is possible to adjust a compression rate of the elastic member in the pressing direction. The valve opening pressure is determined in accordance with the compression rate, and thus, according to the power storage module described above, it is possible to adjust the valve opening pressure of the pressure adjustment valve to a desired value.

One of the pressing member and the base member, positioned outside in the region when seen from the direction orthogonal to the pressing direction of the pressing member, may have a first transmissivity with respect to a wavelength of a laser for welding the pressing member and the base member to each other, and one of the pressing member and the base member, positioned inside in the region when seen from the direction orthogonal to the pressing direction of the pressing member, may have a second transmissivity less than the first transmissivity, with respect to the wavelength.

In this case, in a case where the region described above is irradiated with the laser from the direction orthogonal to the pressing direction of the pressing member, the laser is transmitted through the member positioned outside, and reaches the member positioned inside. As a result thereof, it is possible to rigidly fix the pressing member and the base member to each other by laser welding, in the region described above.

A method for manufacturing a power storage module according to the fifth aspect of the present invention is a method for manufacturing a power storage module provided with a plurality of bipolar electrodes each including an electrode plate provided with a first surface, and a second surface on a side opposite to the first surface, a positive electrode provided on the first surface, and a negative electrode provided on the second surface, the method including: a step of obtaining a laminated body by laminating the plurality of bipolar electrodes; a step of forming a frame body retaining an edge portion of the electrode plate, in which openings communicated with a plurality of internal spaces between the adjacent bipolar electrodes in the laminated body, are provided; a step of preparing a pressure adjustment valve including a base member to be connected to the opening, in which a plurality of communication holes respectively communicated with the plurality of internal spaces through the opening, are provided, an elastic member arranged to block second opening ends of the plurality of communication holes, positioned on a side opposite to first opening ends on the opening side, and a pressing member pressing the elastic member against the base member; and a step of connecting the pressure adjustment valve to the opening, in which the step of preparing the pressure adjustment valve includes a step of pressing the elastic member against the base member by the pressing member, and a step of fixing the pressing member and the base member to each other, in a region in which the pressing member and the base member overlap with each other when seen from a direction orthogonal to a pressing direction of the pressing member.

In the method for manufacturing a power storage module, it is possible to perform the fixing between the base member and the pressing member, after the pressing member is relatively moved to a desired position in the pressing direction, with respect to the base member. In a case where the pressing member is relatively moved in the pressing direction, it is possible to adjust the compression rate of the elastic member in the pressing direction. The valve opening pressure is determined in accordance with the compression rate, and thus, according to the method for manufacturing a power storage module described above, it is possible to adjust the valve opening pressure of the pressure adjustment valve to a desired value.

In the step of fixing the pressing member and the base member to each other, the pressing member and the base member may be fixed to each other, in a state in which the elastic member is pressed such that a value based on a load for pressing the elastic member by the pressing member, is a value set in advance. In this case, the value based on the load, is changed in accordance with the compression rate of the elastic member in the pressing direction, but does not depend on a dimension tolerance of the pressing member, the elastic member, the base member, and the like. Accordingly, it is possible to adjust the valve opening pressure of the pressure adjustment valve to a desired value, regardless of the dimension tolerance of the pressing member, the elastic member, the base member, and the like.

In the step of fixing the pressing member and the base member to each other, the pressing member and the base member may be fixed to each other, in a state in which the elastic member is pressed such that a dimension of the pressure adjustment valve in the pressing direction, is a value set in advance. In this case, as a reference value of the dimension of the pressure adjustment valve in the pressing direction, measured before the pressing, the compression rate of the elastic member in the pressing direction can be calculated from a difference between the reference value and the dimension of the pressure adjustment valve after the pressing. Accordingly, the influence of the dimension tolerance of the pressing member, the elastic member, the base member, and the like, cancels out. Therefore, it is possible to adjust the valve opening pressure of the pressure adjustment valve to a desired value, regardless of the dimension tolerance of the pressing member, the elastic member, the base member, and the like.

In the step of fixing the pressing member and the base member to each other, the pressing member and the base member may be welded to each other by irradiating the region with a laser. In this case, it is possible to rigidly fix the pressing member and the base member to each other by laser welding, in the region described above.

Advantageous Effects of Invention

According to the first aspect to the fifth aspect of the present invention, it is possible to improve the functionality of the power storage module including the pressure adjustment valve. According to the first aspect, it is possible to provide the power storage module and the method for manufacturing a power storage module, in which the examination of the pressure adjustment valve can be easily performed before the pressure adjustment valve is assembled. According to the second aspect, it is possible to provide the power storage module and the method for manufacturing a power storage module, in which the operability of the liquid injection of the electrolytic solution can be improved, and the examination of the pressure adjustment valve can be easily performed before the pressure adjustment valve is assembled. According to the third aspect, it is possible to stabilize the internal pressure by the cooperation between the groove portion and the pressure adjustment valve. According to the fourth aspect, it is possible to provide the power storage module in which the pressure adjustment of each of the internal spaces can be suitably performed by one pressure adjustment valve common in the plurality of internal spaces.

According to the fifth aspect, it is possible to provide the power storage module and the method for manufacturing a power storage module, in which the valve opening pressure of the pressure adjustment valve can be adjusted to a desired value.

BRIEF DESCRIPTION OF DRAWINGS

FIG. 7(A) is a plan view illustrating a lateral surface of a base member on the opening side of the frame body and FIG. 7(B) is a plan view illustrating a lateral surface of the base member on the valve body side.

FIG. 8A and FIG. 8B are a sectional views taken along line VIII-VIII of FIG. 7, in which FIG. 8(A) is a diagram illustrating a valve closed state, and FIG. 8(B) is a diagram illustrating a valve opened state.

FIG. 12(A) is a plan view illustrating the lateral surface of the first base member on the opening side of the frame body and FIG. 12(B) is a plan view illustrating a lateral surface of the first base member on a second base member side.

FIG. 13(A) is a plan view illustrating a lateral surface of the second base member on a first base member side and FIG. 13(B) is a plan view illustrating a lateral surface of the second base member on the valve body side.

FIG. 14A and FIG. 14B are a sectional views taken along line XIV-XIV of FIG. 13, in which FIG. 14(A) is a diagram illustrating the valve closed state, and FIG. 14(B) is a diagram illustrating the valve opened state.

FIG. 15(A) is a diagram for illustrating an electrolytic solution injection step in a method for manufacturing a power storage module of the second embodiment, and FIG. 15(B) is a diagram illustrating an examination step in the method for manufacturing a power storage module of the second embodiment.

FIG. 20(a) is a sectional view illustrating a peripheral structure of a resin portion, and FIG. 20(b) is a sectional view illustrating a state before a bipolar battery is laminated.

FIG. 21(a) is a sectional view illustrating a groove portion, and FIG. 21(b) is a sectional view illustrating a modification example of the groove portion.

FIG. 28(A) and FIG. 28(B) are a sectional views taken along line XXVIII-XXVIII of FIG. 26, in which FIG. 28(A) is a diagram illustrating the valve closed state, and FIG. 28(B) is a diagram illustrating the valve opened state.

FIG. 33(A) is a diagram illustrating the valve closed state, and FIG. 33(B) is a diagram illustrating the valve opened state.

FIG. 38(A) is a plan view illustrating a lateral surface of the connection member on the opening side of the frame body and FIG. 38(B) is a plan view illustrating a lateral surface of the connection member on the base member side.

FIG. 39(A) is a plan view illustrating a lateral surface of the base member on the connection member side and FIG. 39(B) is a plan view illustrating the lateral surface of the base member on the valve body side.

DESCRIPTION OF EMBODIMENTS

Figure 1:
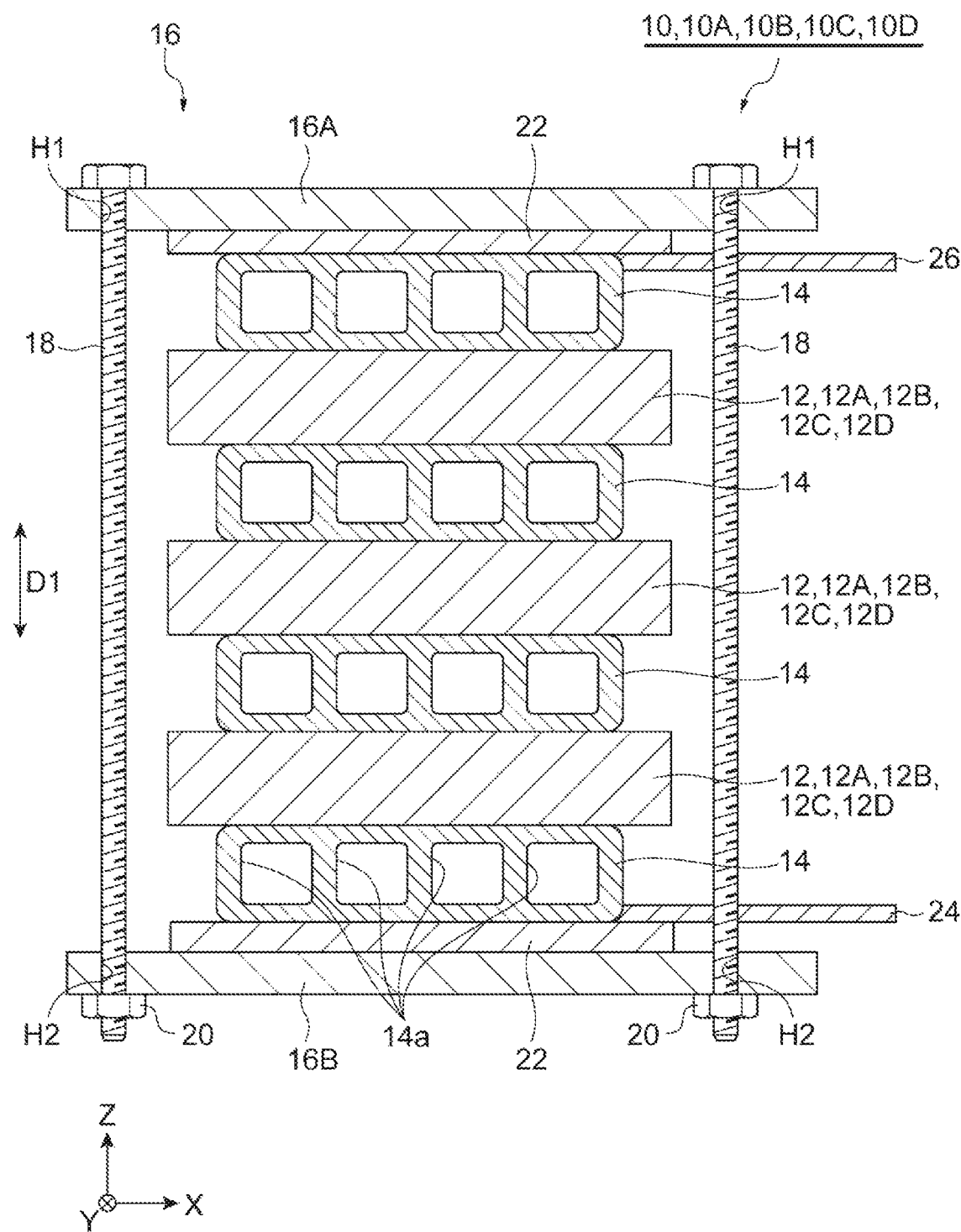
FIG. 1 is a schematic sectional view illustrating one embodiment of a power storage device including power storage modules according to a first embodiment to a fifth embodiment.

Hereinafter, embodiments of the present invention will be described in detail, with reference to the attached drawings. In the description of the drawings, the same reference numerals are used for the same elements or equivalent elements, and the repeated description thereof will be omitted. An XYZ orthogonal coordinate system is illustrated in the drawings. In addition, each of the drawings is prepared for description, and is drawn to particularly emphasize a target portion of the description. For this reason, a dimension ratio of each member in the drawings, is not necessarily coincident with an actual ratio.

First Embodiment

[Configuration of Power Storage Device]

FIG. 1 is a schematic sectional view illustrating one embodiment of a power storage device including a power storage module. FIG. 1 is a diagram illustrating the common configuration in power storage devices 10, 10A, 10B, 10C, and 10D according to a first embodiment to a fifth embodiment. The power storage device 10 illustrated in the same drawing, for example, is used as a battery of various vehicles such as a forklift, a hybrid automobile, and an electric automobile. The power storage device 10 includes a plurality of (in this embodiment, three) power storage modules 12, but may include single power storage module 12. The power storage module 12, for example, is a bipolar battery. The power storage module 12, for example, is a secondary battery such as a nickel-hydrogen secondary battery and a lithium-ion secondary battery, and may be an electric double-layer capacitor. In the following description, a nickel-hydrogen secondary battery will be exemplified.

The plurality of power storage modules 12, for example, can be laminated through a conductive plate 14 such as a metal plate. The power storage module 12 and the conductive plate 14, for example, are in the shape of a rectangle when seen from a lamination direction D1. The details of each of the power storage modules 12 will be described below. The conductive plate 14 is also arranged outside the power storage modules 12, positioned on both ends of the power storage module 12 in the lamination direction D1 (a Z direction). The conductive plate 14 is electrically connected to the adjacent power storage module 12. Accordingly, the plurality of power storage modules 12 are connected in series, in the lamination direction D1. In the lamination direction D1, a positive electrode terminal 24 is connected to the conductive plate 14 positioned on one end, and a negative electrode terminal 26 is connected to the conductive plate 14 positioned on the other end. The positive electrode terminal 24 may be integrated with the conductive plate 14 to be connected. The negative electrode terminal 26 may be integrated with the conductive plate 14 to be connected. The positive electrode terminal 24 and the negative electrode terminal 26 extend in a direction intersecting with the lamination direction D1 (an X direction). Electric charge and discharge of the power storage device 10 can be performed by the positive electrode terminal 24 and the negative electrode terminal 26.

The conductive plate 14 is capable of functioning as a radiator plate that discharges heat generated in the power storage module 12. A refrigerant such as air and gas, passes through a plurality of air gaps 14a provided inside the conductive plate 14, and thus, heat from the power storage module 12 can be efficiently discharged to the outside. Each of the air gaps 14a, for example, extends in a direction intersecting with the lamination direction D1 (a Y direction). The conductive plate 14 is smaller than the power storage module 12, but may be the same as or larger than the power storage module 12 when seen from the lamination direction D1.

The power storage device 10 may include a binding member 16 binding the power storage module 12 and the conductive plate 14, laminated on each other, in the lamination direction D1. The binding member 16 includes a pair of binding plates 16A and 16B, and a coupling member (a bolt 18 and a nut 20) coupling the binding plates 16A and 16B together. For example, an insulating film 22 such as a resin film is arranged between the binding plates 16A and 16B and the conductive plate 14. Each of the binding plates 16A and 16B, for example, is configured of a metal such as iron. Each of the binding plates 16A and 16B and the insulating film 22, for example, are in the shape of a rectangle when seen from the lamination direction D1. The insulating film 22 is larger than the conductive plate 14, and each of the binding plates 16A and 16B is larger than the power storage module 12 when seen from the lamination direction D1. An insertion hole H1 through which an axis portion of the bolt 18 is inserted, is provided on an edge portion of the binding plate 16A, in a position outside the power storage module 12 when seen from the lamination direction D1. Similarly, an insertion hole H2 through which the axis portion of the bolt 18 is inserted, is provided on an edge portion of the binding plate 16B, in a position outside the power storage module 12 when seen from the lamination direction D1. In a case where each of the binding plates 16A and 16B is in the shape of a rectangle when seen from the lamination direction D1, the insertion hole H1 and the insertion hole H2 are positioned on a corner portion of the binding plates 16A and 16B.

One binding plate 16A abuts on the conductive plate 14 connected to the negative electrode terminal 26, through the insulating film 22. The other binding plate 16B abuts on the conductive plate 14 connected to the electrode terminal 24, through the insulating film 22. The bolt 18, for example, passes through the insertion hole H1 from one binding plate 16A side to the other binding plate 16B side, and the nut 20 is screwed to a tip end of the bolt 18 protruding from the other binding plate 16B. Accordingly, the insulating film 22, the conductive plate 14, and the power storage module 12 are unitized by being clamped, and a binding load is applied in the lamination direction D1.

Figure 2:
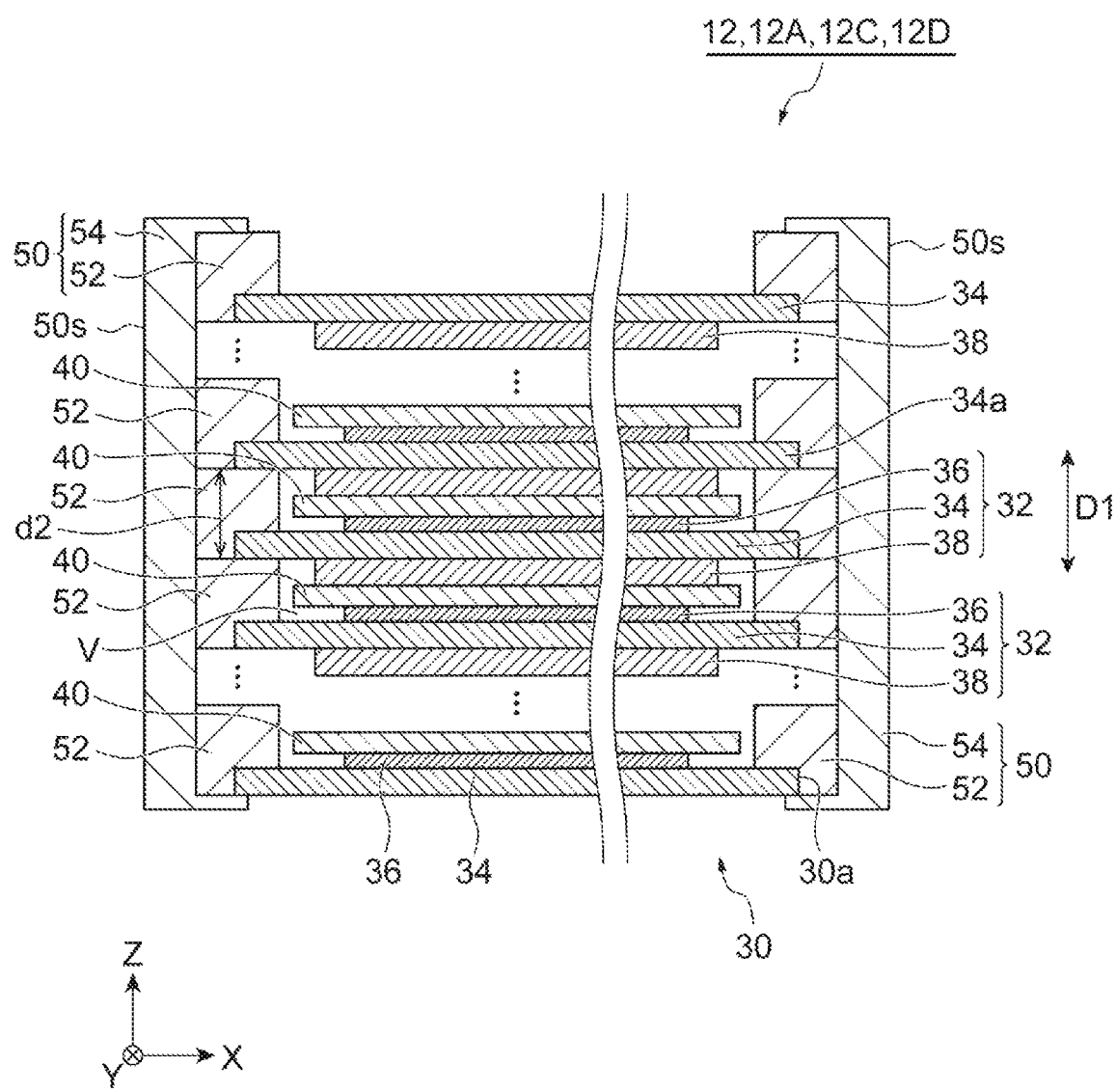
FIG. 2 is a schematic sectional view illustrating the power storage module of the first embodiment, the second embodiment, the fourth embodiment, and the fifth embodiment.

FIG. 2 is a schematic sectional view illustrating the power storage module configuring the power storage device of FIG. 1. FIG. 2 is a diagram illustrating a common configuration in power storage modules 12, 12A, 12C, and 12D according to the first embodiment, the second embodiment, the fourth embodiment, and the fifth embodiment. The power storage module 12 illustrating in the same drawing, includes a laminated body 30 in which a plurality of bipolar electrodes (electrodes) 32 are laminated. The laminated body 30, for example, is in the shape of a rectangle when seen from the lamination direction D1 of the bipolar electrodes 32. A separator 40 can be arranged between the adjacent bipolar electrodes 32. The bipolar electrode 32 includes an electrode plate 34, a positive electrode 36 provided on one surface (a first surface) of the electrode plate 34, and a negative electrode 38 provided on the other surface (a second surface on a side opposite to the first surface) of the electrode plate 34. In the laminated body 30, the positive electrode 36 of one bipolar electrode 32 faces the negative electrode 38 of one adjacent bipolar electrode 32 in the lamination direction D1 through the separator 40, and the negative electrode 38 of one bipolar electrode 32 faces the positive electrode 36 of the other adjacent bipolar electrode 32 in the lamination direction D1 through the separator 40. In the lamination direction D1, the electrode plate 34 (a terminal electrode on the negative electrode side) on which the negative electrode 38 is arranged on an inner lateral surface, is arranged on one end of the laminated body 30, and the electrode plate 34 (a terminal electrode on the positive electrode side) on which the positive electrode 36 is arranged on the inner lateral surface, is arranged on the other end of the laminated body 30. The negative electrode 38 of the terminal electrode on the negative electrode side, faces the positive electrode 36 of the bipolar electrode 32 on the uppermost layer through the separator 40. The positive electrode 36 of the terminal electrode on the positive electrode side, faces the negative electrode 38 of the bipolar electrode 32 on the lowermost layer through the separator 40. The electrode plates 34 of the terminal electrodes are respectively connected to the adjacent conductive plates 14 (refer to FIG. 1).

The power storage module 12 includes a frame body 50 (a seal portion) retaining an edge portion 34a of the electrode plate 34, on a lateral surface 30a of the laminated body 30 extending in the lamination direction D1. The frame body 50 is configured to surround the lateral surface 30a of the laminated body 30. The frame body 50 may include a first resin portion 52 (a first seal portion) retaining the edge portion 34a of the electrode plate 34, and a second resin portion 54 (a second seal portion) provided around the first resin portion 52 when seen from the lamination direction D1.

The first resin portion 52 configuring an inner wall of the frame body 50, is provided over an end surface of the electrode plate 34 on the edge portion 34a from one surface (a surface on which the positive electrode 36 is formed) of the electrode plate 34 of each of the bipolar electrodes 32. Each of the first resin portions 52 is provided over the entire circumference of the edge portion 34a of the electrode plate 34 of each of the bipolar electrodes 32 when seen from the lamination direction D1. The adjacent first resin portions 52 are in contact with a surface extending to the outside of the other surface (a surface on which the negative electrode 38 is formed) of the electrode plate 34 of each of the bipolar electrodes 32. As a result thereof, the edge portion 34a of the electrode plate 34 of each of the bipolar electrodes 32 is buried and retained in the first resin portion 52. As with the edge portion 34a of the electrode plate 34 of each of the bipolar electrodes 32, the edge portion 34a of the electrode plate 34, arranged on both ends of the laminated body 30, is also retained in the first resin portion 52 in a state of being buried. Accordingly, an internal space V that is airtightly partitioned by the electrode plates 34 and 34 and the first resin portion 52, is formed between the adjacent electrode plates 34 and 34 in the lamination direction D1. For example, an electrolytic solution (not illustrated) including an alkaline solution such as an aqueous solution of potassium hydroxide, is contained in the internal space V.

The second resin portion 54 configuring an outer wall of the frame body 50, is a tubular portion extending in the lamination direction D1 as an axis direction. The second resin portion 54 extends over the entire length of the laminated body 30, in the lamination direction D1. The second resin portion 54 covers an outer lateral surface of the first resin portion 52 extending in the lamination direction D1. The second resin portion 54 is welded to the first resin portion 52 inside when seen from the lamination direction D1.

The electrode plate 34, for example, is a rectangular metal foil formed of nickel. The edge portion 34a of the electrode plate 34 is a uncoated region that is not coated with a positive electrode active material and a negative electrode active material, and the uncoated region is a region that is buried and retained in the first resin portion 52 configuring the inner wall of the frame body 50. Examples of the positive electrode active material configuring the positive electrode 36, include nickel hydroxide. Examples of the negative electrode active material configuring the negative electrode 38, include a hydrogen storing alloy. A formation region of the negative electrode 38 on the other surface of the electrode plate 34, is slightly larger than a formation region of the positive electrode 36 on one surface of the electrode plate 34.

The separator 40, for example, is formed into the shape of a sheet. A porous film formed of a polyolefin-based resin such as polyethylene (PE) or polypropylene (PP), a woven fabric or a non-woven fabric formed of polypropylene or the like, and the like are exemplified as a material forming the separator 40. In addition, the separator 40 may be reinforced by a vinylidene fluoride resin compound or the like. Furthermore, the separator 40 is not limited to the sheet-like separator, and a pouched separator may be used as the separator 40.

The frame body 50 (the first resin portion 52 and the second resin portion 54), for example, is formed into the shape of a rectangular tube by injection molding using an insulating resin (the details will be described below). Examples of a resin material configuring the frame body 50, include polypropylene (PP), polyphenylene sulfide (PPS), modified polyphenylene ether (modified PPE), or the like.

Figure 3:
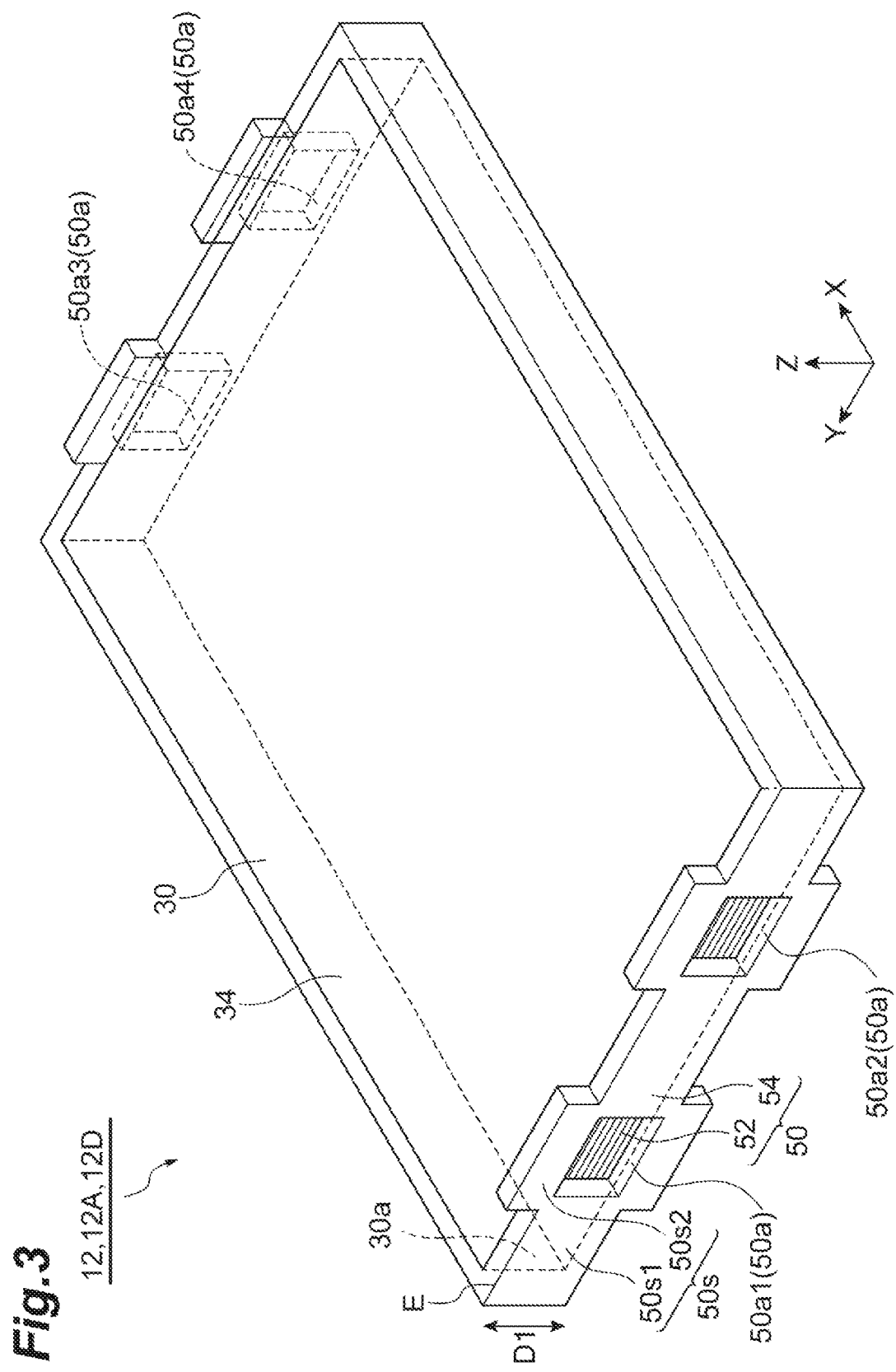
FIG. 3 is a schematic perspective view illustrating the power storage module (excluding a pressure adjustment valve) according to the first embodiment, the second embodiment, and the fifth embodiment.
Figure 4:
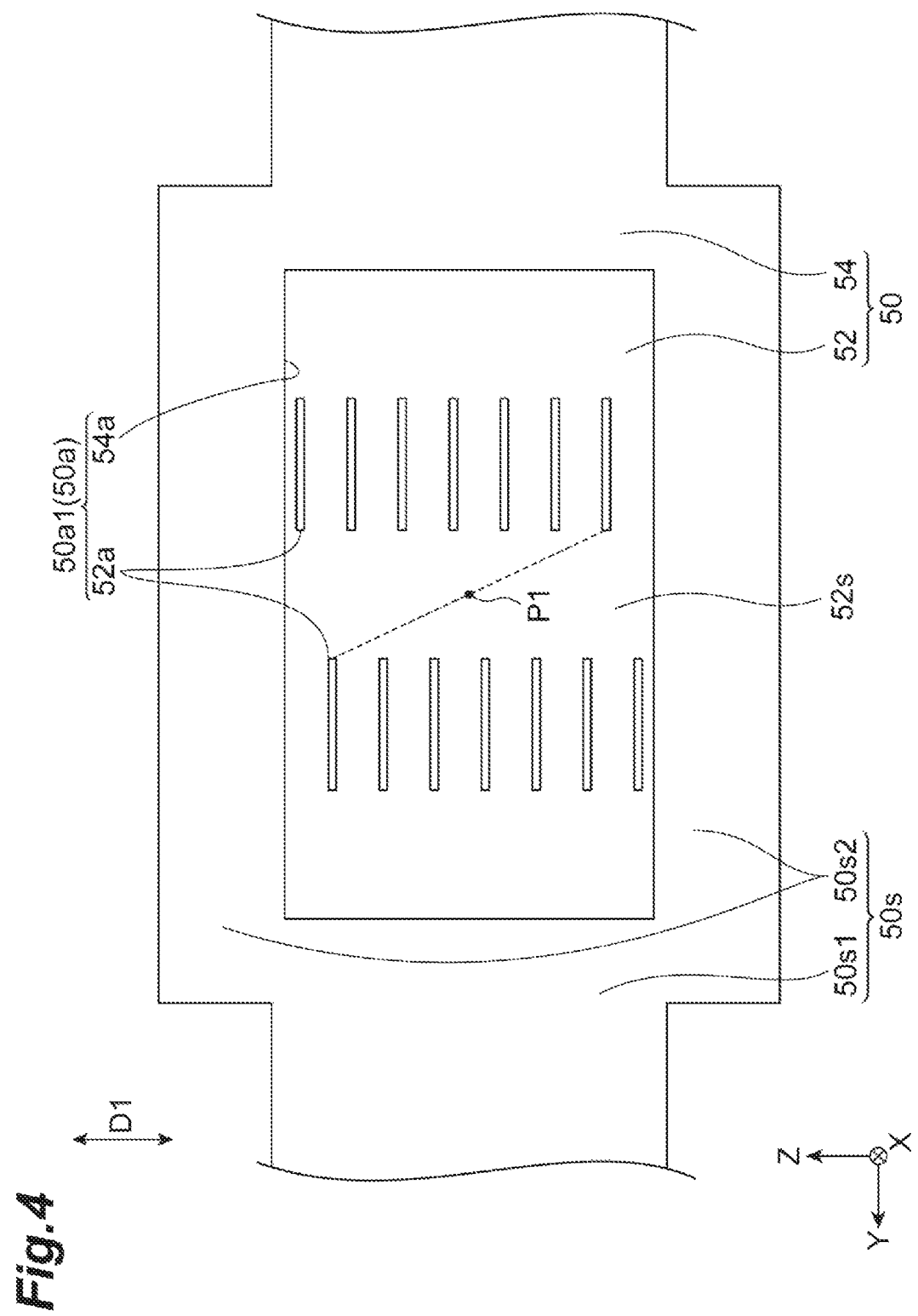
FIG. 4 is a plan view in which a part of the power storage module of FIG. 3 is enlarged.

FIG. 3 is a schematic perspective view illustrating the power storage module of FIG. 2. FIG. 4 is a plan view in which a part of the power storage module of FIG. 3 (a peripheral region of one opening 50a) is enlarged. As illustrated in FIG. 3 and FIG. 4, the frame body 50 of the power storage module 12 includes a lateral surface 50s extending in the lamination direction D1. The lateral surface 50s is a surface positioned outside when seen from the lamination direction D1. Accordingly, the second resin portion 54 includes the lateral surface 50s of the frame body 50.

The lateral surface 50s of the frame body 50 includes a main body region 50s1 and a protruding region 50s2. The main body region 50s1 and the protruding region 50s2, for example, are in the shape of a rectangle. The opening 50a is provided in the main body region 50s1. The opening 50a functions as a liquid injection port for injecting the electrolytic solution into each of the internal spaces V, and functions as a connection port of a pressure adjustment valve 60 (the details will be described below) for adjusting a pressure in each of the internal spaces V, after the electrolytic solution is injected. In this embodiment, the frame body 50 includes a plurality of (here, four) openings 50a (openings 50a1 to 50a4). Specifically, two openings 50a are provided on each of the lateral surfaces 50s facing each other in a longitudinal direction of the frame body 50 (the X direction).

The main body region 50s1 includes an edge E extending in the direction intersecting with the lamination direction D1 of the bipolar electrode 32 (the Y direction). The protruding region 50s2 protrudes from the edge E to be separated from the opening 50a in the lamination direction of the bipolar electrode 32. In this embodiment, a pair of protruding regions 50s2 are arranged to interpose the opening 50a therebetween. The protruding region 50s2 is provided with a length protruding to both outer sides of the opening 50a over the entire length of the opening 50a, along the edge E.

As illustrated in FIG. 4, one opening 50a may include first openings 52a provided in the first resin portion 52, and a second opening 54a provided in the second resin portion 54. Each of the first openings 52a is communicated with the internal space V between the adjacent bipolar electrodes 32, and the second opening 54a. A plurality of first openings 52a are provided in the first resin portion 52, and a single second opening 54a extending to cover the plurality of first openings 52a, is provided in the second resin portion 54. The first opening 52a may be provided in each of the first resin portions 52, or may be provided between the adjacent first resin portions 52. Each of the first openings 52a and the second opening 54a, for example, are in the shape of a rectangle.

In this embodiment, 56 internal spaces V are formed in the power storage module 12, and one opening 50a is communicated with 14 internal spaces V. That is, each of the internal spaces V is communicated with any one of four openings 50a1 to 50a4. As illustrated in FIG. 4, in one opening 50a (here, the opening 50a1 as an example), 14 first openings 52a are arranged by being divided into two columns in a transverse direction of the frame body 50 (the Y direction). In each of the columns, seven first openings 52a are arranged along the lamination direction D1. 14 first openings 52a are arranged point-symmetrically with respect to a center P1 of the second opening 54a when seen from the opening direction of the opening 50a (the X direction).

For example, the arrangement of the plurality of first openings 52*a* in each of the openings 50*a* (that is, an arrangement configuration in which sets of internal spaces V communicated with each of the openings 50*a* are different from each other), may be determined as follows. In the following description, for the sake of convenience, in order to identify 56 internal spaces V, internal spaces V1 to V56 are noted in the order from the other end (a lower side in FIG. 2) of the laminated body 30 to one end (an upper side in FIG. 2).

For example, in the opening 50*a*1, seven first openings 52*a* arranged in the first column (a column on a left side in FIG. 4, same as below), are provided to be communicated with internal spaces V1, V9, V17, V25, V33, V41, and V49 by skipping over eight stages from the other end side of the laminated body 30, and seven first openings 52*a* arranged in the second column (a column on a right side in FIG. 4, same as below), are provided to be communicated with internal spaces V56, V48, V40, V32, V24, V16, and V8 by skipping over eight stages from one end side of the laminated body 30. Here, the first opening 52*a* is provided in a height position (a position in the lamination direction D1) corresponding to the internal space V communicated with the first opening 52*a*, and thus, according to the arrangement described above, the point-symmetric arrangement described above, is realized.

In the openings 50*a*2 to 50*a*4, for example, on the basis of the opening 50*a*1, a set of internal spaces V to be communicated, is shifted by one stage, and thus, as with the opening 50*a*1, the point-symmetric arrangement can be realized. Specifically, in the opening 50*a*2, seven first openings 52*a* arranged in the first column, may be provided to be communicated with internal spaces V2, V10, V18, V26, V34, V42, and V50, and seven first openings 52*a* arranged in the second column, may be provided to be communicated with internal spaces V55, V47, V39, V31, V23, V15, and V7. In the opening 50*a*3, seven first openings 52*a* arranged in the first column, may be provided to be communicated with internal spaces V3, V11, V19, V27, V35, V43, and V51, and seven first openings 52*a* arranged in the second column, may be provided to be communicated with internal spaces V54, V46, V38, V30, V22, V14, and V6. In the opening 50*a*4, seven first openings 52*a* arranged in the first column, may be provided to be communicated with internal spaces V4, V12, V20, V28, V36, V44, and V52, and seven first openings 52*a* arranged in the second column, may be provided to be communicated with internal spaces V53, V45, V37, V29, V21, V13, and V5.

According to the arrangement of the first openings 52*a* (that is, association between the first opening 52*a* and the internal space V) as described above, a configuration in which all of the internal spaces V are communicated with first openings 52*a* different from each other, can be realized, and the point-symmetric arrangement as described above can be realized with respect to all of the openings 50*a*1 to 50*a*4.

Figure 5:
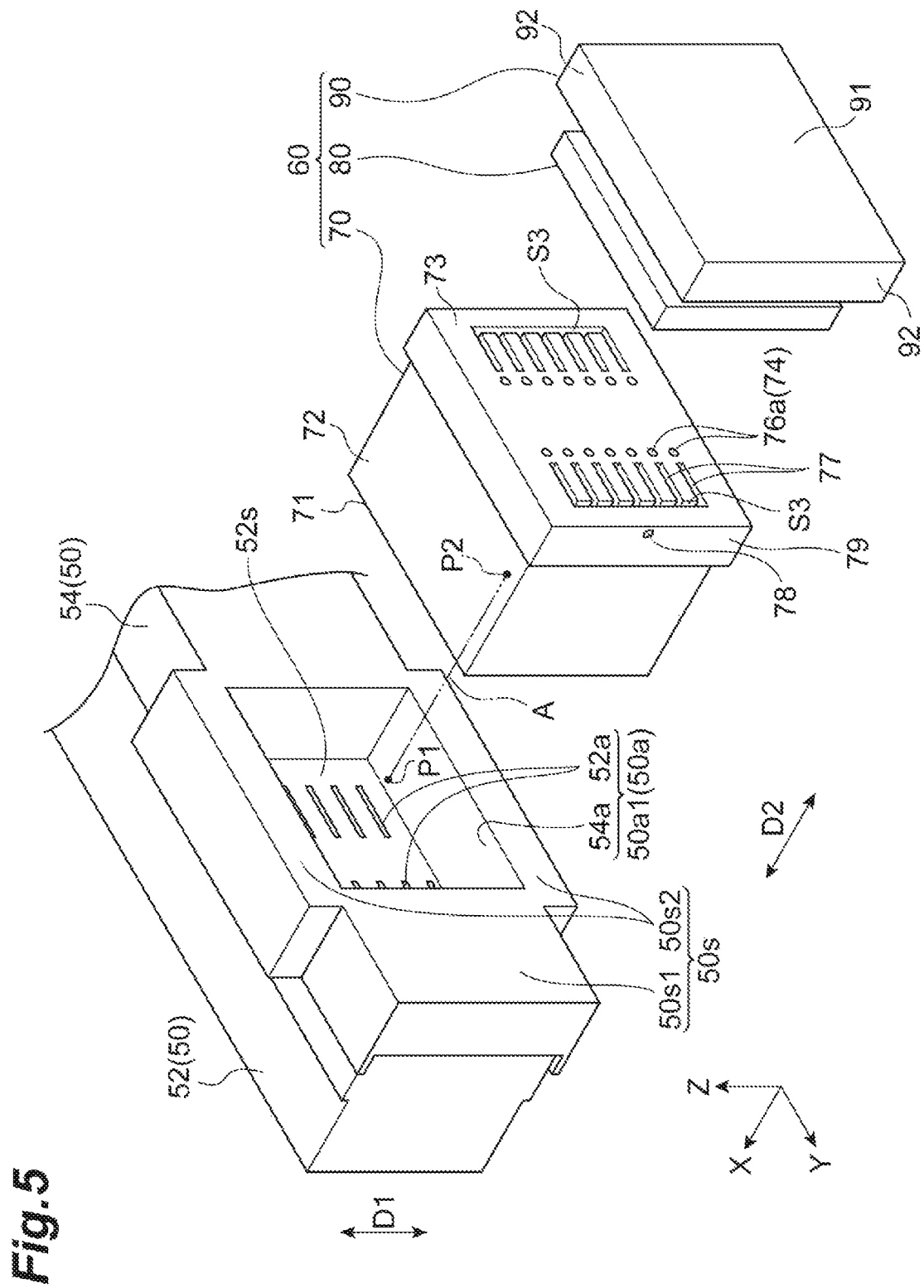
FIG. 5 is an exploded perspective view of the pressure adjustment valve to be connected to an opening of a frame body.
Figure 6:
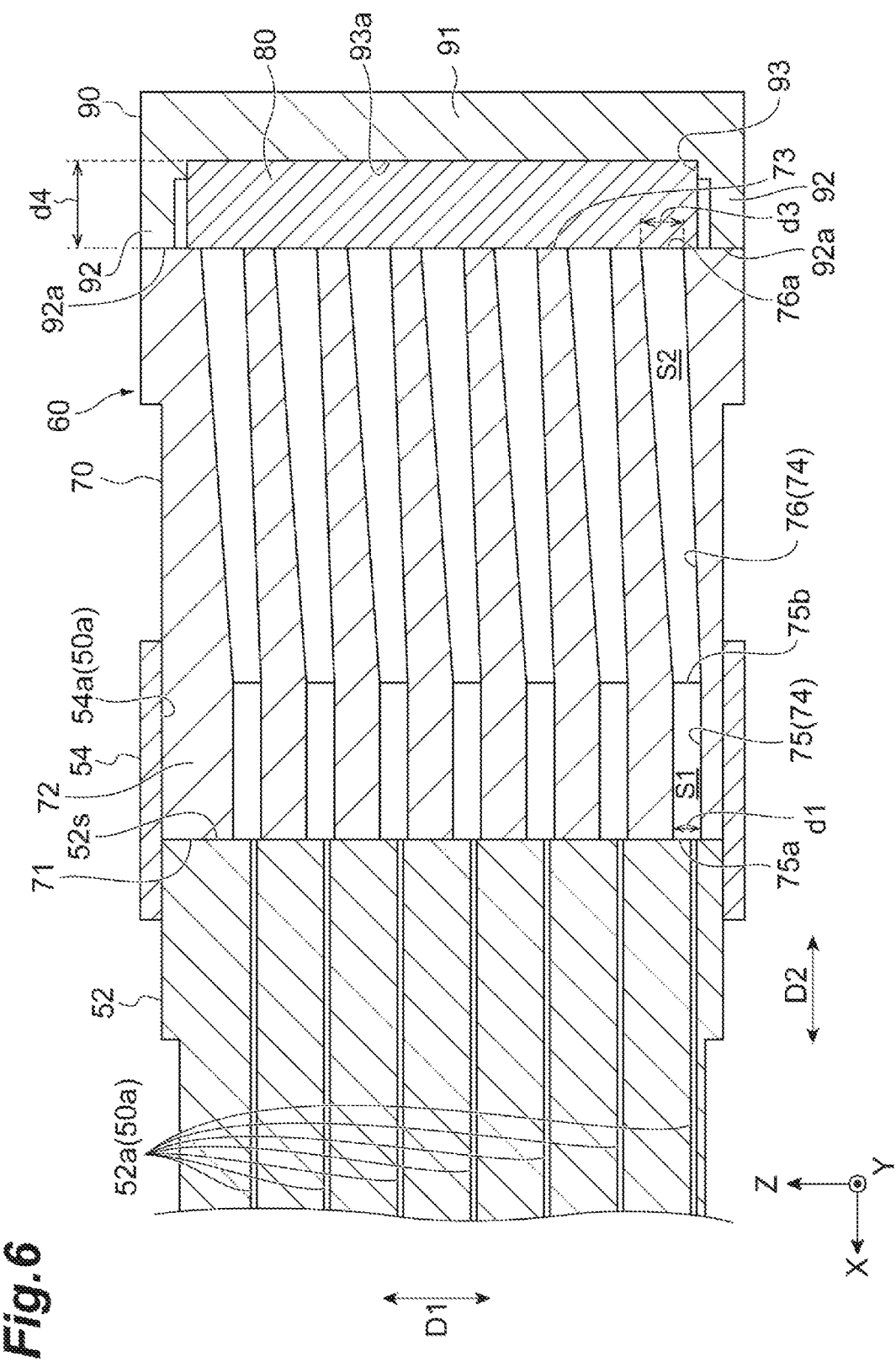
FIG. 6 is a schematic sectional view illustrating the configuration of the pressure adjustment valve.

FIG. 5 is an exploded perspective view of the pressure adjustment valve 60 to be connected to the opening 50*a* of the frame body 50. In addition, FIG. 6 is a schematic sectional view illustrating the configuration of the pressure adjustment valve 60. Specifically, FIG. 6 is a sectional view including sectional surfaces of seven first openings 52*a* (the first openings 52*a* communicated with the internal spaces V1, V9, V17, V25, V33, V41, and V49) arranged in the first column of the opening 50*a*1. As illustrated in FIG. 5 and FIG. 6, the pressure adjustment valve 60 includes a base member 70, a valve body 80 (an elastic member), and a cover member 90 (a pressing member).

The base member 70 has an approximately rectangular parallelepiped outer shape, and for example, is formed of polypropylene (PP), polyphenylene sulfide (PPS), modified polyphenylene ether (modified PPE), or the like. The base member 70 is connected to the opening 50*a*. Specifically, a portion 72 including a lateral surface 71 (a first lateral surface) of the base member 70 facing the opening 50*a*, has a shape corresponding to that of the second opening 54*a*. The base member 70 is fixed to the opening 50*a* by welding a part or all of a contact portion between the lateral surface 71 and the lateral surface 52*s* of the first resin portion 52, in a state where the portion 72 is inserted into the second opening 54*a*. The welding between the lateral surface 71 and the lateral surface 52*s*, for example, is performed by hot plate welding or the like.

FIG. 7(A) is a plan view illustrating the lateral surface 71, and FIG. 7(B) is a plan view illustrating a lateral surface 73 (a second lateral surface) of the base member 70 facing the valve body 80. As illustrated in FIG. 6 and FIG. 7, a plurality of (here, 14) communication holes 74 penetrating through the lateral surface 73 from the lateral surface 71, are provided in the base member 70. Each of the communication holes 74 is communicated with one internal space V, through one corresponding first opening 52*a*. The communication hole 74 includes a first communication portion 75 that is a portion of the communication hole 74 on the lateral surface 71 side, and a second communication portion 76 that is a portion of the communication hole 74 on the lateral surface 73 side.

A sectional surface of the first communication portion 75 is formed into the shape of a rectangle. An approximately rectangular parallelepiped space S1 is formed by the first communication portion 75. An opening end 75*a* (a first opening end) of the first communication portion 75 on the opening 50*a* side, is formed to have a size including the rectangular first opening 52*a* when seen from a connection direction D2 between the opening 50*a* and the pressure adjustment valve 60 (the X direction). On the other hand, a sectional surface of an opening end 75*b* of the first communication portion 75 on a side connected to the second communication portion 76, is formed into the shape of a circle. An inner diameter of the opening end 75*b* is the same as a width d1 of the opening end 75*a* in the lamination direction D1.

Here, the position of each of the first openings 52*a* provided in the same relative position (the same column and the same row) of the openings 50*a*1 to 50*a*4, as described above, is shifted by one stage. For example, the arrangement of the first opening 52*a* of the opening 50*a*1 communicated with the internal space V1, the first opening 52*a* of the opening 50*a*2 communicated with the internal space V2, the first opening 52*a* of the opening 50*a*3 communicated with the internal space V3, and the first opening 52*a* of the opening 50*a*4 communicated with the internal space V4, is shifted by one stage. For this reason, even in a case where the base member 70 of the pressure adjustment valve 60 is connected to any one of the openings 50*a*1 to 50*a*4, it is necessary to communicate each of the first communication portions 75 with the corresponding first opening 52*a* such that the pressure adjustment valve 60 of the same standard (a common shape) can be used with respect to all of the openings 50*a*1 to 50*a*4. Specifically, it is necessary that the first communication portion 75 communicated with the first opening 52*a* corresponding to the internal space V1 when the base member 70 is connected to the opening 50*a*1, is communicated with the first opening 52a corresponding to each of the internal spaces V2 to V4, when the base member 70 is connected to the openings 50a2 to 50a4.

Therefore, in this embodiment, the width d1 of the opening end 75a in the lamination direction D1, is set to be greater than or equal to a multiplication value of a width of one structure repeated in the laminated body 30 (that is, the shift width of one stage, described above) and the number of openings 50a. The width of one structure repeated in the laminated body 30, is a width d2 (refer to FIG. 2) of a portion in which one electrode plate 34 and one internal space V are combined, in the lamination direction D1. That is, as described above, in a case where the first openings 52a in each of the openings 50a are arranged (more specifically, in a case where the first openings 52a in each of the openings 50a are arranged such that the maximum value of a step between the first openings 52a arranged in relative positions corresponding to each other between the openings 50a, is as small as possible), the multiplication value described above (in this embodiment, "d2×4") indicates a width necessary for including a range (a range in the lamination direction D1) in which a plurality of (here, four) first openings 52a arranged in the same relative position, can be formed. Then, in this embodiment, a relationship of "d1≥d2×4" is established. Accordingly, even in a case where the pressure adjustment valve 60 is connected to any opening 50a, each of the first communication portions 75 can be arranged such that the first opening 52a corresponding to the opening end 75a falls within the opening end 75a of each of the first communication portions 75 when seen from the connection direction D2. As a result thereof, the same pressure adjustment valve 60 can be used with respect to any one of the openings 50a1 to 50a4. Accordingly, it is possible to reduce the number of components. In addition, it is not necessary to use the pressure adjustment valve 60 of a standard different for each of the openings 50a, and thus, it is also possible to prevent the occurrence of misassembly such as connecting the pressure adjustment valve 60 of a standard not suitable for the opening 50a.

Further, as illustrated in FIG. 7(A), a plurality of opening ends 75a are arranged point-symmetrically with respect to an axis A (refer to FIG. 5) orthogonal to the lateral surface 71 through a center P2 of the lateral surface 71. In addition, the portion 72 of the base member 70 to be connected to the opening 50a, is formed point-symmetrically with respect to the axis A. In addition, the center P1 described above (the center of the second opening Ma when seen from an opening direction of the opening 50a), is positioned on the axis A. According to such a configuration, in both of two states (postures) of the pressure adjustment valve 60 in an inversion relationship with respect to the axis A, relative arrangement of the plurality of opening ends 75a with respect to the opening 50a is the same. For this reason, in both of two states described above, it is possible to normally connect the pressure adjustment valve 60 to the opening 50a. That is, even in a case where the pressure adjustment valve 60 illustrated in FIG. 5, is inverted up and down (is rotated around the axis A by 180 degrees), it is possible to normally connect the pressure adjustment valve 60 to the opening 50a. As a result thereof, it is possible to easily perform the connection of the pressure adjustment valve 60 with respect to the opening 50a. In addition, it is possible to prevent the occurrence of misassembly such as connecting the pressure adjustment valve 60 to the opening 50a in an incorrect direction.

A sectional surface of the second communication portion 76 is formed into the shape of a circle. The second communication portion 76 penetrates through an opening end 76a (a second opening end) of the second communication portion 76 on the lateral surface 73 side, from the opening end 75b of the first communication portion 75. The opening end 76a is formed into the shape of a circle. An inner diameter d3 of the opening end 76a is greater than the inner diameter of the opening end 75b (that is, the width d1 of the opening end 75a in the lamination direction D1) (d3>d1). That is, a space S2 in a tapered shape in which an inner diameter increases from the opening end 75b to the opening end 76a, is formed by the second communication portion 76. Such a second communication portion 76, for example, can be formed by injection molding or the like.

In addition, in this embodiment, as illustrated in FIG. 6, the second communication portions 76 to be connected to seven first openings 52a in the first column, extend such that the center position of the opening end 76a is positioned on an upper side from the center position of the opening end 75b. On the other hand, the second communication portions 76 to be connected to seven first openings 52a in the second column, extend such that the center position of the opening end 76a is positioned on a lower side from the center position of the opening end 75b. As a result thereof, as illustrated in FIG. 7(B), a plurality of opening ends 76a approach the central position of the lateral surface 73. Accordingly, the valve body 80 necessary for blocking all of the opening ends 76a, becomes compact.

The valve body 80, for example, is formed of the elastic member such as rubber. The valve body 80, for example, is in the shape of a rectangular parallelepiped. The valve body 80 is arranged to shut the plurality of opening ends 76a provided in the base member 70.

The cover member 90 is a box-like member including a rectangle plate-like bottom wall portion 91, and a lateral wall portion 92 erected to an edge portion of the bottom wall portion 91. The cover member 90, for example, is formed of polypropylene (PP), polyphenylene sulfide (PPS), modified polyphenylene ether (modified PPE), or the like. A groove portion 93 that is indented into a concave shape in order to position the valve body 80, is provided inside the bottom wall portion 91. The cover member 90 contains the valve body 80 in the groove portion 93, and functions as the pressing member for pressing the valve body 80 against the lateral surface 73 of the base member 70. Specifically, as illustrated in FIG. 6, in a state where the valve body 80 is positioned and contained in the groove portion 93 of the cover member 90, an end portion 92a of the lateral wall portion 92 is fixed to the lateral surface 73 of the base member 70. A method of fixing the end portion 92a and the lateral surface 73 to each other, is not particularly limited, and for example, laser welding, hot plate welding, fastening using a fastening member such as a bolt, or the like, can be used. For example, in a case of using the laser welding, the cover member 90 is formed of a laser transmissive resin, the base member 70 is formed of a laser absorbing resin, and a laser is emitted from the cover member 90 side, and thus, a boundary portion of the base member 70 with respect to the cover member 90, can be melted, and the base member 70 can be joined to the cover member 90.

Here, the thickness of the valve body 80 at the normal time (at the time of being uncompressed) (the width in the X direction) is greater than a height d4 from a bottom surface 93a of the groove portion 93 to the end portion 92a of the lateral wall portion 92. That is, a compression rate of the valve body 80 is defined by the height d4. For example, the compression rate of the valve body 80 is adjusted in advance such that the blocking of the opening end 76a of the communication hole 74 by the valve body 80, is released in a case where a pressure in the communication hole 74 (that is, a pressure in the internal space V communicated with the communication hole 74), is greater than or equal to a setting value set in advance.

As illustrated in FIG. 7(B) and FIG. 8(A), groove portions 77 respectively corresponding to the opening ends 76a are provided on the lateral surface 73 side of the base member 70. Each of the groove portions 77 is formed into the shape of a slit extending in the direction orthogonal to the lamination direction D1 (the X direction and the Y direction). Each of the groove portions 77 is provided in a position outside the corresponding opening end 76a, in a direction orthogonal to the lamination direction D1 and the connection direction D2 (the Y direction).

Subsequently, the principle of the pressure adjustment of the internal space V, will be described. As described above, each of the communication holes 74 is communicated with the corresponding internal space V, and thus, a pressure equivalent to that of the internal space V corresponding to the communication hole 74, is applied to a portion of the valve body 80, blocking the opening end 76a of the communication hole 74. Here, the compression rate of the valve body 80, or the like is defined such that the blocking of the opening end 76a by the valve body 80, is released in a case where the pressure in the corresponding internal space V is greater than or equal to the setting value set in advance. For this reason, in a case where the pressure in the corresponding internal space V is less than the setting value, as illustrated in FIG. 8(A), a valve closed state in which the opening end 76a is blocked by the valve body 80, is maintained.

On the other hand, in a case where the pressure in the corresponding internal space V increases to be greater than or equal to the setting value, as illustrated in FIG. 8(B), a part of the valve body 80 (specifically, a portion blocking the opening end 76a, and a peripheral portion thereof) is modified to be separated from the lateral surface 73, and thus, a valve opened state in which the blocking of the opening end 76a is released, is obtained. As a result thereof, the opening end 76a of which the blocking is released, is communicated with the groove portion 77 corresponding to the said opening end 76a, and gas in the corresponding internal space V is discharged to the groove portion 77 from the said opening end 76a. After that, in a case where the pressure in the internal space V is less than the setting value, the valve body 80 returns to the original state, and thus, the said opening end 76a is again in the valve closed state (refer to FIG. 8(A)). According to such an opening and closing operation described above, the pressure adjustment valve 60 suitably adjusts the pressure in the internal space V.

Here, as illustrated in FIG. 7(B), a distance d5 between the opening end 76a and the groove portion 77 corresponding to the said opening end 76a, is shorter than a distance d6 between the said opening end 76a and another opening end 76a adjacent to the said opening end 76a (d5<d6). Accordingly, in a case where a part of the valve body 80 is separated from the lateral surface 73 in accordance with an increase in the pressure of the internal space V, it is possible to communicate the said opening end 76a with the groove portion 77 corresponding to the said opening end 76a without communicating the said opening end 76a of the communication hole 74 communicated with the internal space V, with another opening end 76a adjacent to the said opening end 76a (that is, the opening end 76a of the communication hole 74 communicated with another internal space V). As a result thereof, when the pressure adjustment is performed by the pressure adjustment valve 60, it is possible to suitably prevent interference (the inflow and the outflow of gas, or the like) between the internal spaces V different from each other.

In addition, as illustrated in FIG. 7(B) and FIG. 8(A), a circulation space S3 that is connected to a plurality of (here, seven) groove portions 77, and circulates the gas discharged from the internal space V, is partitioned in the base member 70 when seen from a direction facing the lateral surface 73 (the X direction). The circulation space S3 is formed into an approximately rectangular parallelepiped shape. The circulation space S3 extends in the lamination direction D1 in order to connect outer end portions of seven groove portions 77 arrayed along the lamination direction D1 together when seen from the direction facing the lateral surface 73. The plurality of groove portions 77 and the circulation space S3, for example, are formed by injection molding or the like. In addition, an exhaust port 78 communicating the circulation space S3 with the outside, is provided in the base member 70. In this embodiment, an outer opening end of the exhaust port 78 is provided on the lateral surface 79 directed towards a direction orthogonal to the connection direction D2 of the base member 70 (in this embodiment, the Y direction as an example). According to such a configuration, the gas discharged to one groove portion 77 in accordance with an increase in the pressure of the internal space V, flows in the circulation space S3 commonly provided in the plurality of groove portions 77, and is discharged to the outside from the exhaust port 78. Therefore, it is possible to suitably discharge the gas generated in the internal space V, to the outside, with a simple configuration.

Furthermore, in this embodiment, as illustrated in FIG. 8, the valve body 80 is arranged not to cover a part of the circulation space S3, but may be arranged to cover the entire circulation space S3. In addition, the valve body 80 is arranged to cover the entire groove portion 77, but may be arranged not to cover at least a part of the groove portion 77.

As described above, the power storage module 12 of this embodiment includes the laminated body 30 in which the plurality of bipolar electrodes 32 each including the electrode plate 34, the positive electrode 36 provided on one surface of the electrode plate 34, and the negative electrode 38 provided on the other surface of the electrode plate, are laminated, the frame body 50 retaining the edge portion 34a of the electrode plate 34, in which the openings 50a communicated with the plurality of internal spaces V between the adjacent bipolar electrodes 32 in the laminated body 30, are provided, and the pressure adjustment valve 60 to be connected to the opening 50a. The pressure adjustment valve 60 includes the base member 70 to be connected to the opening 50a, in which the plurality of communication holes 74 respectively communicated with the plurality of internal spaces V through the opening 50a, are provided, the valve body 80 arranged to shut the opening ends 76a of the plurality of communication holes 74, positioned on a side opposite to the opening ends 75a on the opening 50a side, and the cover member 90 pressing the valve body 80 against the base member 70.

In the power storage module 12, the pressure adjustment valve includes the base member 70 in which the plurality of communication holes 74 are provided, the valve body 80, and the cover member 90, and thus, it is possible to execute the examination of the pressure adjustment valve 60 before the pressure adjustment valve 60 is connected to the opening 50a. For example, it is possible to confirm a pressure value when the blocking of the opening end 76a of the communication hole 74 by the valve body 80, is released, by sending air into the communication hole 74 from the opening ends 75a of each of the communication holes 74 of the base member 70. Therefore, according to the power storage module 12, it is possible to easily perform the examination of the pressure adjustment valve 60 (for example, examination for guaranteeing a valve opening pressure) before the pressure adjustment valve 60 is assembled.

In addition, the power storage module 12 includes a plurality of (in this embodiment, four) pressure adjustment valves 60. A plurality of (four) openings 50a (50a1 to 50a4) to which the pressure adjustment valves 60 are respectively connected, are provided in the frame body 50. The plurality of openings 50a are respectively communicated with the internal spaces V different from each other (in this embodiment, 14 sets of internal spaces V different from each other) for each of the openings 50a. Thus, the plurality of openings 50a are provided in the frame body 50, and thus, it is possible to reduce the number of internal spaces V communicated with one opening 50a (that is, the number of internal spaces V required for performing the pressure adjustment by one pressure adjustment valve 60, and the number of communication holes 74 required to be provided in one pressure adjustment valve 60), compared to a case where only one opening 50a is provided. Accordingly, it is possible to increase a sectional area of one communication hole 74 of the pressure adjustment valve 60, and to smoothly circulate air in the communication hole 74.

[Method for Manufacturing Power Storage Device]

Hereinafter, an example of a method for manufacturing the power storage module 12 illustrated in FIG. 2, will be described.

(Lamination Step)

First, for example, the plurality of bipolar electrodes 32 are laminated through the separator 40, and thus, the laminated body 30 is obtained. In this embodiment, the first resin portion 52, for example, is formed on the edge portion 34a of the electrode plate 34 of each of the bipolar electrodes 32, by injection molding or the like, before the lamination step. According to the lamination step, a configuration excluding the second resin portion 54 from the configuration illustrated in FIG. 2, is obtained.

(Frame Body Formation Step)

Figure 9:
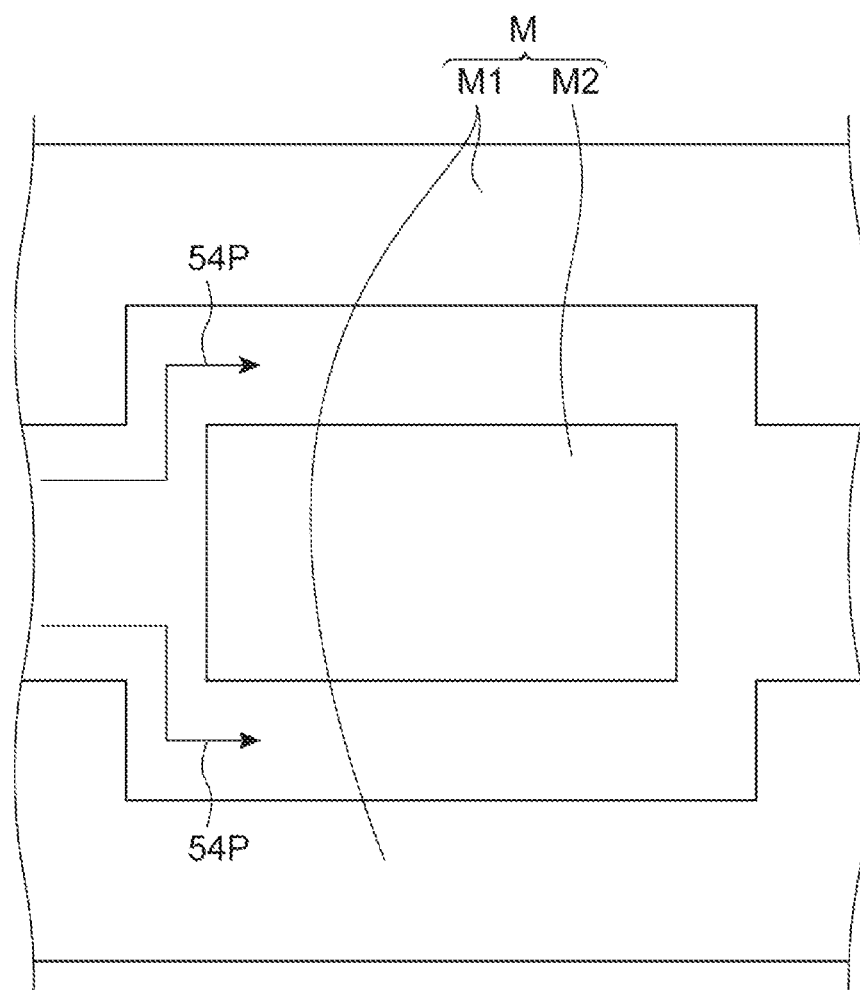
FIG. 9 is a schematic sectional view illustrating a frame body formation step in a method for manufacturing a power storage module.

Next, the second resin portion 54, for example, is formed by injection molding (refer to FIG. 2). As illustrated in FIG. 9, a resin material 54P of the second resin portion 54, having fluidity, flows in a mold M, and thus, the second resin portion 54 is formed. As a result thereof, as illustrated in FIG. 3 and FIG. 4, the frame body 50 including the first resin portion 52 and the second resin portion 54, is formed. The mold M includes a first portion M1 that forms an outer edge of the main body region 50s1 and the protruding region 50s2 on the lateral surface 50s of the frame body 50 (refer to FIG. 4), and a second portion M2 that is a nest for forming the second opening 54a of the opening 50a. The resin material 54P of the second resin portion 54 flows in a direction intersecting with the lamination direction D1 of the bipolar electrodes 32. For example, the resin material 54P of the second resin portion 54 flows between a pair of first portions M1 arranged to face each other, and then, runs into the second portion M2 to be divided into two along the periphery of the second portion M2. Two divided resin materials 54P of the second resin portion 54 flow between the first portion M1 and the second portion M2, and then, are joined together, and thus, flow between the pair of first portions M1.

Furthermore, in this embodiment, the first resin portion 52 that is a part of the frame body 50, is formed before the lamination step, and the second resin portion 54 that is a remnant of the frame body 50, is formed after the lamination step, but the first resin portion 52 that is a part of the frame body 50, may be formed after the lamination step.

(Electrolytic Solution Injection Step)

Next, the electrolytic solution is injected into the frame body 50 from the opening 50a provided in the frame body 50. The injection of the electrolytic solution is performed by using a dedicated jig or the like.

(Preparation Step)

Next, the pressure adjustment valve 60 is prepared. As described above, the pressure adjustment valve 60 is formed by assembling the base member 70, the valve body 80, and the cover member 90 to each other. Accordingly, the pressure adjustment valve 60 having a configuration in which the base member 70, the valve body 80, and the cover member 90 are integrated (unitized), is obtained.

(Examination Step)

Next, the pressure adjustment valve 60 is examined. Specifically, the operation of the pressure adjustment valve 60 is examined by sending air into each of the communication holes 74 from the opening ends 75a of each of the communication holes 74 provided in the base member 70. A manipulation of sending air into each of the communication holes 74 from each of the opening ends 75a, for example, may be performed by further using a dedicated jig or the like. In the examination step, the pressure value when the blocking of the opening end 76a by the valve body 80 is released, is confirmed for each of the communication holes 74. Then, the pressure value is compared with a pressure value set in advance. For example, in a case where an error between the pressure value and the pressure value set in advance, is less than or equal to an allowable error, a valve opening pressure of the valve body 80 with respect to the examined communication hole 74 is determined as normal. On the other hand, in a case where the error described above is greater than the allowable error, the valve opening pressure of the valve body 80 with respect to the examined communication hole 74 is determined as abnormal. According to the examination described above, in a case where the valve opening pressure of the valve body 80 with respect to all of the communication holes 74 is determined as normal, the examined pressure adjustment valve 60 is determined as normal. On the other hand, in a case where the valve opening pressure of the valve body 80 with respect to at least one of the communication holes 74 is determined as abnormal, the examined pressure adjustment valve 60 is determined as abnormal.

(Pressure Adjustment Valve Connection Step)

Next, the pressure adjustment valve 60 that has been examined and has been determined as normal in the examination step, is connected to the opening 50a of the frame body 50. Specifically, as described above, the portion 72 of the base member 70 is inserted into the second opening 54a. Then, a part or all of the contact portion between the lateral surface 71 and the lateral surface 52s of the first resin portion 52, for example, is welded by hot plate welding or the like. Accordingly, a state in which the pressure adjustment valve 60 is assembled to the opening 50a, is obtained. After that, as illustrated in FIG. 1, the plurality of power storage modules 12 are laminated through the conductive plate 14. The positive electrode terminal 24 and the negative electrode terminal 26 are respectively connected in advance to the conductive plates 14 positioned on both ends in the lamination direction D1. After that, the pair of binding plates 16A and 16B are respectively arranged on both ends in the lamination direction D1, through the insulating film 22. After that, the axis portion of the bolt 18 is inserted into an insertion hole 16A1 of the binding plate 16A, and is inserted into an insertion hole 16B1 of the binding plate 16B. After that, the nut 20 is screwed to the tip end of the bolt 18 protruding from the binding plate 16B. Thus, the power storage device 10 illustrated in FIG. 1, is manufactured.

As described above, the method for manufacturing a power storage module of this embodiment, includes the lamination step, the frame body formation step, the preparation step, the examination step, and the pressure adjustment valve connection step. In the method for manufacturing a power storage device, in the preparation step, the pressure adjustment valve 60 in which the base member 70, the valve body 80, and the cover member 90 are integrated, is prepared. Then, in the examination step, the operation of the pressure adjustment valve 60 is examined by sending air into each of the communication holes 74 from the opening ends 75a of each of the communication holes 74 of the base member 70. Thus, the pressure adjustment valve 60 includes the base member 70 in which the plurality of communication holes 74 are provided, the valve body 80, and the cover member 90, and thus, it is possible to execute the examination of the pressure adjustment valve 60 before the pressure adjustment valve 60 is connected to the opening 50a of the frame body 50. Therefore, according to the method for manufacturing a power storage device described above, it is possible to easily perform the examination of the pressure adjustment valve 60 (for example, the examination for guaranteeing the valve opening pressure) before the pressure adjustment valve 60 is assembled.

As described above, the details of the first embodiment have been described, but the configuration of the power storage module is not limited to the above description.

For example, in the embodiment described above, a configuration in which in each of the openings 50a, the plurality of first openings 52a are arranged point-symmetrically with respect to the center P1 of the second opening Ma when seen from the opening direction of the opening 50a (the X direction), has been described. However, the plurality of first openings 52a in each of the openings 50a may be arranged to be respectively included in the corresponding opening ends 75a of the base member 70 when seen from the connection direction D2, and it is not necessary that the plurality of first openings 52a are point-symmetrically arranged. For example, the arrangement of the first openings 52a, exemplified in the embodiment described above, may be suitably switched in the plurality of openings 50a. In the opening 50a1, the first opening 52a communicated with the internal space V2 may be provided instead of the first opening 52a communicated with the internal space V1, and in the opening 50a2, the first opening 52a communicated with the internal space V1 may be provided instead of the first opening 52a communicated with the internal space V2, as a specific example. In this case, the arrangement of the plurality of first openings 52a in each of the opening 50a1 and opening 50a2, is not the point-symmetric arrangement as described above, but all of the first openings 52a are arranged to be included in the corresponding opening ends 75a when seen from the connection direction D2.

In addition, the base member 70 may be one member that is integrally molded as with the first embodiment, or may be a plurality of members. For example, the base member 70 may be a member in which a plurality of members are joined to each other by welding or the like.

Second Embodiment

Next, the power storage device 10A including the power storage module 12A of the second embodiment, will be described. The power storage device 10A is the same as the power storage device 10, except that the power storage module 12A is provided instead of the power storage module 12. The power storage module 12A is the same as the power storage module 12, except that a pressure adjustment valve 160 is provided instead of the pressure adjustment valve 60.

Figure 10:
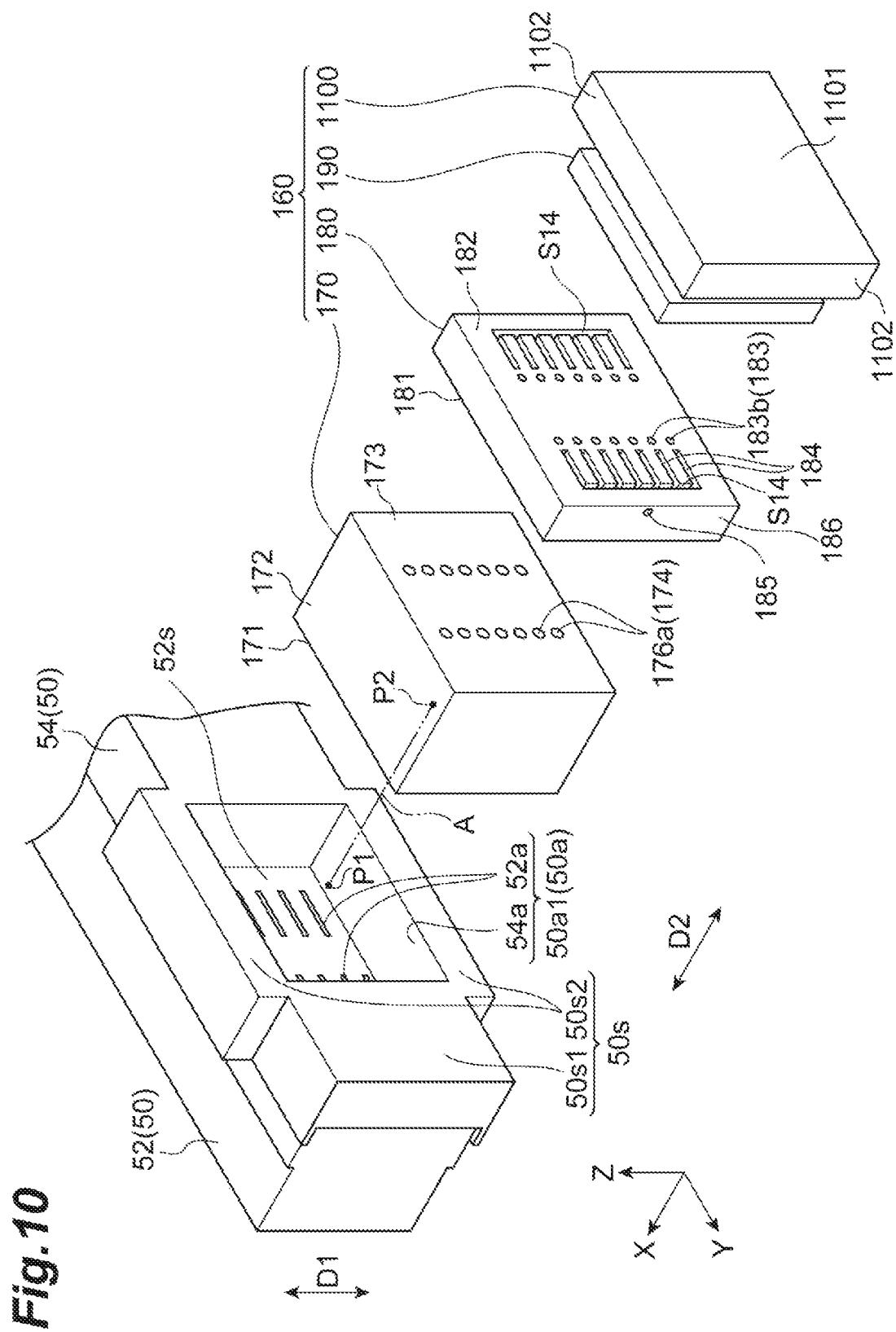
FIG. 10 is an exploded perspective view of the pressure adjustment valve to be connected to the opening of the frame body of the power storage module of the second embodiment.
Figure 11:
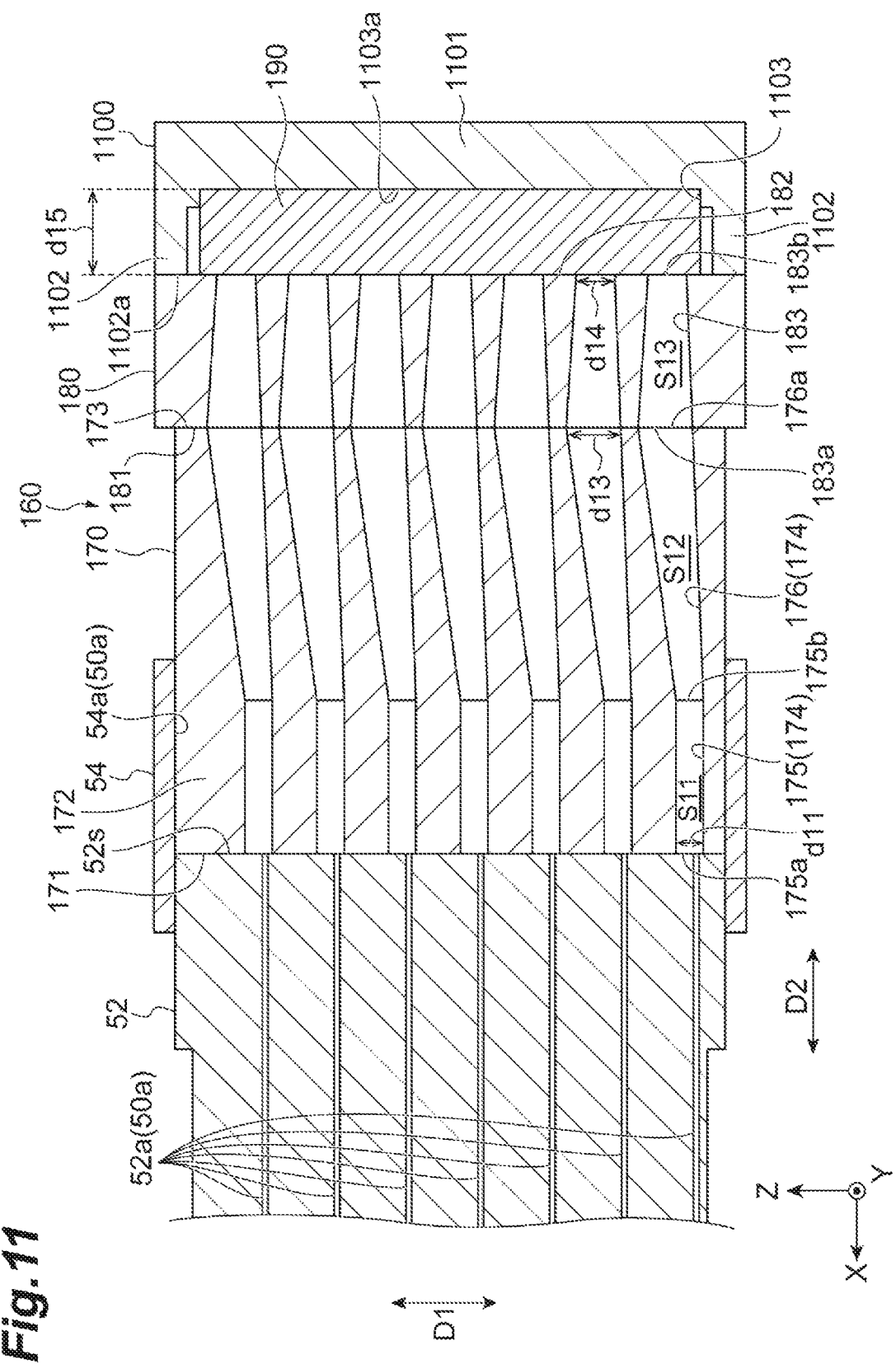
FIG. 11 is a schematic sectional view illustrating the configuration of the pressure adjustment valve.

FIG. 10 is an exploded perspective view of the pressure adjustment valve 160 to be connected to the opening 50a of the frame body 50. In addition, FIG. 11 is a schematic sectional view illustrating the configuration of the pressure adjustment valve 160. Specifically, FIG. 11 is a sectional view including the sectional surfaces of seven first openings 52a (the first openings 52a communicated with the internal space V1, V9, V17, V25, V33, V41, and V49) arranged in the first column of the opening 50a1. As illustrated in FIG. 10 and FIG. 11, the pressure adjustment valve 160 includes a first base member 170, a second base member 180, a valve body 190 (the elastic member), and a cover member 1100 (the pressing member).

The first base member 170 has an approximately rectangular parallelepiped outer shape, and for example, is formed of polypropylene (PP), polyphenylene sulfide (PPS), modified polyphenylene ether (modified PPE), or the like. The first base member 170 is connected to the opening 50a. Specifically, a portion 172 including a lateral surface 171 (the first lateral surface) of the first base member 170 facing the opening 50a, has a shape corresponding to that of the second opening 54a. The first base member 170 is fixed to the opening 50a by welding a part or all of a contact portion between the lateral surface 171 and the lateral surface 52s of the first resin portion 52, in a state where the portion 172 is inserted into the second opening 54a. The welding between the lateral surface 171 and the lateral surface 52s, for example, is performed by hot plate welding, laser transmission welding, ultrasonic welding, and the like.

FIG. 12(A) is a plan view illustrating the lateral surface 171, and FIG. 12(B) is a plan view illustrating a lateral surface 173 (the second lateral surface) of the first base member 170 facing the second base member 180. As illustrated in FIG. 11 and FIG. 12, a plurality of (here, 14) first communication holes 174 penetrating through the lateral surface 173 from the lateral surface 171, are provided in the first base member 170. Each of the first communication holes 174 is communicated with one internal space V, through one corresponding first opening 52a. The first communication hole 174 includes a first communication portion 175 that is a portion of the first communication hole 174 on the lateral surface 171 side, and a second communication portion 176 that is a portion of the first communication hole 174 on the lateral surface 173 side.

A sectional surface of the first communication portion 175 is formed into the shape of a rectangle. An approximately rectangular parallelepiped space S11 is formed by the first communication portion 175. An opening end 175a of the first communication portion 175 on the opening 50a side, is formed to have a size including the rectangular first opening 52a when seen from the connection direction D2 between the opening 50a and the first base member 170 (the X direction). On the other hand, a sectional surface of an opening end 175b of the first communication portion 175 on a side connected to the second communication portion 176, is formed into the shape of a circle. An inner diameter of the opening end 175b is the same as a width d11 of the opening end 175a in the lamination direction D1.

Here, the position of each of the first openings 52a provided in the same relative position (the same column and the same row) of the openings 50a1 to 50a4, as described above, is shifted by one stage. For example, the arrangement of the first opening 52a of the opening 50a1 communicated with the internal space V1, the first opening 52a of the opening 50a2 communicated with the internal space V2, the first opening 52a of the opening 50a3 communicated with the internal space V3, and the first opening 52a of the opening 50a4 communicated with the internal space V4, is shifted by one stage. For this reason, even in a case where the first base member 170 of the pressure adjustment valve 160 is connected to any one of the openings 50a1 to 50a4, it is necessary to communicate each of the first communication portions 175 with the corresponding first opening 52a such that the pressure adjustment valve 160 of the same standard (a common shape) can be used with respect to all of the openings 50a1 to 50a4. Specifically, it is necessary that the first communication portion 175 communicated with the first opening 52a corresponding to the internal space V1 when the first base member 170 is connected to the opening 50a1, is communicated with the first opening 52a corresponding to each of the internal spaces V2 to V4, when the first base member 170 is connected to the openings 50a2 to 50a4.

Therefore, in this embodiment, the width d11 of the opening end 175a in the lamination direction D1, is set to be greater than or equal to a multiplication value of a width of one structure repeated in the laminated body 30 (that is, the shift width of one stage, described above) and the number of openings 50a. The width of one structure repeated in the laminated body 30, is the width d2 (refer to FIG. 2) of the portion in which one electrode plate 34 and one internal space V are combined, in the lamination direction D1. That is, as described above, in a case where the first openings 52a in each of the openings 50a are arranged (more specifically, in a case where the first openings 52a in each of the openings 50a are arranged such that the maximum value of a step between the first openings 52a arranged in relative positions corresponding to each other between the openings 50a, is as small as possible), the multiplication value described above (in this embodiment, "d2×4") indicates a width necessary for including a range (a range in the lamination direction D1) in which a plurality of (here, four) first openings 52a arranged in the same relative position, can be formed. Then, in this embodiment, a relationship of "d11≥d2×4" is established. Accordingly, even in a case where the first base member 170 is connected to any opening 50a, each of the first communication portions 175 can be arranged such that the first opening 52a corresponding to the opening end 175a falls within the opening end 175a of each of the first communication portions 175 when seen from the connection direction D2. As a result thereof, the same first base member 170 (the pressure adjustment valve 160) can be used with respect to any one of the openings 50a1 to 50a4. Accordingly, it is possible to reduce the number of components. In addition, it is not necessary to use the pressure adjustment valve 160 of a standard different for each of the openings 50a, and thus, it is also possible to prevent the occurrence of misassembly such as connecting the pressure adjustment valve 160 of a standard not suitable for the opening 50a.

Further, As illustrated in FIG. 12(A), a plurality of opening ends 175a are arranged point-symmetrically with respect to the axis A (refer to FIG. 10) orthogonal to the lateral surface 171 through the center P2 of the lateral surface 171. In addition, the portion 172 of the first base member 170 to be connected to the opening 50a, is formed point-symmetrically with respect to the axis A. In addition, the center P1 described above (the center of the second opening 54a when seen from the opening direction of the opening 50a), is positioned on the axis A. According to such a configuration, in both of two states (postures) of the first base member 170 in an inversion relationship with respect to the axis A, relative arrangement of the plurality of opening ends 175a with respect to the opening 50a is the same. For this reason, in both of two states described above, it is possible to normally connect the first base member 170 to the opening 50a. That is, even in a case where the first base member 170 illustrated in FIG. 10, is inverted up and down (is rotated around the axis A by 180 degrees), it is possible to normally connect the first base member 170 to the opening 50a. As a result thereof, it is possible to easily perform the connection of the first base member 170 with respect to the opening 50a. In addition, it is possible to prevent the occurrence of misassembly such as connecting the first base member 170 to the opening 50a in an incorrect direction.

A sectional surface of the second communication portion 176 is formed into the shape of a circle. The second communication portion 176 penetrates through an opening end 176a of the second communication portion 176 on the lateral surface 173 side, from the opening end 175b of the first communication portion 175. The opening end 176a is formed into the shape of a circle. An inner diameter d13 of the opening end 176a is greater than the inner diameter of the opening end 175b (that is, the width d11 of the opening end 175a in the lamination direction D1) (d13>d11). That is, a space S12 in a tapered shape in which an inner diameter increases from the opening end 175b to the opening end 176a, is formed by the second communication portion 176. Such a second communication portion 176, for example, can be formed by injection molding or the like.

In addition, in this embodiment, as illustrated in FIG. 11, second communication portions 176 to be connected to seven first openings 52a in the first column, extend such that the center position of the opening end 176a is positioned on an upper side from the center position of the opening end 175b. On the other hand, the second communication portions 176 to be connected to seven first openings 52a in the second column, extend such that the center position of the opening end 176a is positioned on a lower side from the center position of the opening end 175b. As a result thereof, as illustrated in FIG. 12(B), a plurality of opening ends 176a approach the central position of the lateral surface 173.

The second base member 180 has an approximately rectangular parallelepiped outer shape, and is joined to the lateral surface 173 of the first base member 170 on a lateral surface 181 on one side. The lateral surface 181 and the lateral surface 173, for example, can be welded to each other by hot plate welding. Furthermore, in this embodiment, the second base member 180 is formed to be slightly larger than the first base member 170 when seen from the connection direction D2, but the second base member 180 may be formed to have the same size as that of the first base member 170, or may be formed to be smaller than the first base member 170.

FIG. 13(A) is a plan view illustrating the lateral surface 181, and FIG. 13(B) is a plan view illustrating a lateral surface 182 (the second lateral surface) of the second base member 180 facing the valve body 190. As illustrated in FIG. 11 and FIG. 13, a plurality of (here, 14) second communication holes 183 penetrating through the lateral surface 182 from the lateral surface 181, are provided in the second base member 180. A sectional surface of the second communication hole 183 is formed into the shape of a circle. Each of the second communication holes 183 is communicated with one internal space V, through one corresponding first communication hole 174. An inner diameter of an opening end 183a of the second communication hole 183 on the first base member 170 side, is coincident with the inner diameter d13 of the opening end 176a of the first communication hole 174. The first base member 170 and the second base member 180 are joined to each other such that the opening end 176a and the opening end 183a corresponding to each other, overlap with each other when seen from the connection direction D2. An inner diameter d14 of an opening end 183b of the second communication hole 183 on the valve body 190 side, is less than the inner diameter of the opening end 183a (that is, the inner diameter d13 of the opening end 176a) (d14<d13). That is, a space S13 in a tapered shape in which an inner diameter decreases from the opening end 183a to the opening end 183b, is formed by the second communication hole 183. Such a second communication hole 183, for example, can be formed by injection molding or the like. Furthermore, the inner diameter of the opening end 183a may not be coincident with the inner diameter d13 of the opening end 176a. For example, in a case where the inner diameter of the opening end 183a is less than the inner diameter d13, it is possible to obtain an effect of allowing a positional shift at the time of joining.

As illustrated in FIG. 12(B) and FIG. 13(A), all of a plurality of opening ends 176a and a plurality of opening ends 183a are arranged point-symmetrically with respect to the axis A. According to such a configuration, in both of two states (postures) of the first base member 170 (or the second base member 180) in an inversion relationship with respect to the axis A, the arrangement of the plurality of opening ends 183a with respect to the plurality of opening ends 176a is the same. For this reason, in both of two states described above, it is possible to normally join the second base member 180 to the first base member 170. That is, even in a case where the second base member 180 is inverted up and down (is rotated around the axis A by 180 degrees) with respect to the first base member 170, it is possible to normally join the second base member 180 to the first base member 170. As a result thereof, it is possible to easily perform the joining of the second base member 180 with respect to the first base member 170. In addition, it is possible to prevent the occurrence of misassembly such as joining the second base member 180 to the first base member 170 in an incorrect direction.

The valve body 190, for example, is formed of an elastic member such as rubber. The valve body 190, for example, is in the shape of a rectangular parallelepiped. The valve body 190 is arranged to shut the plurality of opening ends 183b provided in the second base member 180.

The cover member 1100 is a box-like member including a rectangle plate-like bottom wall portion 1101, and a lateral wall portion 1102 erected to an edge portion of the bottom wall portion 1101. The cover member 1100, for example, is formed of polypropylene (PP), polyphenylene sulfide (PPS), modified polyphenylene ether (modified PPE), or the like. A groove portion 1103 that is indented into a concave shape in order to position the valve body 190, is provided inside the bottom wall portion 1101. The cover member 1100 contains the valve body 190 in the groove portion 1103, and functions as the pressing member for pressing the valve body 190 against the lateral surface 182 of the second base member 180. Specifically, as illustrated in FIG. 11, in a state where the valve body 190 is positioned and contained in the groove portion 1103 of the cover member 1100, an end portion 1102a of the lateral wall portion 1102 is fixed to the lateral surface 182 of the second base member 180. A method of fixing end portion 1102a and the lateral surface 182 to each other, is not particularly limited, and for example, laser welding, hot plate welding, fastening using a fastening member such as a bolt, or the like, can be used. For example, in a case of using the laser welding, the cover member 1100 is formed of a laser transmissive resin, the second base member 180 is formed of a laser absorbing resin, and a laser is emitted from the cover member 1100 side, and thus, a boundary portion of the second base member 180 with respect to the cover member 1100, can be melted, and the second base member 180 can be joined to the cover member 1100.

Here, the thickness of the valve body 190 at the normal time (at the time of being uncompressed) (the width in the X direction) is greater than a height d15 from a bottom surface 1103a of the groove portion 1103 to the end portion 1102a of the lateral wall portion 1102. That is, a compression rate of the valve body 190 is defined by the height d15. For example, the compression rate of the valve body 190 is adjusted in advance such that the blocking of the opening end 183b of the second communication hole 183 by the valve body 190, is released in a case where a pressure in the second communication hole 183 (that is, a pressure in the internal space V communicated with the second communication hole 183) is greater than or equal to a setting value set in advance.

As illustrated in FIG. 13(B) and FIG. 14(A), groove portions 184 respectively corresponding to the opening ends 183b are provided on the lateral surface 182 side of the second base member 180. Each of the groove portions 184 is formed into the shape of a slit extending in the direction orthogonal to the lamination direction D1 (the X direction and the Y direction). Each of the groove portions 184 is provided in a position outside the corresponding opening end 183b, in the direction orthogonal to the lamination direction D1 and the connection direction D2 (the Y direction).

Subsequently, the principle of the pressure adjustment of the internal space V, will be described. As described above, each of the second communication holes 183 is communicated with the corresponding internal space V, and thus, a pressure equivalent to that of the internal space V corresponding to the second communication hole 183, is applied to a portion of the valve body 190 blocking the opening end 183b of the second communication hole 183. Here, the compression rate of the valve body 190, or the like is defined such that the blocking of the opening end 183b by the valve body 190, is released in a case where the pressure in the corresponding internal space V is greater than or equal to the setting value set in advance. For this reason, in a case where the pressure in the corresponding internal space V is less than the setting value, as illustrated in FIG. 14(A), the valve closed state in which the opening end 183b is blocked by the valve body 190, is maintained.

On the other hand, in a case where the pressure in the corresponding internal space V increases to be greater than or equal to the setting value, as illustrated in FIG. 14(B), a part of the valve body 190 (specifically, a portion blocking the opening end 183b, and a peripheral portion thereof) is modified to be separated from the lateral surface 182, and thus, the valve opened state in which the blocking of the opening end 183b is released. As a result thereof, the opening end 183b of which the blocking is released, is communicated with the groove portion 184 corresponding to the said opening end 183b, and gas in the corresponding internal space V is discharged to the groove portion 184 from the said opening end 183b. After that, in a case where the pressure in the internal space V is less than the setting value, the valve body 190 returns to the original state, and thus, the said opening end 183b is again in the valve closed state (refer to FIG. 14(A)). According to such an opening and closing operation described above, the pressure adjustment valve 160 suitably adjusts the pressure in the internal space V.

Here, as illustrated in FIG. 13(B), a distance d16 between the opening end 183b and the groove portion 184 corresponding to the said opening end 183b, is shorter than a distance d17 between the said opening end 183b and other opening end 183b adjacent to the said opening end 183b (d16<d17). Accordingly, in a case where a part of the valve body 190 is separated from the lateral surface 182 in accordance with an increase in the pressure of the internal space V, it is possible to communicate the said opening end 183b with the groove portion 184 corresponding to the said opening end 183b without communicating the said opening end 183b of the second communication hole 183 communicated with the internal space V, with another opening end 183b adjacent to the said opening end 183b (that is, the opening end 183b of the second communication hole 183 communicated with another internal space V). As a result thereof, when the pressure adjustment is performed by the pressure adjustment valve 160, it is possible to suitably prevent interference (the inflow and the outflow of gas, or the like) between the internal spaces V different from each other.

In addition, as illustrated in FIG. 13(B) and FIG. 14(A), a circulation space S14 that is connected to a plurality of (here, seven) groove portions 184, and circulates the gas discharged from the internal space V, is partitioned in the second base member 180 when seen from a direction facing the lateral surface 182 (the X direction). The circulation space S14 is formed into an approximately rectangular parallelepiped shape. The circulation space S14 extends in the lamination direction D1 in order to connect outer end portions of seven groove portions 184 arrayed along the lamination direction D1 when seen from the direction facing the lateral surface 182. The plurality of groove portions 184 and the circulation space S14, for example, are formed by injection molding or the like. In addition, an exhaust port 185 communicating the circulation space S14 with the outside, is provided in the second base member 180. In this embodiment, an outer opening end of the exhaust port 185 is provided on the lateral surface 186 directed towards a direction orthogonal to the connection direction D2 of the second base member 180 (in this embodiment, the Y direction as an example). According to such a configuration, the gas discharged to one groove portion 184 in accordance with an increase in the pressure of the internal space V, flows in the circulation space S14 commonly provided in the plurality of groove portions 184, and is discharged to the outside from the exhaust port 185. Therefore, it is possible to suitably discharge the gas generated in the internal space V, to the outside, with a simple configuration.

Furthermore, in this embodiment, as illustrated in FIG. 14, the valve body 190 is arranged not to cover a part of the circulation space S14, but may be arranged to cover the entire circulation space S14. In addition, the valve body 190 is arranged to cover the entire groove portion 184, but may be arranged not to cover at least a part of the groove portion 184.

As described above, the power storage module 12A of this embodiment includes the laminated body 30 in which the bipolar electrodes 32 including the electrode plate 34, the positive electrode 36 provided on one surface of the electrode plate 34, and the negative electrode 38 provided on the other surface of the electrode plate 34, are laminated, the frame body 50 retaining the edge portion 34a of the electrode plate 34, in which the openings 50a communicated with the plurality of internal spaces V between the adjacent bipolar electrodes 32 in the laminated body 30, are provided, and the pressure adjustment valve 160 to be connected to the opening 50a. The pressure adjustment valve 160 includes the first base member 170 to be connected to the opening 50a, in which the plurality of first communication holes 174 respectively communicated with the plurality of internal spaces V through the opening 50a, are provided, the second base member 180 to be joined to the lateral surface 173 of the first base member 170, in which the plurality of second communication holes 183 respectively communicated with the plurality of first communication holes 174, are provided, the valve body 190 arranged to shut the opening ends 183b of the plurality of second communication holes 183, positioned on a side opposite to the opening 50a side, and the cover member 1100 pressing the valve body 190 against the second base member 180.

In the power storage module 12A, it is possible to perform the liquid injection of the electrolytic solution with respect to each of the internal spaces V, by using the first base member 170 in which the plurality of first communication holes 174 respectively communicated with the plurality of internal spaces V, are provided. Specifically, when the power storage module 12A is manufactured, the first base member 170 is connected to the opening 50a before the first base member 170 is joined to the second base member 180, and thus, it is possible to perform the liquid injection of the electrolytic solution with respect to each of the internal spaces V through each of the first communication holes 174. In addition, it is also possible to execute the examination of the pressure adjustment valve 160, by using the second base member 180 in which the plurality of second communication holes 183 are provided. Specifically, it is possible to perform the examination with respect to a unit including the second base member 180, the valve body 190, and the cover member 1100 (a pressure adjustment valve submodule). For example, it is possible to confirm the pressure value when the blocking of the opening end 183b of the second communication hole 183 by the valve body 190, is released, by sending air into the second communication hole 183 from the opening ends 183a of each of the second communication holes 183 of the second base member 180. Therefore, according to the power storage module 12A, it is possible to improve the operability of the liquid injection of the electrolytic solution, and to easily perform the examination of the pressure adjustment valve 160 (for example, the examination for guaranteeing the valve opening pressure) before the pressure adjustment valve 160 is assembled.

In addition, the power storage module 12A includes a plurality of (in this embodiment, four) pressure adjustment valves 160. A plurality of (four) openings 50a (50a1 to 50a4) to which the pressure adjustment valves 160 are respectively connected, are provided in the frame body 50. The plurality of openings 50a are respectively communicated with the internal spaces V different from each other (in this embodiment, 14 sets of internal spaces V different from each other) for each of the openings 50a. Thus, the plurality of openings 50a are provided in the frame body 50, and thus, it is possible to reduce the number of internal spaces V communicated with one opening 50a (that is, the number of internal spaces V required for performing the pressure adjustment by one pressure adjustment valve 160, and the number of first communication holes 174 and second communication holes 183 required to be provided in one pressure adjustment valve 160), compared to a case where only one opening 50*a* is provided. Accordingly, it is possible to increase a sectional area of one first communication hole 174 and one second communication hole 183 of the pressure adjustment valve 160, and to smoothly circulate air in the communication holes.

In addition, as illustrated in FIG. 11, the second communication portion 176 (a portion on the second base member 180 side) of the first communication hole 174 is formed in a tapered shape in which the sectional area increases from the opening 50*a* side to the second base member 180 side. On the other hand, the second communication hole 183 is formed in a tapered shape in which the sectional area decreases from the first base member 170 side to the valve body 190 side. The tapered shape as described above is adopted, and thus, it is possible to perform the molding of the second communication portion 176 (the first communication hole 174) and the second communication hole 183 by injection molding or the like. In addition, a flow path from the internal space V to the valve body 190 side (a flow path formed by the second communication portion 176 and the second communication hole 183) is provided such that a sectional area decreases after increasing once, and thus, it is possible to suppress a pressure loss, and to smoothly circulate the gas in the communication hole (the first communication hole 174 and the second communication hole 183).

In addition, an opening area (an area of a circle having an inner diameter of d14) of the opening end 183*b* of the second communication hole 183 is greater than an opening area (an area of a circle having an inner diameter of d11) of the opening end (that is, opening end 175*b*) of the portion of the first communication hole 174 on the opening 50*a*, formed in the tapered (that is, the second communication portion 176). That is, in this embodiment, "d14>d11" is established. According to such a configuration, in the flow path from the internal space V to the valve body 190 side, a sectional area on an outlet side is greater than a sectional area on an inlet side, and thus, it is possible to more effectively suppress a pressure loss.

Furthermore, in this embodiment, the second communication hole 183 is formed into a tapered shape in which the sectional area decreases from the first base member 170 side to the valve body 190 side, such that an opening width widened by the second communication portion 176 is narrowed in order to adjust the size of the opening end 183*b*. However, in a case where the opening width spatially widened by the second communication portion 176, is allowed to be further widened, the second communication hole 183 may be formed into a tapered shape in which the sectional area increases from the first base member 170 side to the valve body 190 side. Even in such a case, it is possible to perform the molding of the second communication hole 183 by injection molding or the like. In addition, the sectional area of the flow path from the internal space V to the valve body 190 side is set to increase from the inlet side to the outlet side, and thus, it is possible to more effectively suppress a pressure loss.

In addition, the width (the inner diameter d13) of the opening end 176*a* of the first communication hole 174 on the second base member 180 side in the lamination direction D1, is greater than the width d11 of the opening end 175*a* of the first communication hole 174 on the opening 50*a* side in the lamination direction D1. According to such a configuration, it is possible to suitably ensure an opening width (the inner diameter d13) of a joint portion between the first communication hole 174 and the second communication hole 183. Accordingly, for example, in a case where the first base member 170 and the second base member 180 are joined to each other by heat (for example, hot plate welding), it is possible to prevent the opening of the joint portion described above from being blocked.

[Method for Manufacturing Power Storage Device]

Hereinafter, an example of a method for manufacturing the power storage module 12A illustrated in FIG. 2, will be described.

(Lamination Step)

First, for example, the bipolar electrodes 32 are laminated through the separator 40, and thus, the laminated body 30 is obtained. In this embodiment, the first resin portion 52, for example, is formed on the edge portion 34*a* of the electrode plate 34 of each of the bipolar electrodes 32, by injection molding or the like, before the lamination step. According to the lamination step, a configuration excluding the second resin portion 54 from the configuration illustrated in FIG. 2, is obtained.

(Frame Body Formation Step)

Next, the second resin portion 54, for example, is formed by injection molding (refer to FIG. 2). As illustrated in FIG. 9, the resin material 54P of the second resin portion 54, having fluidity, flows in the mold M, and thus, the second resin portion 54 is formed. As a result thereof, as illustrated in FIG. 3 and FIG. 4, the frame body 50 including the first resin portion 52 and second resin portion 54, is formed. The mold M includes the first portion M1 that forms the outer edge of the main body region 50*s*1 and the protruding region 50*s*2 on the lateral surface 50*s* of the frame body 50 (refer to FIG. 4), and the second portion M2 that is a nest for forming the second opening 54*a* of the opening 50*a*. The resin material 54P of the second resin portion 54 flows in the direction intersecting with lamination direction D1 of the bipolar electrode 32. For example, the resin material 54P of the second resin portion 54 flows between the pair of first portions M1 arranged to face each other, and then, runs into the second portion M2 to be divided into two along the periphery of the second portion M2. Two divided resin materials 54P of the second resin portion 54 flow between the first portion M1 and the second portion M2, and then, are joined together, and thus, flow between the pair of first portions M1.

Furthermore, in this embodiment, the first resin portion 52 that is a part of the frame body 50, is formed before the lamination step, and the second resin portion 54 that is a remnant of the frame body 50, is formed after the lamination step, but the first resin portion 52 that is a part of the frame body 50, may be formed after the lamination step.

(First Base Member Connection Step)

Next, the first base member 170 is connected to the opening 50*a*. Specifically, as described above, the portion 172 of the first base member 170 is inserted into the second opening 54*a*. Then, a part or all of the contact portion between the lateral surface 171 and the lateral surface 52*s* of the first resin portion 52, for example, is welded by hot plate welding, laser transmission welding, ultrasonic welding, and the like. Accordingly, the first base member 170 is fixed to the opening 50*a*.

(Electrolytic Solution Injection Step)

Next, as illustrated in FIG. 15(A), the electrolytic solution is injected into each of a plurality of internal spaces V (in this embodiment, 14 internal spaces V communicated with the opening 50*a* to which the first base member 170 is connected), through the plurality of first communication holes 174 provided in the first base member 170. The liquid injection is performed while managing a liquid amount for each of the first communication holes 174, and thus, it is possible to manage a liquid amount for each of the internal spaces V. In addition, in order to examine that each of the internal spaces V in the power storage module 12A is reliably sealed, before the electrolytic solution is injected, vacuuming (an operation of purging air) may be performed with respect to each of the internal spaces V through the plurality of first communication holes 174. Accordingly, it is possible to examine the airtightness of each of the internal spaces V, before the liquid injection of the electrolytic solution. Furthermore, the injection of the electrolytic solution through the first base member 170, may be performed by further using a dedicated jig or the like.

(Preparation Step)

Next, the pressure adjustment valve submodule that is a unit including the second base member 180, the valve body 190, and the cover member 1100, is prepared. As described above, the pressure adjustment valve submodule is formed by assembling the second base member 180, the valve body 190, and the cover member 1100 to each other.

(Examination Step)

Next, as illustrated in FIG. 15(B), a pressure adjustment valve submodule SM prepared in the preparation step, is examined. Accordingly, it is possible to whether or not a function as the pressure adjustment valve 160 is normally exhibited after being assembled. Specifically, the operation of the pressure adjustment valve submodule SM is examined by sending air into each of the second communication holes 183 from the opening ends 183a of each of the second communication holes 183 provided in the second base member 180. A manipulation of sending air into each of the second communication holes 183 from each of the opening ends 183a, for example, may be performed by further using a dedicated jig or the like. In the examination step, the pressure value when the blocking of the opening end 183b by the valve body 190, is released, is confirmed for each of the second communication holes 183. Then, the pressure value is compared with a pressure value set in advance. For example, in a case where an error between the pressure value and the pressure value set in advance, is less than an allowable error, a valve opening pressure of the valve body 190 with respect to the examined second communication hole 183 is determined as normal. On the other hand, in a case where the error described above is greater than the allowable error, the valve opening pressure of the valve body 190 with respect to the examined second communication hole 183 is determined as abnormal. According to the examination described above, in a case where the valve opening pressure of the valve body 190 with respect to all of the second communication holes 183 is determined as normal, the examined pressure adjustment valve submodule SM is determined as normal. On the other hand, in a case where the valve opening pressure of the valve body 190 with respect to at least one second communication hole 183 is determined as abnormal, the examined pressure adjustment valve submodule SM is determined as abnormal.

(Joining Step)

Next, the first base member 170, and the second base member 180 of the pressure adjustment valve submodule SM that has been examined and has been determined as normal in the examination step, are joined to each other such that the plurality of first communication holes 174 and the plurality of second communication holes 183 are communicated with each other. Specifically, the lateral surface 181 of the second base member 180 and the lateral surface 173 of the first base member 170, for example, are welded to each other by hot plate welding. Accordingly, a state in which the pressure adjustment valve 160 is assembled to the opening 50a, is obtained. After that, as illustrated in FIG. 1, the plurality of power storage modules 12A are laminated through the conductive plate 14. The positive electrode terminal 24 and the negative electrode terminal 26 are respectively connected in advance to the conductive plates 14 positioned on both ends in the lamination direction D1. After that, the pair of binding plates 16A and 16B are respectively arranged on both ends in the lamination direction D1, through the insulating film 22. After that, the axis portion of the bolt 18 is inserted into the insertion hole 16A1 of the binding plate 16A, and is inserted into the insertion hole 16B1 of the binding plate 16B. After that, the nut 20 is screwed to the tip end of the bolt 18 protruding from the binding plate 16B. Thus, the power storage device 10A illustrated in FIG. 1, is manufactured.

As described above, the method for manufacturing a power storage module of this embodiment, includes the lamination step, the frame body formation step, the first base member connection step, the electrolytic solution injection step, the pressure adjustment valve submodule preparation step, the examination step, and the joining step. In the method for manufacturing a power storage device, in the electrolytic solution injection step, it is possible to perform the liquid injection of the electrolytic solution with respect to each of the internal spaces V, by using the first base member 170. In addition, in the examination step, the examination with respect to the pressure adjustment valve submodule SM is executed, and thus, it is possible to examine the function as the pressure adjustment valve 160. Therefore, according to method for manufacturing a power storage device described above, it is possible to improve the operability of the liquid injection of the electrolytic solution, and to easily perform the examination of the pressure adjustment valve 160 (specifically, the examination of the pressure adjustment valve submodule SM) before the pressure adjustment valve 160 is assembled.

As described above, the details of the second embodiment have been described, but the configuration of the power storage module is not limited to the embodiment described above.

For example, in the embodiment described above, a configuration in which in each of the openings 50a, the plurality of first openings 52a are point-symmetrically with respect to the center P1 of the second opening 54a when seen from the opening direction of the opening 50a (the X direction), has been described. However, the plurality of first openings 52a in each of the openings 50a may be arranged to be respectively included in the corresponding opening ends 175a of the first base member 170 when seen from the connection direction D2, and it is not necessary that the plurality of first openings 52a are point-symmetrically arranged. For example, the arrangement of the first openings 52a, exemplified in the embodiment described above, may be suitably switched in the plurality of openings 50a. In the opening 50a1, the first opening 52a communicated with the internal space V2 may be provided instead of the first opening 52a communicated with the internal space V1, and in the opening 50a2, the first opening 52a communicated with the internal space V1 may be provided instead of the first opening 52a communicated with the internal space V2, as a specific example. In this case, the arrangement of the plurality of first openings 52a in each of the opening 50a1 and the opening 50a2, is not the point-symmetric arrangement as described above, but all of the first openings 52a are arranged to be included in the corresponding opening ends 175a when seen from the connection direction D2.

Third Embodiment

Next, the power storage device 10B including the power storage module 12B of the third embodiment, will be described. The power storage device 10B is the same as the power storage device 10, except that the power storage module 12B is provided instead of the power storage module 12.

The power storage module 12B will be described with reference to FIG. 16. The power storage module 12B illustrated in FIG. 16, includes the laminated body 30 in which the plurality of bipolar electrodes 32 are laminated. The laminated body 30, for example, is in the shape of a rectangle when seen from the lamination direction of the bipolar electrode 32. The separator 40 can be arranged between the adjacent bipolar electrodes 32.

Each of the bipolar electrodes 32 includes the electrode plate 34, the positive electrode 36 provided on a first surface 34c of the electrode plate 34, and the negative electrode 38 provided on a second surface 34d of the electrode plate 34. In the laminated body 30, the positive electrode 36 of one bipolar electrode 32 faces the negative electrode 38 of one adjacent bipolar electrode 32 in the lamination direction through the separator 40, and the negative electrode 38 of one bipolar electrode 32 faces the positive electrode 36 the other adjacent bipolar electrode 32 in the lamination direction through the separator 40.

In the lamination direction, the electrode plate 34 in which the negative electrode 38 is arranged on an inner lateral surface (a surface on a lower side in the drawing), is arranged on one end of the laminated body 30. This electrode plate 34 corresponds to a terminal electrode on the negative electrode side. In the lamination direction, the electrode plate 34 in which the positive electrode 36 is arranged on an inner lateral surface (a surface on an upper side in the drawing), is arranged on the other end of the laminated body 30. This electrode plate 34 corresponds to a terminal electrode on the positive electrode side. The negative electrode 38 of the terminal electrode on the negative electrode side, faces the positive electrode 36 of the bipolar electrode 32 on the uppermost layer through the separator 40. The positive electrode 36 of the terminal electrode on the positive electrode side, faces the negative electrode 38 of the bipolar electrode 32 on the lowermost layer through the separator 40. The electrode plates 34 of the terminal electrodes are respectively connected to the adjacent conductive plates 14 (refer to FIG. 1).

The power storage module 12B includes a tubular resin portion 250 (the seal portion) that extends in the lamination direction of the bipolar electrode 32, and contains the laminated body 30. The resin portion 250 retains the circumferential edge portions 34a of a plurality of electrode plates 34. The resin portion 250 is configured to surround the laminated body 30. The resin portion 250, for example, is in the shape of a rectangle when seen from the lamination direction of the bipolar electrode 32. That is, the resin portion 250, for example, is in the shape of a square tube.

The resin portion 250 includes a first seal portion 252 that is joined to the circumferential edge portion 34a of the electrode plate 34, and retains the circumferential edge portion 34a, and a second seal portion 254 that is provided outside the first seal portion 252 in a direction intersecting with the lamination direction (the X direction and the Y direction). The second seal portion 254 is provided in a state of being sealed with the first seal portion 252.

The first seal portion 252 configuring an inner wall of the resin portion 250, is provided over the entire circumference of the circumferential edge portion 34a of the electrode plate 34 in the plurality of bipolar electrodes 32 (that is, the laminated body 30). The first seal portion 252, for example, is welded to the circumferential edge portion 34a of the electrode plate 34, and seals the circumferential edge portion 34a. That is, the first seal portion 252 is joined to the circumferential edge portion 34a of the electrode plate 34. The circumferential edge portion 34a of the electrode plate 34 of each of the bipolar electrodes 32, is retained in a state of being buried in the first seal portion 252. The circumferential edge portion 34a of the electrode plates 34 arranged on both ends of the laminated body 30, is retained in a state of being buried in the first seal portion 252. Accordingly, the internal space V that is airtightly partitioned by the electrode plates 34 and 34 and the first seal portion 252, is formed between the adjacent electrode plates 34 and 34 in the lamination direction. For example, the electrolytic solution (not illustrated) including an alkaline solution such as an aqueous solution of potassium hydroxide, is contained in the internal space V. Furthermore, a case of describing the "volume of the internal space V", indicates a volume including air gaps of the separator 40.

The second seal portion 254 configuring an outer wall of the resin portion 250, is covered with an outer circumferential surface 252a of the first seal portion 252 extending in the lamination direction of the bipolar electrode 32. An inner circumferential surface 254a of the second seal portion 254, for example, is welded to the outer circumferential surface 252a of the first seal portion 252, and seals the outer circumferential surface 252a. That is, the second seal portion 254 is joined to the outer circumferential surface 252a of the first seal portion 252. A welding surface (a joining surface) of the second seal portion 254 with respect to the first seal portion 252, for example, forms four rectangular planes.

The electrode plate 34, for example is a rectangular metal foil formed of nickel. The circumferential edge portion 34a of the electrode plate 34 is an uncoated region that is not coated with a positive electrode active material and a negative electrode active material. In the uncoated region, the electrode plate 34 is exposed. The uncoated region is retained by being buried in the first seal portion 252 configuring the inner wall of the resin portion 250. Examples of the positive electrode active material configuring the positive electrode 36 include nickel hydroxide. Examples of the negative electrode active material configuring the negative electrode 38 include a hydrogen storing alloy. A formation region of the negative electrode 38 on the second surface 34d of the electrode plate 34, is slightly larger than a formation region of the positive electrode 36 on the first surface 34c of the electrode plate 34.

The separator 40, for example, is formed into the shape of a sheet. The separator 40, for example, is in the shape of a rectangle. A porous film formed of a polyolefin-based resin such as polyethylene (PE) or polypropylene (PP), a woven fabric or a non-woven fabric formed of polypropylene or the like, and the like are exemplified as the material forming the separator 40. In addition, the separator 40 may be reinforced by a vinylidene fluoride resin compound or the like.

The resin portion 250 (the first seal portion 252 and the second seal portion 254), for example, are formed into the shape of a rectangular tube, by injection molding using an insulating resin. Examples of a resin material configuring the resin portion 250, include polypropylene (PP), polyphenylene sulfide (PPS), modified polyphenylene ether (modified PPE), or the like.

In the power storage device 10B, a single-layered cell is configured by the positive electrode 36 of the electrode plate 34 on the first surface 34c side, the negative electrode 38 of the adjacent electrode plate 34 on the second surface 34d side, the separator 40 between the positive electrode 36 and the negative electrode 38, and the resin portion 250 hermetically sealing a space between the first surface 34c and the second surface 34d. The resin portion 250 regulates the movement of the gas and the electrolytic solution from one cell to the other cell. Accordingly, insulating properties between the adjacent cells, are ensured.

Figure 17:
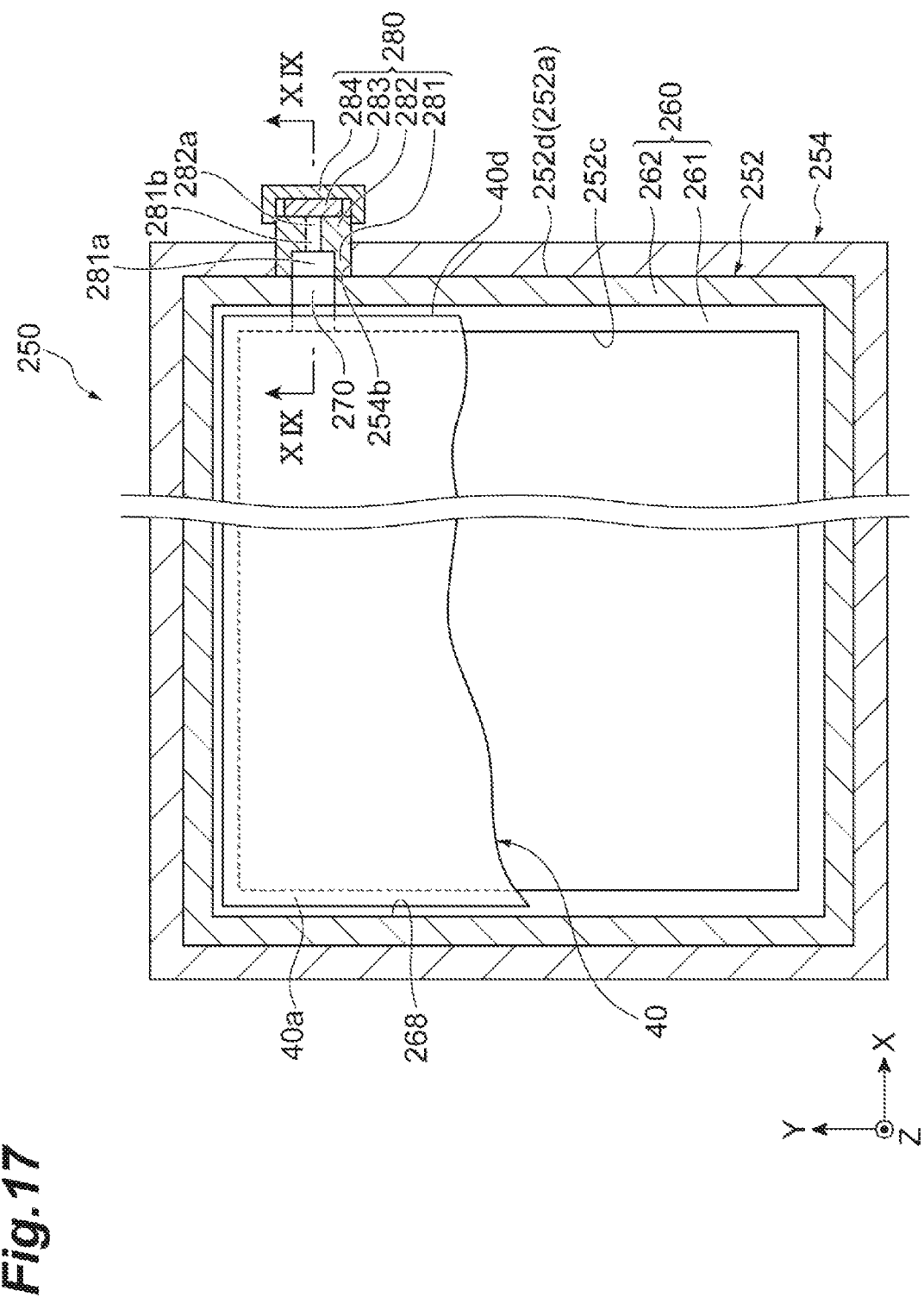
FIG. 17 is a sectional view taken along line XVII-XVII of FIG. 16.

The structure of the resin portion 250, and the bipolar electrode 32 and the separator 40, will be described with reference to FIG. 17. As illustrated in FIG. 17, a circumferential edge portion 40a of the separator 40 overlaps with a region in which the first seal portion 252 is provided, when seen from the lamination direction. In other words, in a case where the separator 40 and the first seal portion 252 are projected onto a plane vertical to the lamination direction (an XY plane) in the lamination direction, the projected images overlap with each other. The separator 40 reaches the region in which the first seal portion 252 is provided. An outer circumferential end 40d of the separator 40 is positioned between an outer circumferential end 252d and an inner circumferential end 252c of the first seal portion 252. Furthermore, in FIG. 17, a part of the separator 40 is illustrated as broken such that the configuration of the first seal portion 252 can be easily understood.

In a region in the vicinity of the first seal portion 252 of the electrode plate 34, the separator 40 is also provided between two adjacent electrode plates 34, and thus, the uncoated regions of the adjacent electrode plates 34 do not directly face each other. In two adjacent electrode plates 34, the separator 40 exists between one uncoated region and the other uncoated region, at all times. The separator 40 provided to overlap with the first seal portion 252, prevents the occurrence of a short circuit due to contact between two adjacent electrode plates 34 (in particular, uncoated regions). The outer circumferential end 40d may be positioned between the outer circumferential end 252d and the inner circumferential end 252c of the first seal portion 252 over the entire circumference of the separator 40. The outer circumferential end 40d may be positioned between the outer circumferential end 252d and the inner circumferential end 252c of the first seal portion 252, in a part of a circumference direction of the separator 40. As the separator 40 overlaps with the first seal portion 252 in a large range, in the circumference direction of the separator 40, the occurrence of a short circuit can be more reliably prevented.

Describing the structure described above in more detail, with reference to FIG. 20(a), the first seal portion 252 has a structure in which a plurality of frame bodies 260 are laminated in the lamination direction. The frame body 260 has a thickness greater than the thickness of the separator 40, in the lamination direction. More specifically, the frame body 260 has a thickness greater than the sum of the thickness of the electrode plate 34 and the thickness of the separator 40, in the lamination direction. The frame body 260 is in contact with the circumferential edge portion 34a of the electrode plate 34, and is in contact with another frame body 260 adjacent to the frame body 260 in the lamination direction. The frame body 260 is in contact with another frame body 260, and thus, the frame body 260 defines the height of the internal space V (the cell) formed between the adjacent electrode plates 34 and 34 in the lamination direction.

The frame body 260 includes an inner circumferential portion 261 that is arranged on the first surface 34c side of the electrode plate 34 and is in contact with the first surface 34c, and an outer circumferential portion 262 that is continuously provided outside the inner circumferential portion 261. Each of the inner circumferential portion 261 and the outer circumferential portion 262 corresponds to the shape of the electrode plate 34, and for example, is in the shape of a rectangle. The inner circumferential portion 261, for example, is welded to the first surface 34c of the electrode plate 34. That is, the inner circumferential portion 261 is joined to the first surface 34c of the electrode plate 34. An inner circumferential end 261c of the inner circumferential portion 261 (refer to FIG. 20(b)) corresponds to the inner circumferential end 252c of the first seal portion 252. The thickness of the outer circumferential portion 262 is greater than the thickness of the inner circumferential portion 261, and is the thickness of the frame body 260. An outer circumferential surface 262d of the outer circumferential portion 262 corresponds to the outer circumferential end 252d of the first seal portion 252 (that is, the outer circumferential surface 252a).

As illustrated in FIG. 20(b), the frame body 260 includes a first end surface 260a in the lamination direction, and a second end surface 260b facing the first end surface 260a. The first end surface 260a of the frame body 260 is in contact with the second end surface 260b of another frame body 260 adjacent to the frame body 260 in the lamination direction. The second end surface 260b of the frame body 260 is in contact with the first end surface 260a of another frame body 260 adjacent to the frame body 260 in the lamination direction. The first end surface 260a and the second end surface 260b are in contact with another frame body 260 in the shape of a plane in a large portion of the circumference direction (the entire area excluding a groove portion 270 described below). According to such a configuration, the frame body 260 defines the height of one cell in the power storage module 12B.

A rectangular annular step portion 268 connecting the inner circumferential portion 261 and the outer circumferential portion 262 together, is formed between the inner circumferential portion 261 and the outer circumferential portion 262, having different thicknesses in the lamination direction. The depth of the step portion 268 in the lamination direction, is greater than the thickness of the separator 40. The circumferential edge portion 40a including the outer circumferential end 40d of the separator 40, is arranged in the step portion 268. That is, the step portion 268 formed in the frame body 260 faces the inside of the frame body 260, and provides a space for arranging the outer circumferential end 40d of the separator 40 in the first seal portion 252. For example, the circumferential edge portion 40a of the separator 40 is in contact with a front surface 261a of the inner circumferential portion 261 (refer to FIG. 20(b), a surface of the inner circumferential portion 261 on a side opposite to a surface to be joined to the first surface 34c). The separator 40 falls within the range of the height of the frame body 260. A slight aperture can be formed between the circumferential edge portion 40a and another electrode plate 34 adjacent to the separator 40 at an interval of the thickness of the negative electrode 38.

Furthermore, the outer circumferential end 40d of the separator 40 may be flush with the outer circumferential surface 262d of the frame body 260. The outer circumferential end 40d of the separator 40 may be positioned on the same position as that of the outer circumferential end 252d of the first seal portion 252 or inside the outer circumferential end 252d, and outside the inner circumferential end 252c of the first seal portion 252.

The power storage module 12B of this embodiment has a structure for stabilizing an internal pressure of the cell. The structure will be described with reference to FIG. 17 to FIG. 19, FIG. 20(a), FIG. 20(b), and FIG. 21(a). As illustrated in FIG. 17, FIG. 20(a), and FIG. 21(a), in the frame body 260, for example, the groove portion 270 penetrating the inside and the outside of the frame body 260 is formed in one portion in the circumference direction. The groove portion 270, for example, is formed on the first end surface 260a side of the frame body 260. The groove portion 270 extends in a direction intersecting with the lamination direction (the X direction). Furthermore, the groove portion 270 may be provided in each of the frame bodies 260, but the position of the groove portion 270 is shifted in the adjacent frame body 260. In a certain portion in the circumference direction, the groove portion 270 is provided in one frame body 260 of a predetermined number of frame bodies 260 (for example, provided at a ratio of one frame body to eight frame bodies).

A depth d of the groove portion 270 in the lamination direction, is greater than the depth of the step portion 268 described above. In other words, as illustrated in FIG. 20(b) and FIG. 21(a), a length from the first end surface 260a to a bottom portion 270a of the groove portion 270 (corresponding to the depth d) is greater than a length from the first end surface 260a to the front surface 261a of the inner circumferential portion 261 (corresponding to the depth of the step portion 268).

As illustrated in FIG. 21(a), the groove portion 270 has a predetermined width W in a direction orthogonal to an extension direction (the X direction) (the Y direction). In a sectional surface vertical to the extension direction of the groove portion 270 (a YZ sectional surface), the groove portion 270 is in the shape of a rectangle in which the width W of the groove portion 270 is greater than the depth d. An aspect ratio of the groove portion 270, that is, a ratio between the width W and the depth d, is greater than or equal to 5. The groove portion 270 is a communication flow path that is communicated with the internal space V. In order to adjust the internal pressure to be stabilized, it is necessary to ensure the shape of the groove portion 270 that is the communication flow path. It is preferable that the aspect ratio of the groove portion 270 is greater than or equal to 10.

Figure 18:
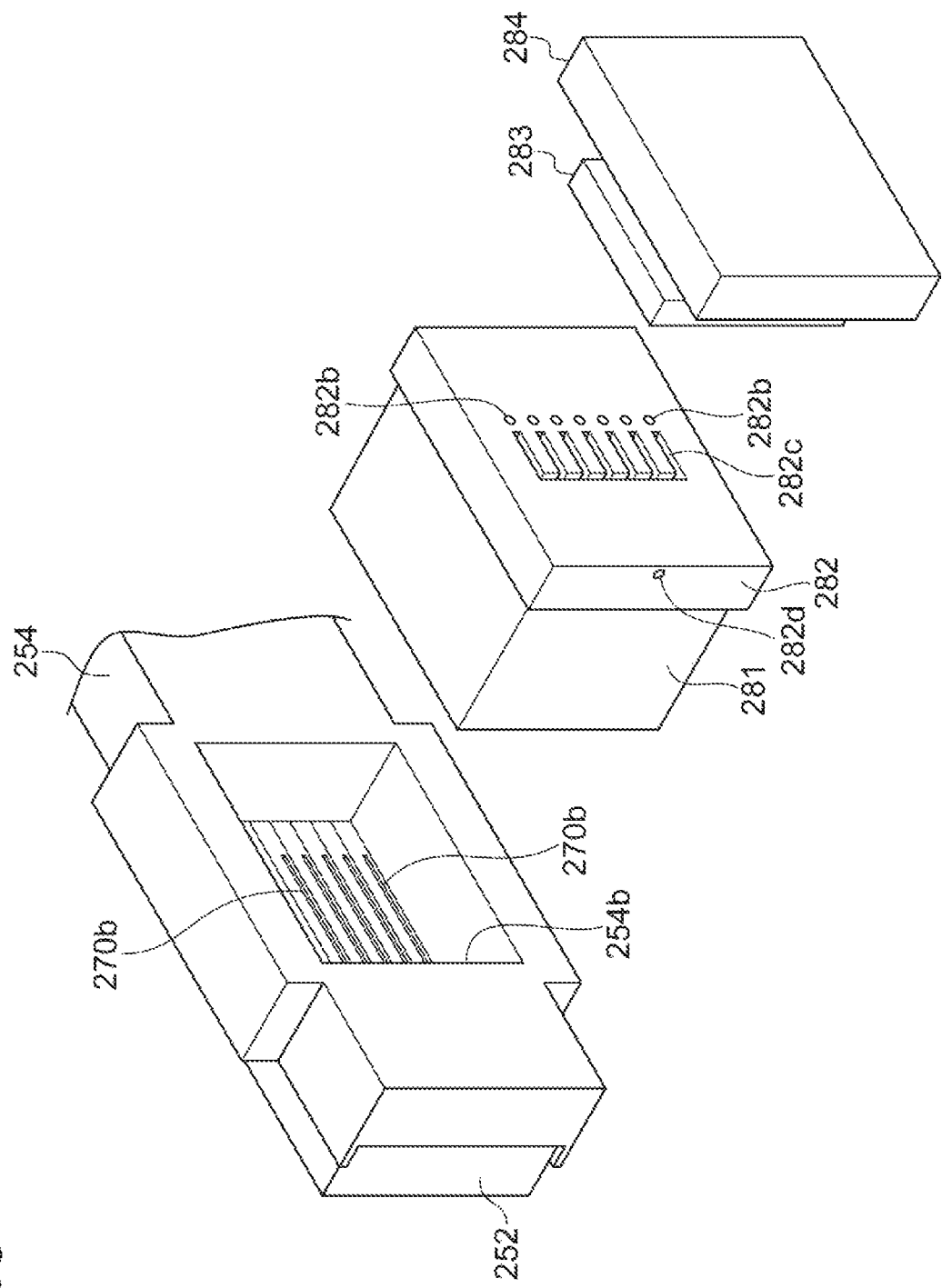
FIG. 18 is an exploded perspective view illustrating the pressure adjustment valve provided in an opening of a second seal portion.
Figure 19:
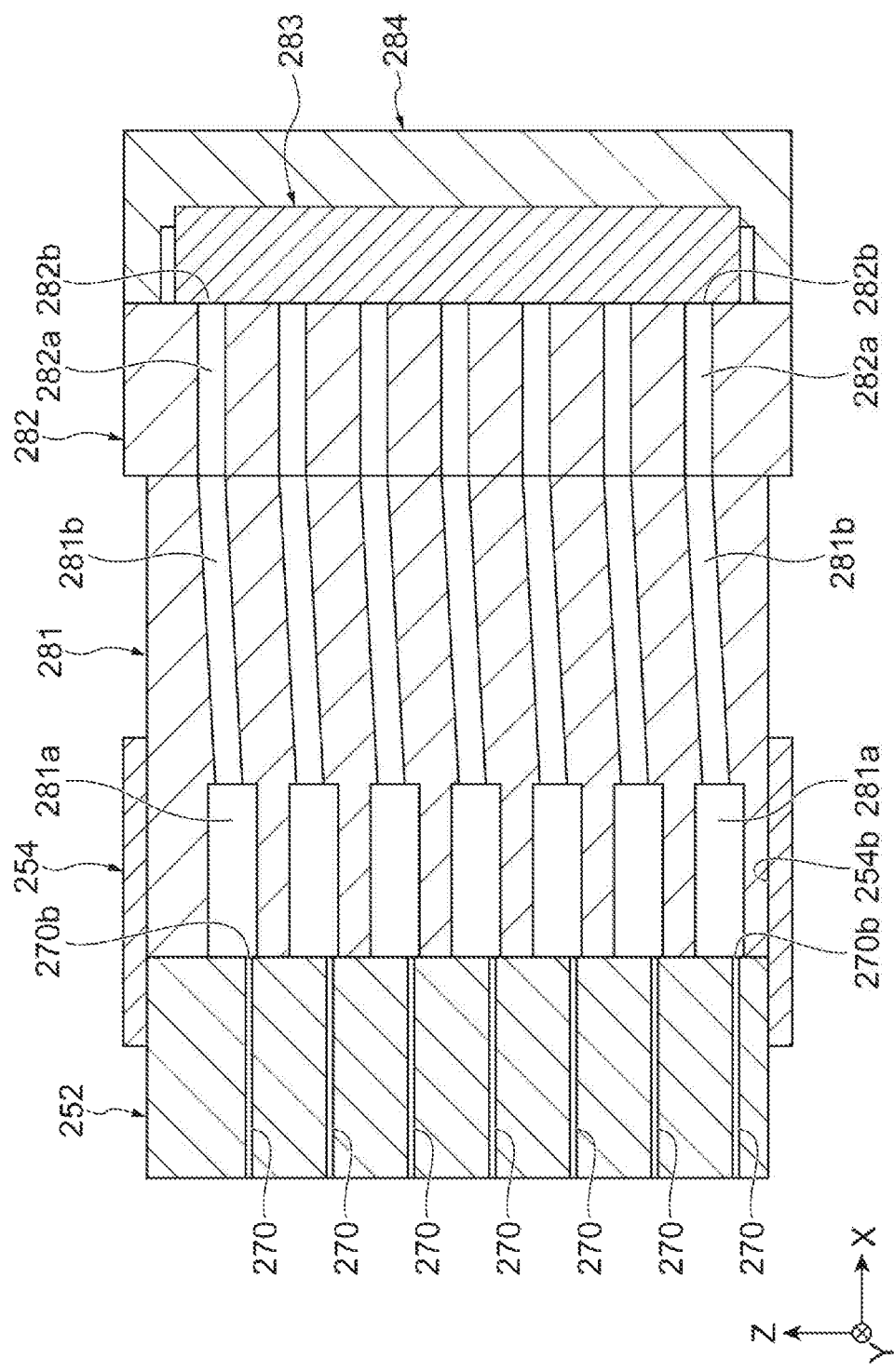
FIG. 19 is a sectional view taken along line XIX-XIX of FIG. 17.

As illustrated in FIG. 17 to FIG. 19, the second seal portion 254 includes an opening 254b that is provided in a position corresponding to the groove portion 270 of the frame body 260. The opening 254b, for example, is in the shape of a rectangle. The opening 254b, for example, can be molded by injection molding using a mold. In the opening 254b, each of end portions 270b of a plurality of groove portions 270 formed in the first seal portion 252, is exposed (refer to FIG. 18).

A pressure adjustment valve 280 is provided in the opening 254b of the second seal portion 254. The pressure adjustment valve 280 is fitted into the opening 254b, and covers the opening 254b. The pressure adjustment valve 280 includes a base 281 fitted into the opening 254b, a case 282 fixed to an outer surface side of the base 281, and a cover 284 covering an outer surface side of the case 282. In the cover 284, a valve body 283 is contained.

As illustrated in FIG. 19, in the base 281, a first hole portion 281a and a second hole portion 281b, communicated with the groove portion 270, are formed. In the opening 254b in one portion, a plurality of first hole portions 281a and a plurality of second hole portions 281b are provided to correspond to the plurality of groove portions 270. The first hole portion 281a and the second hole portion 281b extend along the direction intersecting with the lamination direction (the X direction). The first hole portion 281a, for example, is a square hole having a width corresponding to the width W of the groove portion 270. The second hole portion 281b, for example, is a round hole communicated with the first hole portion 281a. The second hole portion 281b may be a round hole in a tapered shape in which an inner diameter increases as being close to the outer surface side (that is, the case 282 side).

In the case 282, a third hole portion 282a communicated with the second hole portion 281b of the base 281, is formed. The third hole portion 282a extends along the direction intersecting with the lamination direction (the X direction). The third hole portion 282a, for example, is a round hole communicated with the second hole portion 281b. The third hole portion 282a may be a round hole in a tapered shape in which an inner diameter decreases as being close to the outer surface side (that is, the valve body 283 side).

The valve body 283, for example, is formed of an elastic member such as rubber. The valve body 283, for example, is in the shape of a rectangular parallelepiped, and is arranged to fill the inside of the cover 284. The valve body 283 is pressed against the base 281 and the case 282 by the cover 284, and shuts an end portion 282b of the third hole portion 282a.

As illustrated in FIG. 18, exhaust flow paths 282c are formed in the case 282. The exhaust flow paths 282c are provided to correspond to the plurality of groove portions 270, are joined together into one, and are communicated with the exhaust hole 282d that is provided on a lateral surface of the case 282. The valve body 283 blocks the exhaust flow path 282c. The valve body 283 receives a pressure through the first hole portion 281a, the second hole portion 281b, and the third hole portion 282a, and thus, can be elastically modified or moved.

In a state where the valve body 283 shuts the end portion 282b of the third hole portion 282a, the pressure of the internal space V is capable of increasing. In a case where the pressure of the internal space V is greater than or equal to a setting value, the blocking of the end portion 282b of the third hole portion 282a is released by the modification and/or the movement of the valve body 283 in accordance with the pressure. As a result thereof, gas flows out from the end portion 282b, and the gas is discharged through the exhaust flow path 282c and the exhaust hole 282d. In a case where the pressure of the internal space V is less than the setting value, the valve body 283 shuts the end portion 282b of the third hole portion 282a. According to such an opening and closing operation described above, the pressure adjustment valve 280 adjusts the pressure of the internal space V.

As described above, the pressure adjustment valve 280 provided in the opening 254b, is connected to the internal space V, and is configured to adjust the pressure of the internal space V to be in a predetermined range through the groove portion 270. The pressure adjustment valve 280 is a restoration type safety valve. Furthermore, a known valve mechanism having a configuration different from that of the pressure adjustment valve 280, may be used as the pressure adjustment valve.

Next, a method for manufacturing the power storage module 12B will be described. First, The positive electrode 36 is formed on the first surface 34c of the electrode plate 34, and the negative electrode 38 is formed on the second surface 34d of the electrode plate 34, and thus, the bipolar electrode 32 is obtained. Next, the frame body 260 is joined to the circumferential edge portion 34a of the electrode plate 34 of the bipolar electrode 32. At this time, the frame body 260 may be welded to the circumferential edge portion 34a by performing hot press from upper and lower surfaces of the bipolar electrode 32. Then, the plurality of bipolar electrodes 32 to which the frame body 260 is joined, are laminated through the separator 40 (refer to FIG. 20(b)), and thus, the laminated body 30 is obtained.

In a case where the frame body 260 is welded to the circumferential edge portion 34a by the hot press, the frame body 260 is molded by using a mold for hot press. As illustrated in FIG. 20(b), the first end surface 260a, the second end surface 260b, the front surface 261a, the first end surface 262a, and the step portion 268 of the frame body 260, and the bottom portion 270a of the groove portion 270, are formed by the mold for hot press. The mold for hot press, for example, may be formed of a resin. A mold of a fluorine resin including polytetrafluoroethylene (PTFE), a tetrafluoroethylene-perfluoroalkyl vinyl ether copolymer (PFA), or the like, may be used as the mold for hot press. In this case, it is possible to prevent a conductive foreign substance from being mixed into the frame body 260.

Figure 16:
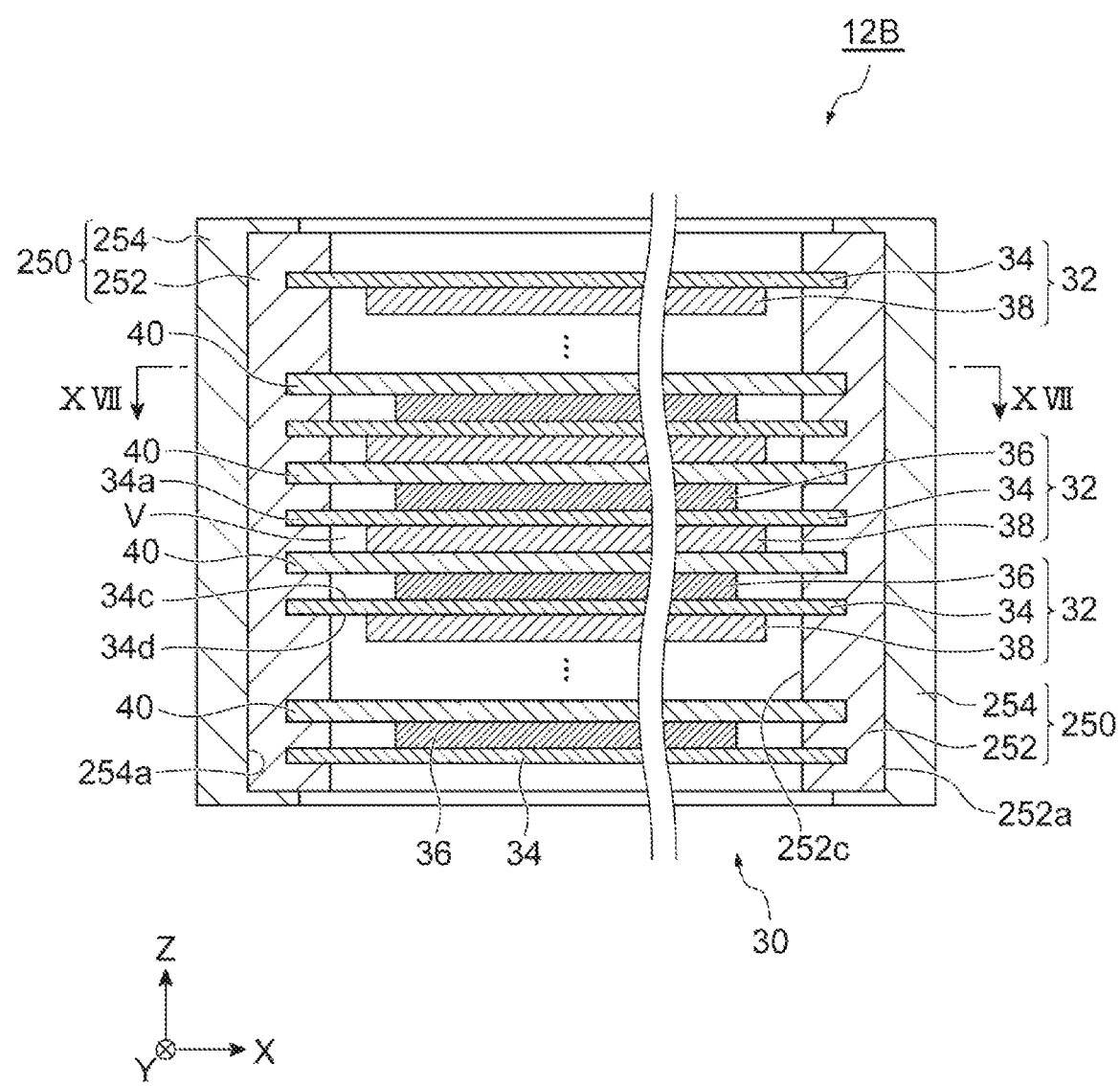
FIG. 16 is a schematic sectional view illustrating the power storage module of the third embodiment.

Next, the second seal portion 254, for example, is formed by injection molding (refer to FIG. 16). For example, a resin material of the second seal portion 254, having fluidity, flows in a mold, and thus, the second seal portion 254 can be formed. In the second seal portion 254, the opening 254b is formed corresponding to a position in which the groove portion 270 is provided.

Next, the electrolytic solution is injected into the internal space V of the resin portion 250 from a liquid injection port provided in the resin portion 250. Here, in the power storage module 12B of this embodiment, the groove portion 270 formed in the first seal portion 252, also functions as the liquid injection port. In the injection step, for example, the injection of the electrolytic solution is performed by using an injection device (not illustrated) including a vacuum pump discharging air from the internal space V (refer to FIG. 16), a dispenser supplying the electrolytic solution, and a tank containing the electrolytic solution. The injection of the electrolytic solution is performed by using the injection device, for example, as follows. First, the vacuum pump is operated. Accordingly, the air is discharged from the internal space V of the resin portion 250. After that, the electrolytic solution that is supplied from the dispenser and is contained in the tank, is injected into the internal space V of the resin portion 250, through the plurality of groove portions 270.

The electrolytic solution is injected, and then, the pressure adjustment valve 280 is attached to the opening 254b, and thus, the power storage module 12B is manufactured. After that, as illustrated in FIG. 1, a plurality of power storage modules 12B are laminated through the conductive plate 14. The positive electrode terminal 24 and the negative electrode terminal 26 are respectively connected in advance to the conductive plates 14 positioned on both ends in the lamination direction. After that, the pair of binding plates 16A and 16B are respectively arranged on both ends in the lamination direction, through the insulating film 22, and the binding plates 16A and 16B are coupled to each other by using the bolt 18 and the nut 20. Thus, the power storage device 10B illustrated in FIG. 1, is manufactured.

According to the power storage module 12B of this embodiment, described above, the frame body 260 joined to the circumferential edge portion 34a of the electrode plate 34, is laminated in the lamination direction, and thus, the first seal portion 252 is formed. The groove portion 270 is formed on the first end surface 260a of the frame body 260. The groove portion 270 extends in the direction intersecting with the lamination direction, and penetrates the inside and the outside of the frame body 260. The frame bodies 260 are in contact with the first end surface 260a and the second end surface 260b in the lamination direction, and thus, a sectional area of the groove portion 270 as the communication flow path, is ensured. Accordingly, it is possible to easily evacuate the pressure of the internal space V, that is, the internal pressure, to the outside of the frame body 260, through the groove portion 270. At this time, the pressure adjustment valve 280 is operated, and thus, the internal pressure is adjusted. According to the configuration described above, in which the groove portion 270 is provided in the first seal portion 252, a pressure loss between the internal space V and the pressure adjustment valve 280 when the internal pressure increases, is reduced. The pressure loss is reduced, and thus, it is possible to operate the pressure adjustment valve 280 at a predetermined operation pressure or a pressure close to the predetermined operation pressure. According to the power storage module 12B, it is possible to stabilize the internal pressure by cooperation between the groove portion 270 and the pressure adjustment valve 280. Further, it is only necessary to work the shape of the frame body 260 configuring first seal portion 252, and it is not necessary to prepare a separate member (such as a tube) for forming the communication flow path.

In addition, the depth d of the groove portion 270 is greater, and thus, it is possible to further reduce a pressure loss in the groove portion 270. The separator 40 is arranged in the step portion 268 of the frame body 260, and thus, the separator 40 overlaps with the first seal portion 252. Therefore, the separator 40 exists between the adjacent electrode plates 34, at all times. According to such a configuration, there is no region where the adjacent electrode plates 34 directly face, and thus, it is possible to prevent a short circuit between the electrode plates 34. In addition, the influence of the separator 40 on the thickness of the frame body 260 in the lamination direction, is reduced.

The aspect ratio of the groove portion 270 is greater than or equal to 5, and thus, it is possible to preferably form the groove portion 270 as the communication flow path, with respect to the bipolar electrode 32 (the cell) having a limited thickness.

As described above, the third embodiment has been described, the configuration of the power storage module is not limited to the embodiment described above.

For example, as illustrated in FIG. 21(b), a frame body 260A in which one or a plurality of protrusions 271 are provided in a bottom portion 270a of a groove portion 270A, may be adopted. The protrusion 271 may extend in the direction intersecting with the lamination direction (the X direction). The shape of the protrusion 271 is not particularly limited. The protrusion 271 may be provided in any way, insofar as the protrusion 271 does not block the groove portion 270A. In this case, the groove portion 270A is prevented from being modified, and a sectional area of the groove portion 270A as the communication flow path, is ensured.

The step portion 268 may be omitted. The circumferential edge portion 40a of the separator 40 may not overlap with the region in which the first seal portion 252 is provided. The separator 40 may not reach the region in which the first seal portion 252 is provided. That is, a gap may be formed between the circumferential edge portion 40a of the separator 40 and the first seal portion 252, in the direction intersecting with the lamination direction.

The groove portion 270 may be formed on the second end surface 260b side of the frame body 260. The groove portion 270 may be formed on both of the first end surface 260a side and the second end surface 260b side of the frame body 260. Each of the frame bodies 260 may include a first frame body joined to the first surface 34c of the electrode plate 34, and a second frame body joined to the second surface 34d of the electrode plate 34, and may have a structure in which the first frame body and the second frame body are joined to each other.

Fourth Embodiment

Next, the power storage device 10C including the power storage module 12C of the fourth embodiment, will be described. The power storage device 10C is the same as the power storage device 10, except that the power storage module 12C is provided instead of the power storage module 12.

Figure 22:
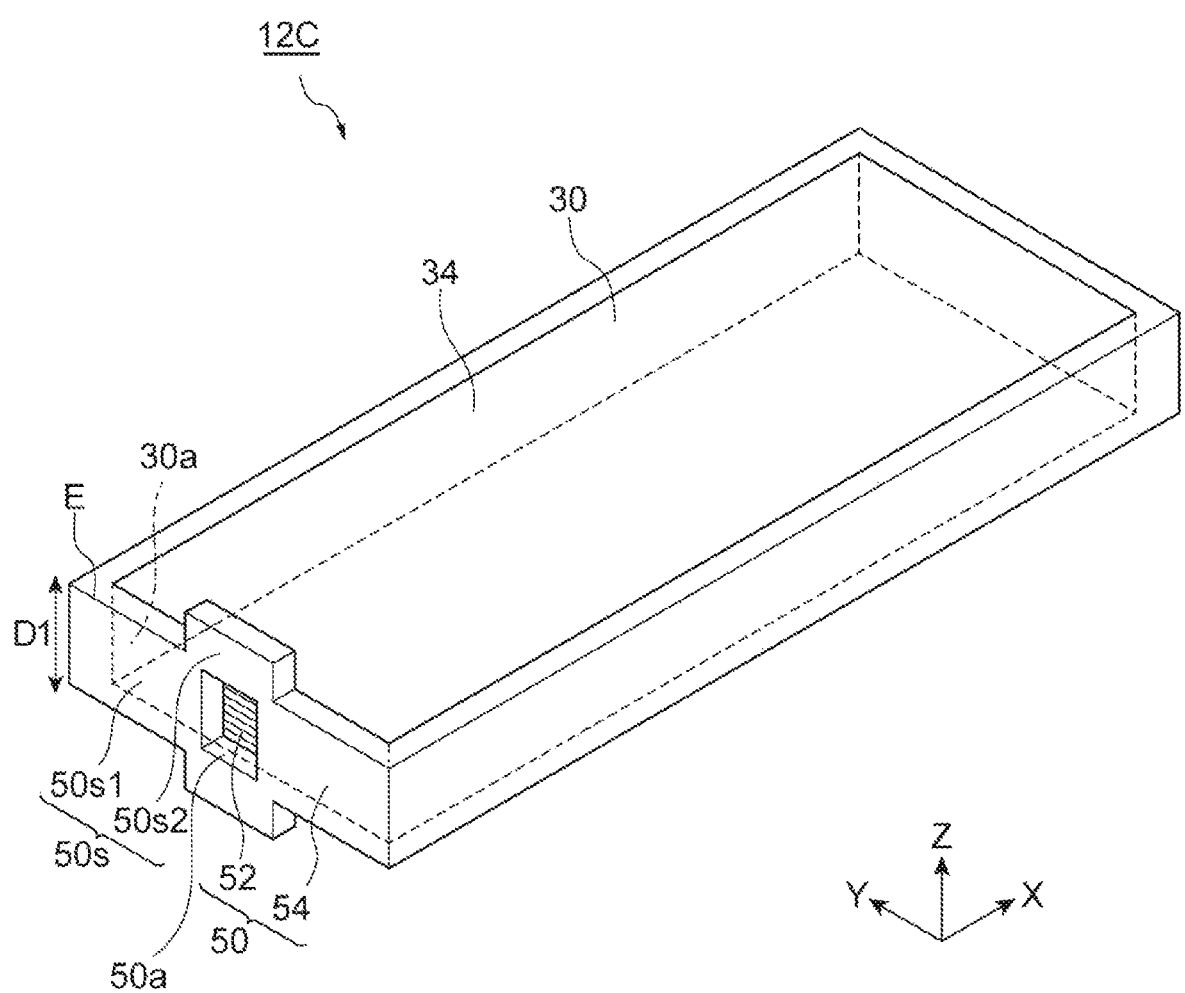
FIG. 22 is a schematic perspective view illustrating the power storage module of the fourth embodiment.
Figure 23:
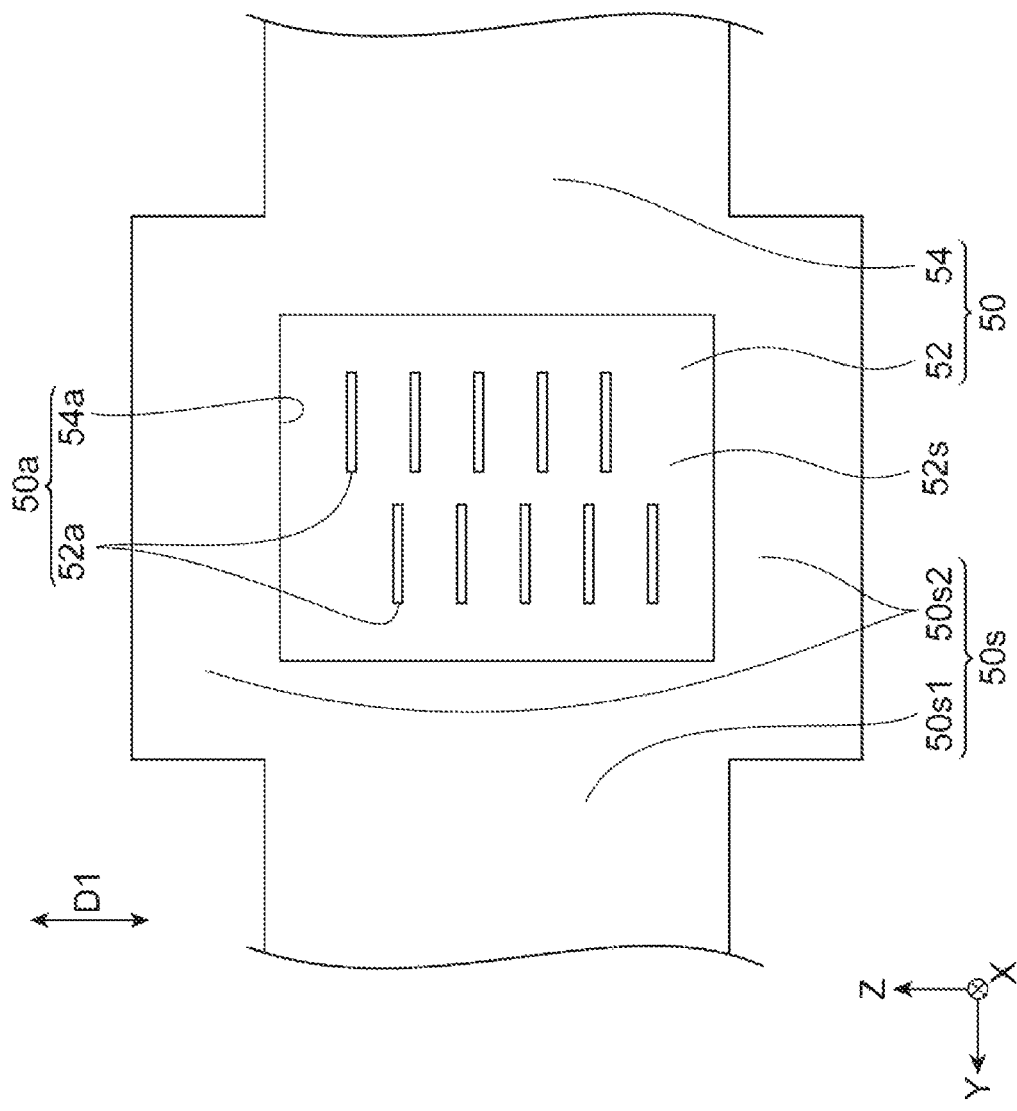
FIG. 23 is a plan view in which a part of the power storage module of FIG. 22 is enlarged.

FIG. 22 is a schematic perspective view illustrating the power storage module 12C of FIG. 2. FIG. 23 is a plan view in which a part of the power storage module of FIG. 22 (a peripheral region of one opening 50a) is enlarged. As illustrated in FIG. 22 and FIG. 23, the frame body 50 of the power storage module 12C includes the lateral surface 50s extending in the lamination direction D1. The lateral surface 50s is the surface positioned outside when seen from the lamination direction D1. Accordingly, the second resin portion 54 includes the lateral surface 50s of the frame body 50.

The lateral surface 50s of the frame body 50 includes the main body region 50s1 and the protruding region 50s2. The main body region 50s1 and the protruding region 50s2, for example, are in the shape of a rectangle. The opening 50a is provided in the main body region 50s1. The opening 50a functions as the each of the liquid injection port for injecting the electrolytic solution into each of the internal spaces V, and functions as a connection port of a pressure adjustment valve 360 (the details will be described below) for adjusting the pressure in each of the internal spaces V, after the electrolytic solution is injected. In this embodiment, only one opening 50a is provided, but the plurality of openings 50a may be provided in the frame body 50, and may be communicated with the internal spaces V different for each of the opening 50a. In this case, it is possible to reduce the number of internal spaces V required to be communicated with one opening 50a in order to adjust the pressure of all of the internal spaces V of the power storage module 12C.

The main body region 50s1 includes the edge E extending in the direction intersecting with the lamination direction D1 of the bipolar electrodes 32 (the Y direction). The protruding region 50s2 protrudes from the edge E to be separated from the opening 50a in the lamination direction D1 of the bipolar electrodes 32. In this embodiment, the pair of protruding regions 50s2 are arranged to interpose the opening 50a therebetween. The protruding region 50s2 is provided with a length protruding to both outer sides of the opening 50a over the entire length of the opening 50a, along the edge E.

As illustrated in FIG. 23, one opening 50a may include the first openings 52a provided in the first resin portion 52, and the second openings 54a provided in the second resin portion 54. Each of the first openings 52a is communicated with the internal space V between the adjacent bipolar electrodes 32, and the second opening 54a. The plurality of first openings 52a are provided in the first resin portion 52, and the single second opening 54a extending to cover the plurality of first openings 52a, is provided in the second resin portion 54. The first opening 52a may be provided in each of the first resin portions 52, or may be provided between the adjacent first resin portions 52. Each of the first openings 52a and the second opening 54a, for example, are in the shape of a rectangle.

Figure 24:
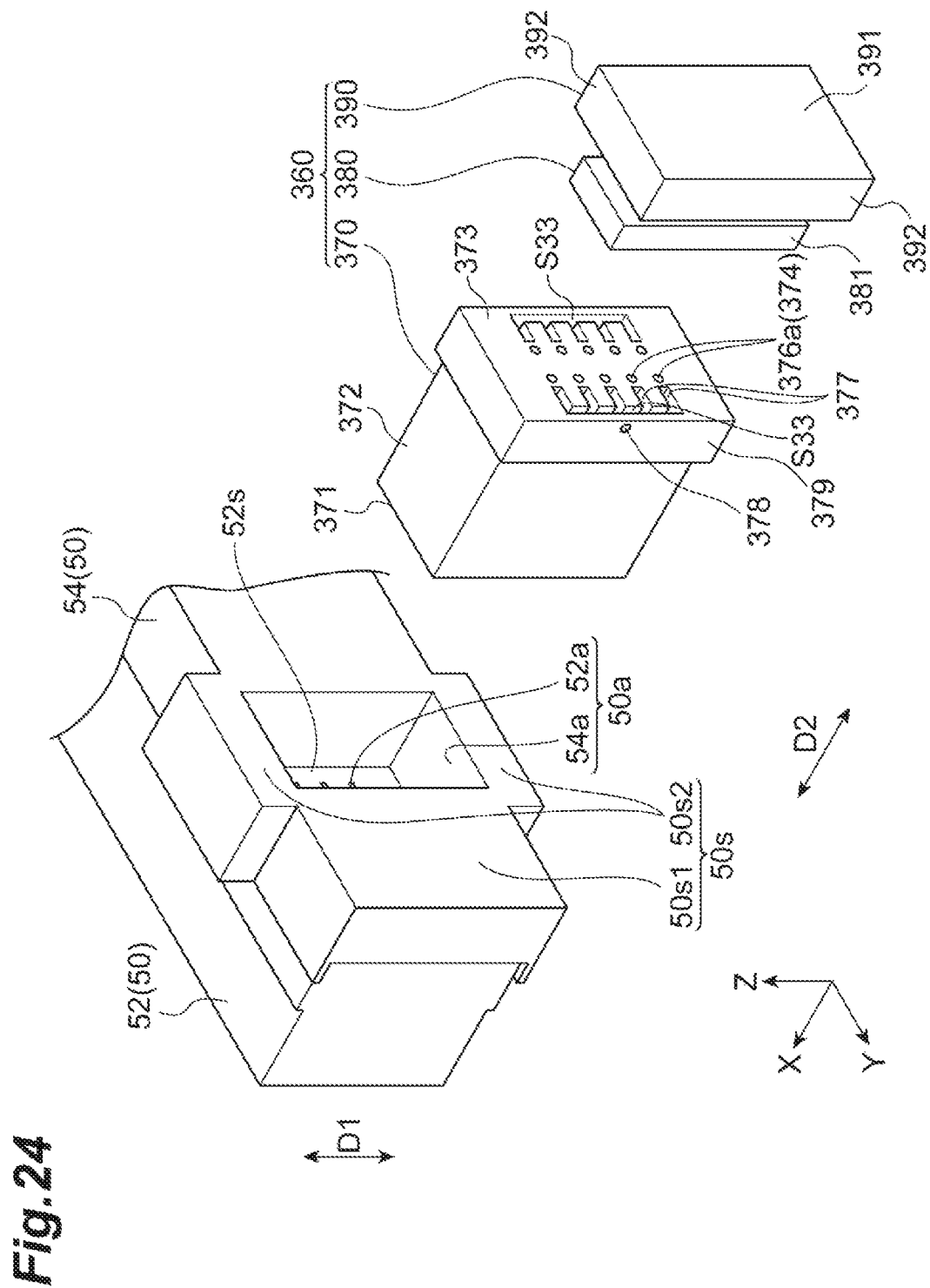
FIG. 24 is an exploded perspective view of the pressure adjustment valve to be connected to the opening of the frame body.
Figure 25:
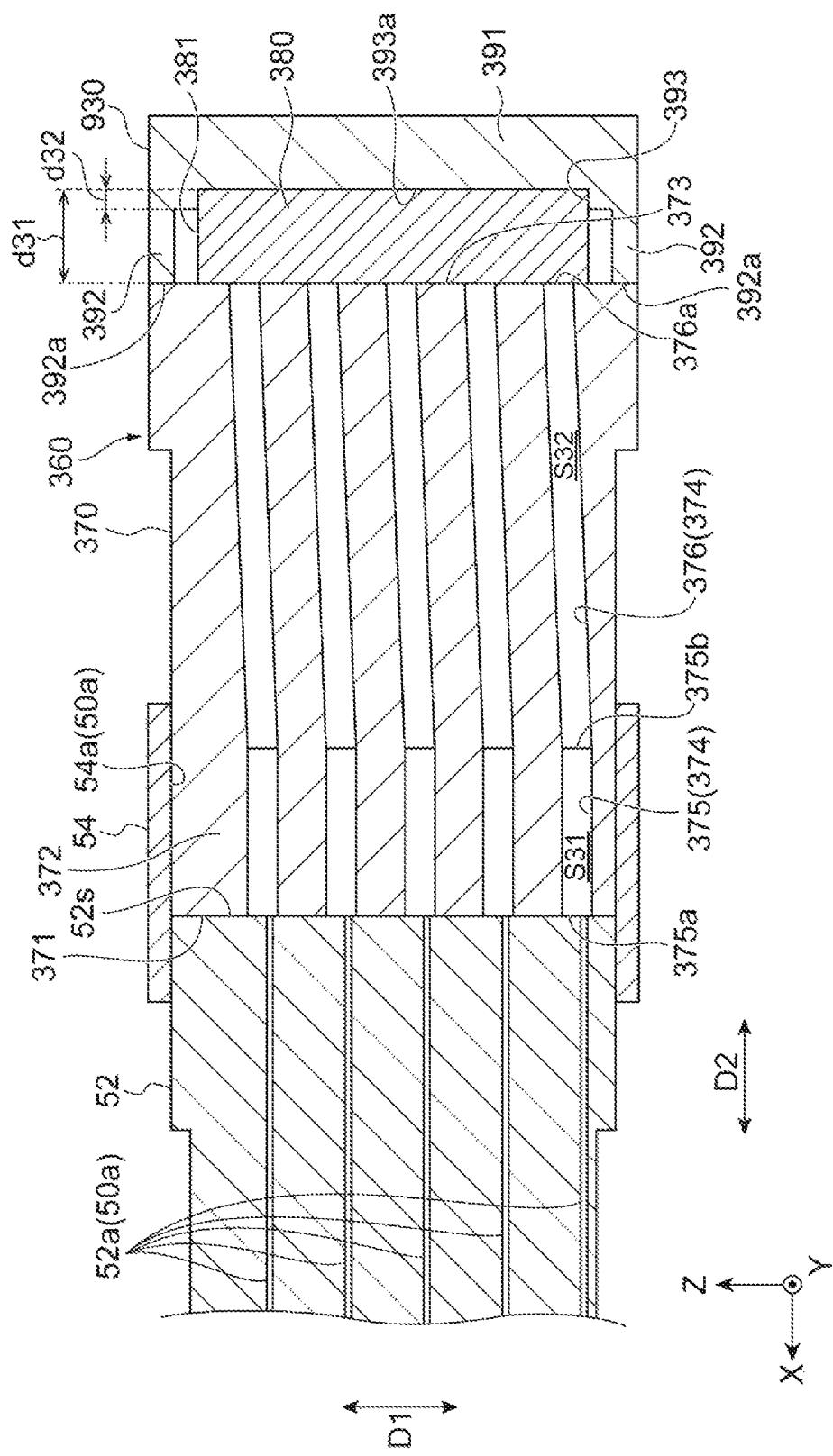
FIG. 25 is a schematic sectional view illustrating the configuration of the pressure adjustment valve.

FIG. 24 is an exploded perspective view of the pressure adjustment valve 360 to be connected to the opening 50a of the frame body 50. In addition, FIG. 25 is a schematic sectional view illustrating the configuration of the pressure adjustment valve 360. Specifically, FIG. 25 is a sectional view including sectional surfaces of five first openings 52a arranged in the first column of the opening 50a (a column on a left side in FIG. 23). As illustrated in FIG. 24 and FIG. 25, the pressure adjustment valve 360 includes a base member 370, a valve body 380 (the elastic member), and a cover member 390 (the pressing member).

The base member 370 has an approximately rectangular parallelepiped outer shape, and for example, is formed of polypropylene (PP), polyphenylene sulfide (PPS), modified polyphenylene ether (modified PPE), or the like. The base member 370 is connected to the opening 50a. Specifically, a portion 372 including a lateral surface 371 facing the opening 50a of the base member 370, has a shape corresponding to that of the second opening 54a. The base member 370 is fixed to the opening 50a by welding a part or all a contact portion between the lateral surface 371 and the lateral surface 52s of the first resin portion 52, in a state where the portion 372 is inserted into the second opening 54a. The welding between the lateral surface 371 and the lateral surface 52s, for example, is performed by hot plate welding or the like.

Figure 26:
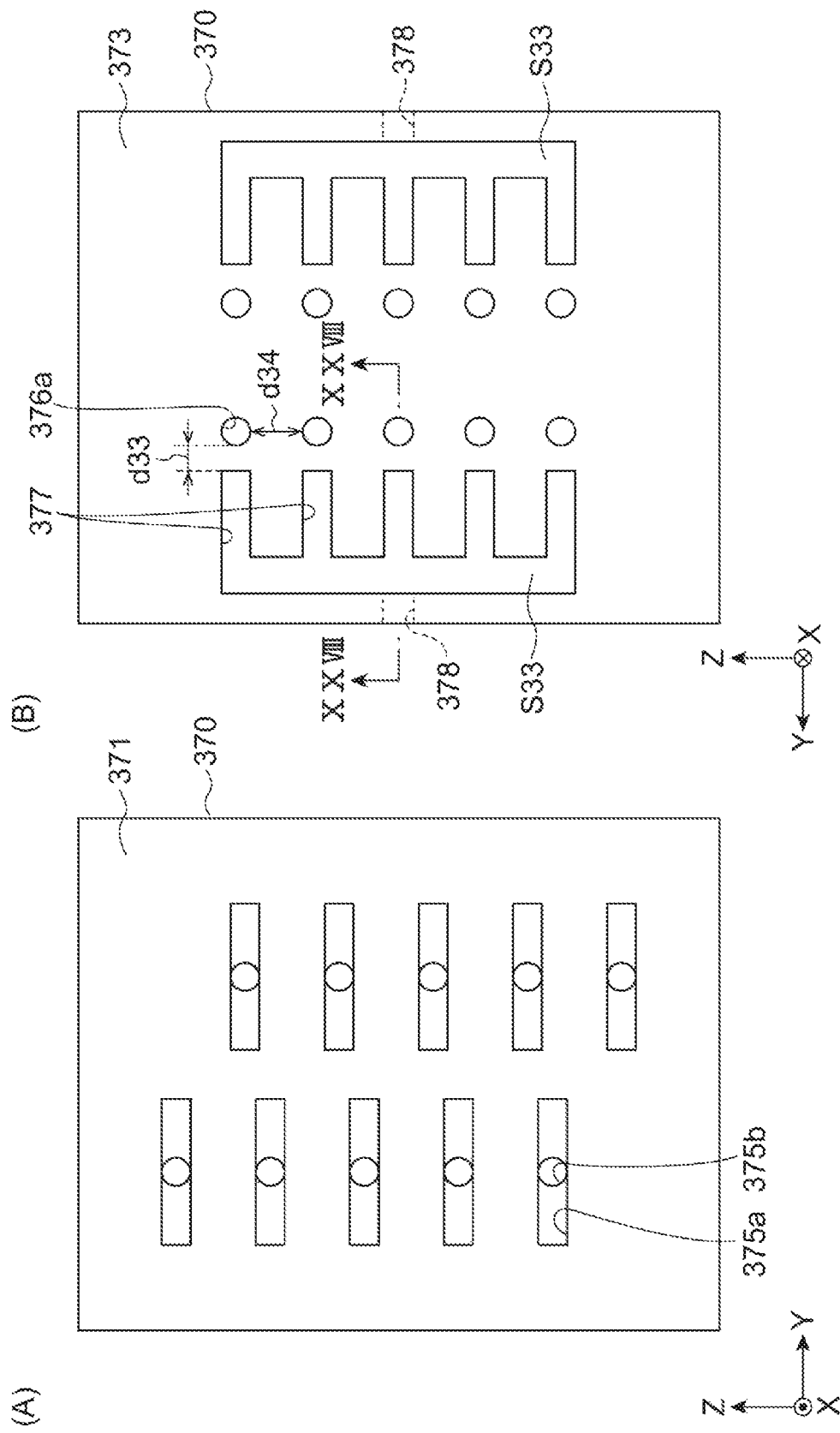
FIG. 26(A) is a plan view illustrating the lateral surface of the base member on the opening side of the frame body and FIG. 26(B) is a plan view illustrating the lateral surface of the base member on the valve body side.

FIG. 26(A) is a plan view illustrating the lateral surface 371, and FIG. 26(B) is a plan view illustrating a lateral surface 373 facing the valve body 380 of the base member 370. As illustrated in FIG. 25 and FIG. 26, a plurality of (here, 10) communication holes 374 penetrating through the lateral surface 373 from the lateral surface 371, are provided in the base member 370. Each of the communication holes 374 is communicated with one internal space V, through one corresponding first opening 52a. The communication hole 374 includes a first communication portion 375 that is a portion of the communication hole 374 on the lateral surface 371 side, and a second communication portion 376 that is a portion of the communication hole 374 on the lateral surface 373 side.

A sectional surface of the first communication portion 375 is formed into the shape of a rectangle. An approximately rectangular parallelepiped space S31 is formed by the first communication portion 375. An opening end 375a (a first opening end) of the first communication portion 375 on the opening 50a side, is formed to have a size including the rectangular first opening 52a when seen from the connection direction D2 between the opening 50a and the pressure adjustment valve 360 (the X direction). On the other hand, a sectional surface of an opening end 375b of the first communication portion 375 on a side connected to the second communication portion 376, is formed into the shape of a circle.

A sectional surface of the second communication portion 376 is formed into the shape of a circle. A space S32 is formed by the second communication portion 376. The second communication portion 376 penetrates through an opening end 376a (a second opening end) of the second communication portion 376 on the lateral surface 373 side from the opening end 375b of the first communication portion 375. The opening end 376a is formed into the shape of a circle. In this embodiment, as illustrated in FIG. 25, the second communication portions 376 to be connected to five first openings 52a in the first column, extend such that the center position of the opening end 376a is positioned on an upper side from the center position of the opening end 375b. On the other hand, the second communication portions 376 to be connected to five first openings 52a in the second column (a column on a right side in FIG. 23), extend such that the center position of the opening end 376a is positioned on a lower side from the center position of the opening end 375b. As a result thereof, as illustrated in FIG. 26(B), a plurality of opening ends 376a approach the central position of the lateral surface 373. Accordingly, the valve body 380 necessary for blocking all of the opening ends 376a, becomes compact.

The valve body 380, for example, is a rectangular plate-like member formed of an elastic member such as rubber. The valve body 380 is arranged to shut the plurality of opening ends 376a provided in the base member 370.

Figure 27:
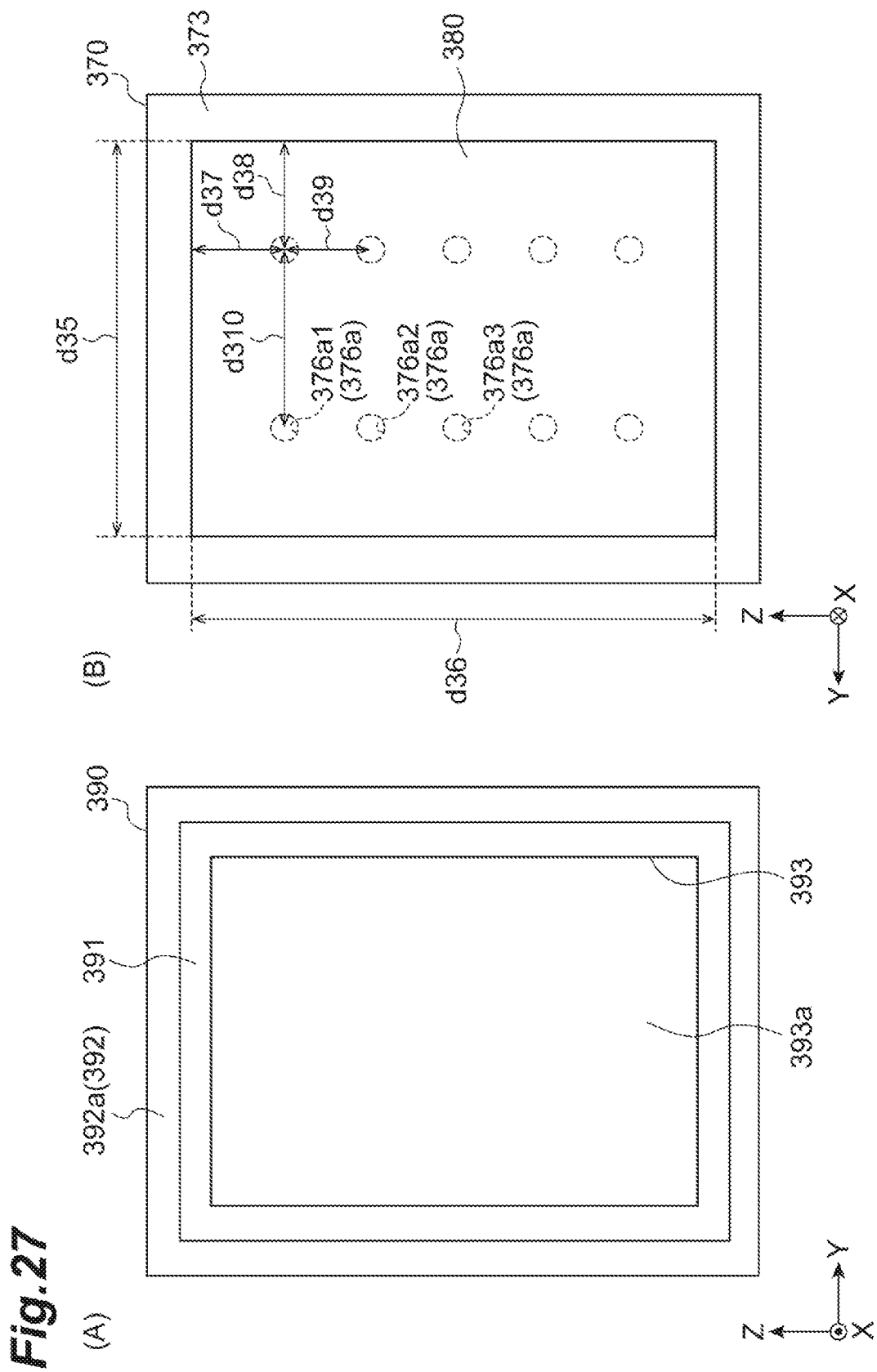
FIG. 27(A) is a plan view illustrating an inner surface of a cover member.
FIG. 27(B) is a diagram illustrating a positional relationship between a base member and a valve body according to an example.

The cover member 390 is a box-like member including a rectangle plate-like bottom wall portion 391, and a lateral wall portion 392 erected to an edge portion of the bottom wall portion 391. The cover member 390, for example, is formed of polypropylene (PP), polyphenylene sulfide (PPS), modified polyphenylene ether (modified PPE), or the like. As illustrated in FIG. 25 and FIG. 27(A), a groove portion 393 (a positioning portion) positioning the valve body 380 with respect to the cover member 390 by being in contact with a part of a lateral surface 381 of the valve body 380 on the cover member 390 side, extending in the connection direction D2, is provided inside the bottom wall portion 391. The groove portion 393 is in a concavely indented shape. The groove portion 393 is provided into the shape of a rectangle to correspond to the shape of the valve body 380 (in this embodiment, the shape of a rectangular plate) when seen from the connection direction D2. The cover member 390 contains the valve body 380 in the groove portion 393, and functions as the pressing member for pressing the valve body 380 against the lateral surface 373 of the base member 370. Specifically, as illustrated in FIG. 25, in a state where the valve body 380 is positioned and contained in the groove portion 393 of the cover member 390, an end portion 392a of the lateral wall portion 392 is fixed to the lateral surface 373 of the base member 370. A method of fixing the end portion 392a and the lateral surface 373 to each other, is not particularly limited, and for example, hot plate welding, fastening using a fastening member such as a bolt, or the like, can be used.

Here, the thickness of the valve body 380 at the normal time (at the time of being uncompressed) (the width in the X direction) is greater than a height d31 from a bottom surface 393a of the groove portion 393 to the end portion 392a of the lateral wall portion 392. That is, in this embodiment, a compression rate of the valve body 380 is defined by the height d31. For example, the compression rate of the valve body 380 is adjusted in advance such that the blocking of the opening end 376a of the communication hole 374 by the valve body 380, is released in a case where a pressure in the communication hole 374 (that is, the pressure in the internal space V communicated with the communication hole 374), is greater than or equal to a setting value set in advance.

In addition, a height d32 of the groove portion 393 is less than the thickness of the valve body 380 (that is, the height d31) at the time of being compressed (d32<d31). Accordingly, the groove portion 393 performs the positioning of the valve body 380 without being in contact with the portion of the lateral surface 381 on the base member 370 side.

As illustrated in FIG. 26(B) and FIG. 28(A), groove portions 377 respectively corresponding to the opening ends 376a, are provided on the lateral surface 373 side of the base member 370. Each of the groove portions 377 is formed into the shape of a slit extending in the direction orthogonal to the lamination direction D1 (the X direction and the Y direction). Each of the groove portions 377 is provided in a position outside the corresponding opening end 376a, in the direction orthogonal to the lamination direction D1 and the connection direction D2 (the Y direction).

Subsequently, the principle of the pressure adjustment of the internal space V, will be described. As described above, each of the communication holes 374 is communicated with the corresponding internal space V, and thus, a pressure equivalent to that of the corresponding internal space V corresponding to the communication hole 374, is applied to a portion of the valve body 380, blocking the opening end 376a of the communication hole 374. Here, the compression rate of the valve body 380, or the like is defined such that the blocking of the opening end 376a by the valve body 380, is released in a case where the pressure in the corresponding internal space V is greater than or equal to the setting value set in advance. For this reason, in a case where the pressure in the corresponding internal space V is less than the setting value, as illustrated in FIG. 28(A), the valve closed state in which the opening end 376a is blocked by the valve body 380, is maintained.

On the other hand, in a case where the pressure in the corresponding internal space V increases to be greater than or equal to the setting value, as illustrated in FIG. 28(B), a part of the valve body 380 (specifically, a portion blocking the opening end 376a, and a peripheral portion thereof) is modified to be separated from the lateral surface 373, and thus, the valve opened state in which the blocking of the opening end 376a is released, is obtained. As a result thereof, the opening end 376a of which the blocking is released, is communicated with the groove portion 377 corresponding to the opening end 376a, and gas in the corresponding internal space V is discharged to the groove portion 377 from the opening end 376a. After that, in a case where the pressure in the internal space V is less than the setting value, the valve body 380 returns to the original state, and thus, the opening end 376a is again in the valve closed state (refer to FIG. 28(A)). According to such an opening and closing operation, the pressure adjustment valve 360 suitably adjusts the pressure in the internal space V.

Here, as illustrated in FIG. 26(B), a distance d33 between the opening end 376a and the groove portion 377 corresponding to the said opening end 376a, is shorter than a distance d34 between the said opening end 376a and another opening end 376a adjacent to the said opening end 376a (d33<d34). Accordingly, in a case where a part of the valve body 380 is separated from the lateral surface 373 in accordance with an increase in the pressure of the internal space V, it is possible to communicate the said opening end 376a with the groove portion 377 corresponding to the said opening end 376a without communicating the said opening end 376a of the communication hole 374 communicated with the internal space V, with another opening end 376a adjacent to the said opening end 376a (that is, the opening end 376a of the communication hole 374 communicated with another internal space V). As a result thereof, when the pressure adjustment is performed by the pressure adjustment valve 360, it is possible to suitably prevent interference (the inflow and the outflow of gas, or the like) between the internal spaces V different from each other.

In addition, as illustrated in FIG. 26(B) and FIG. 28(A), a circulation space S33 that is connected to a plurality of (here, five) groove portions 377, and circulates the gas discharged from the internal space V, is partitioned in the base member 370 when seen from a direction facing the lateral surface 373 (the X direction). The circulation space S33 is formed into an approximately rectangular parallelepiped shape. The circulation space S33 extends in the lamination direction D1 in order to connect outer end portions of five groove portions 377 arrayed along the lamination direction D1 when seen from the direction facing the lateral surface 373. The plurality of groove portions 377 and the circulation space S33, for example, are formed by injection molding or the like. In addition, an exhaust port 378 communicating the circulation space S33 with the outside, is provided in the base member 370. In this embodiment, an outer opening end of the exhaust port 378 is provided on the lateral surface 79 directed towards a direction orthogonal to the connection direction D2 of the base member 370 (in this embodiment, the Y direction as an example). According to such a configuration, the gas discharged to one groove portion 377 in accordance with an increase in the pressure of the internal space V, flows in the circulation space S33 commonly provided in the plurality of groove portions 377, and is discharged to the outside from the exhaust port 378. Therefore, it is possible to suitably discharge the gas generated in the internal space V, to the outside, with a simple configuration.

Furthermore, in this embodiment, as illustrated in FIG. 28, the valve body 380 is arranged not to cover a part of the circulation space S33, but may be arranged to cover the entire circulation space S33. In addition, the valve body 380 is arranged to cover the entire groove portion 377, but may be arranged not to cover at least a part of the groove portion 377.

Figure 29:
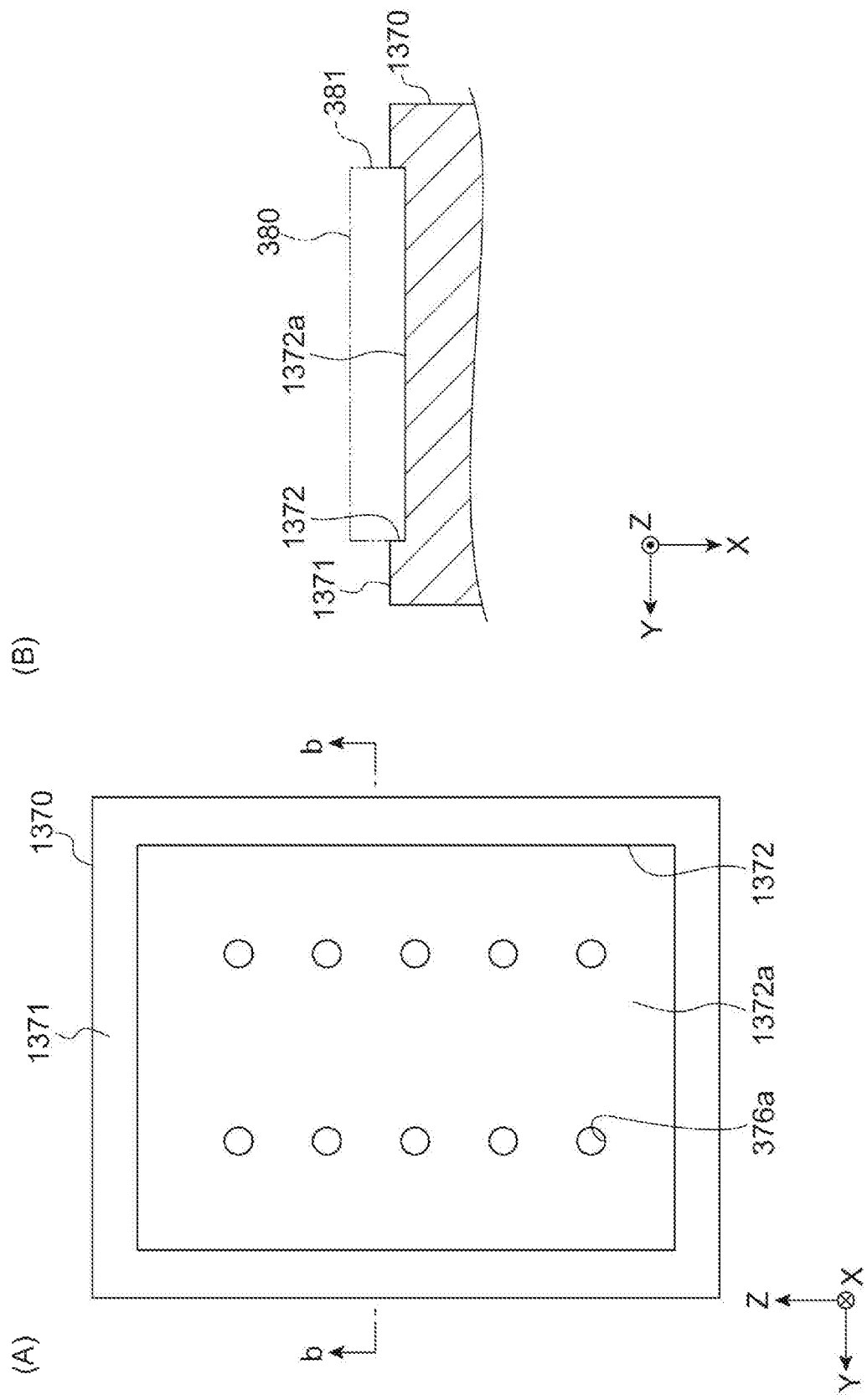
FIG. 29(A) is a plan view illustrating the lateral surface of the base member on the valve body side, of a power storage module according to a comparative example.
FIG. 29(B) is a sectional view taken along line b-b of FIG. 29(A).

Next, an operational effect obtained by positioning the valve body 380 with the groove portion 393 provided in the cover member 390, will be described by using an example illustrated in FIG. 27(B) and a comparative example illustrated in FIG. 29.

Example

FIG. 27(B) illustrates a positional relationship between the base member 370 and the valve body 380 according to an example. The positional relationship is determined by positioning the valve body 380 with the groove portion 393 described above. As illustrated in the same drawing, in this example, five opening ends 376a in each of the columns, are arranged at an equal interval in a column direction (the Y direction), and the positions of two opening ends 376a in the same row position in a row direction (the Z direction) are identical to each other. In the same drawing, d35 represents the width of the valve body 380 in the transverse direction (the Y direction). d36 represents the width of the valve body 380 in the longitudinal direction (the Z direction). d37 represents a distance between the edge portion of the valve body 380 along the transverse direction and the center of the opening end 376a closest to the edge portion. d38 represents a distance between the edge portion of the valve body 380 in the longitudinal direction and the center of the opening end 376a closest to the edge portion. d39 represents a distance between the centers of the adjacent opening ends 376a existing in the same column position. d310 represents a distance between the centers of the adjacent opening ends 376a existing in the same row position. In this example, in d35 to d310, a relationship of "d35: d36: d37: d38: d39: d310=11: 18: 3: 3: 3: 5" is established.

Comparative Example

A power storage module according to a comparative example will be described with reference to FIG. 29. In the same drawing, constituents corresponding to the groove portion 377 and the circulation space S33, are not illustrated. The power storage module according to the comparative example is different from the power storage module 12C according to the example (this embodiment), in that a configuration for positioning the valve body 380 (the positioning portion) is provided in a base member 1370 but not in the cover member 390. The other configurations and the relationship of d35 to d310 described above, are the same as those of the example. Specifically, as illustrated in the same drawing, in the power storage module according to the comparative example, a groove portion 1372 for positioning the valve body 380, is provided on a lateral surface 1371 of the base member 1370 facing the valve body 380. As with the groove portion 393, the groove portion 1372 is in a concavely indented shape in order to position the valve body 380. The positions of the groove portion 1372 and the groove portion 393, to be in contact with the valve body 380 in order to position the valve body 380, are opposite to each other. That is, the groove portion 393 is in contact with a portion of the valve body 380 on the cover member 390 side, whereas the groove portion 1372 is in contact with a portion of the valve body 380 on the base member 1370 side.

(Simulation Result)

Figure 30:
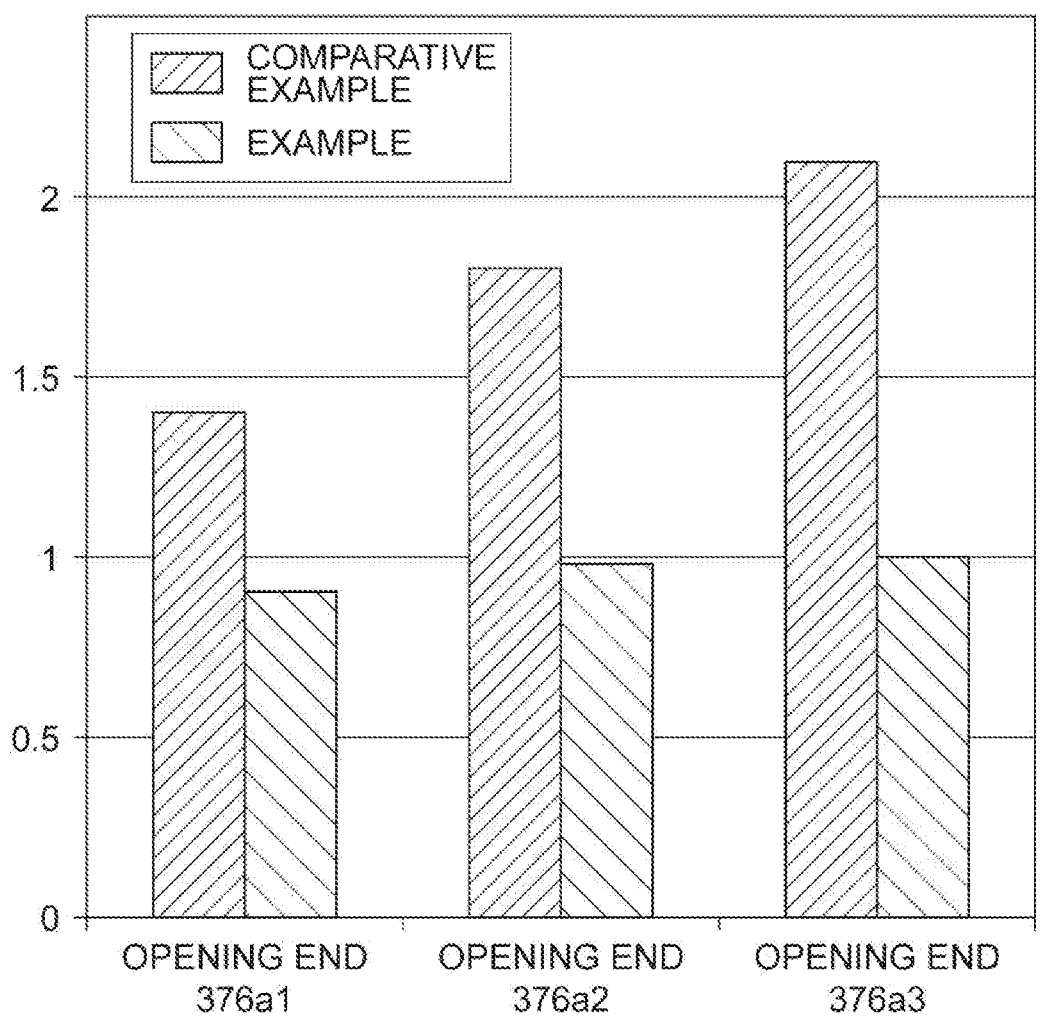
FIG. 30 is a diagram illustrating Seal Contact Pressure (Simulation Value)/Target Seal Contact Pressure for each opening position of this embodiment and the comparative example.

FIG. 30 illustrates a comparison result of a seal contact pressure of each of an opening end 376a1 in a position farthest from the center of the valve body 380, an opening end 376a2 in a position second farthest from the center of the valve body 380, and an opening end 376a3 in position closest to the center of the valve body 380 (refer to FIG. 27(B)) by the valve body 380. A value in a vertical axis of a graph illustrated in FIG. 30, represents a ratio (v1/v2) of a seal contact pressure v1 calculated by a simulation to a target seal contact pressure v2 set in advance. This simulation result is a result obtained by calculating the actual seal contact pressure of each of the opening ends 376a1 to 376a3 in a case where the compression rate of the valve body 380 is defined such that the seal contact pressure of the opening end 376a3 is an ideal value (a target seal contact pressure). Here, in the example, the compression rate is defined by the height d31 from the bottom surface 393a of the groove portion 393 to the end portion 392a of the lateral wall portion 392. On the other hand, in the comparative example, the compression rate is defined by a height from a bottom surface 1372a of the groove portion 1372 to an inner surface of the bottom wall portion 391 of the cover member 390.

As illustrated in FIG. 30, in both of the example and the comparative example, a tendency that the seal contact pressure increases as being close to the center of the valve body 380, is observed. However, in the example, a variation in the seal contact pressures of the opening ends 376a1 to 376a3, is comparatively small, and an error with respect to the target seal contact pressure is comparatively small in all of the opening ends 376a1 to 376a3. On the other hand, in the comparative example, a variation in the seal contact pressures of the opening ends 376a1 to 376a3 is large, and an error with respect to the target seal contact pressure is comparatively large in all of the opening ends 376a1 to 376a3. In particular, in the opening end 376a3 that is used as a reference for setting the target seal contact pressure, a seal contact pressure approximately coincident with the target seal contact pressure, is obtained in the example, whereas a seal contact pressure more than twice the target seal contact pressure, is obtained in the comparative example.

The reason that in the comparative example, a variation in the seal contact pressures of the opening ends 376a1 to 376a3 is large, and the seal contact pressure calculated by the simulation, is extremely greater than the target seal contact pressure, for example, is considered as follows. That is, as illustrated in FIG. 29(B), in the comparative example, in a state where the valve body 380 is compressed, the portion of the valve body 380 on the base member 1370 side interferes with the groove portion 1372. Specifically, the portion of the valve body 380 on the base member 1370 side is compressed, and thus, extends in a horizontal direction (a direction along a YZ plane), but is in contact with the lateral surface of the groove portion 1372. For this reason, a portion of the lateral surface 381 of the valve body 380 on the base member 1370 side, bites into the edge portion of the groove portion 1372, and receives a repulsive force from the lateral surface of the groove portion 1372. Such a repulsive force is applied to four lateral surfaces of the valve body 380, orthogonal to the connection direction D2, and thus, it is considered that the compression rate of the valve body 380 increases as being close to the center of the valve body 380. As a result thereof, as illustrated in FIG. 30, it is considered that a variation in the seal contact pressures of the opening ends 376a is large, and the seal contact pressure increases in the opening end 376a that is close to the center of the valve body 380.

On the other hand, in the example, the groove portion 393 positioning the valve body 380, is provided on the cover member 390 side but not on the base member 370 side. For this reason, the portion of the valve body 380 on the cover member 390 side bites into the edge portion of the groove portion 393, and receives a repulsive force from the lateral surface of the groove portion 393. On the other hand, the portion of the valve body 380 on the base member 370 side does not interfere with the groove portion 393, and is capable of freely extending in the horizontal direction, and thus, does not receive the repulsive force as described above, from the groove portion 393. In addition, the portion of the valve body 380 on the cover member 390 side, is positioned on a side opposite to the opening end 376a side, and thus, it is considered that the influence of the portion on the seal contact pressure of the opening end 376a, is comparatively small. As a result thereof, as illustrated in FIG. 30, it is considered that a result indicating that a variation in the seal contact pressures of the opening ends 376a is comparatively small, is obtained.

As described above, the power storage module 12C of this embodiment includes the laminated body 30 in which the bipolar electrodes 32 including the electrode plate 34, the positive electrode 36 provided on one surface of the electrode plate 34, and the negative electrode 38 provided on the other surface of the electrode plate 34, are laminated, the frame body 50 retaining the edge portion 34a of the electrode plate 34, in which the openings 50a communicated with the plurality of internal spaces V between the adjacent bipolar electrodes 32 in the laminated body 30, are provided, and the pressure adjustment valve 360 to be connected to the opening 50a. The pressure adjustment valve 360 includes the base member 370 to be connected to the opening 50a, in which the plurality of communication holes 374 respectively communicated with the plurality of internal spaces V through the opening 50a, are provided, the plate-like valve body 380 arranged to shut the opening ends 376a of the plurality of communication holes 374, positioned on a side opposite to the opening ends 375a on the opening 50a side, and the cover member 390 pressing the valve body 380 against the base member 370 from a side opposite to a side of the valve body 380 facing the base member 370. The cover member 390 includes the groove portion 393 positioning the valve body 380 with respect to the cover member 390. In this embodiment, the groove portion 393 positions the valve body 380 by being in contact with the a part of the lateral surface 381 of the valve body 380 on the cover member 390 side.

In the power storage module 12C, one ends (the opening ends 375a) of the plurality of communication holes 374 provided in the base member 370, are respectively communicated with the internal spaces V of the laminated body 30 of the bipolar electrodes 32, through the opening 50a of the frame body 50, the other ends (the opening ends 376a) of the plurality of communication holes 374 are blocked by the valve body 380 pressed by the cover member 390. Accordingly, it is possible to perform the pressure adjustment (the exhaust) of the internal space V for each of the internal spaces V. In addition, the positioning of the valve body 380 is performed by the groove portion 393 provided on the cover member 390 side. Accordingly, it is possible to realize a configuration in which the portion of the valve body 380 on the base member 370 side does not interfere with the groove portion 393. As a result thereof, it is difficult for a variation to occur in a pressure for pressing the base member 370 with the valve body 380, in each position of the valve body 380. That is, a variation in the pressure when the gas is discharged (the valve opening pressure at which the blocking of the valve body 380 is released), for each of the opening ends 376a. Therefore, according to the power storage module 12C, it is possible to suitably perform the pressure adjustment of each of the internal spaces V by one pressure adjustment valve 360 common in the plurality of internal spaces V.

In addition, in this embodiment, a positioning configuration of the valve body 380 is realized by the concave groove portion 393 to which the valve body 380 is fitted. According to such a configuration, it is possible to position the valve body 380 with a simple configuration in which the groove portion 393 is provided in the cover member 390.

In addition, the lateral surface 373 of the base member 370 and a surface of the cover member 390 (in this embodiment, the bottom surface 393a of the groove portion 393), facing each other through the valve body 380, are parallel to each other. According to such a configuration, in the direction orthogonal to the lateral surface 373 of the base member 370 (that is, the connection direction D2), it is possible to press each position of the valve body 380 against the base member 370 with an approximately equal force, and thus, it is possible to effectively reduce a variation in the valve opening pressures for each of the internal spaces V.

As described above, the details of the fourth embodiment have been described, but the configuration of the power storage module is not limited to the embodiment described above.

Figure 31:
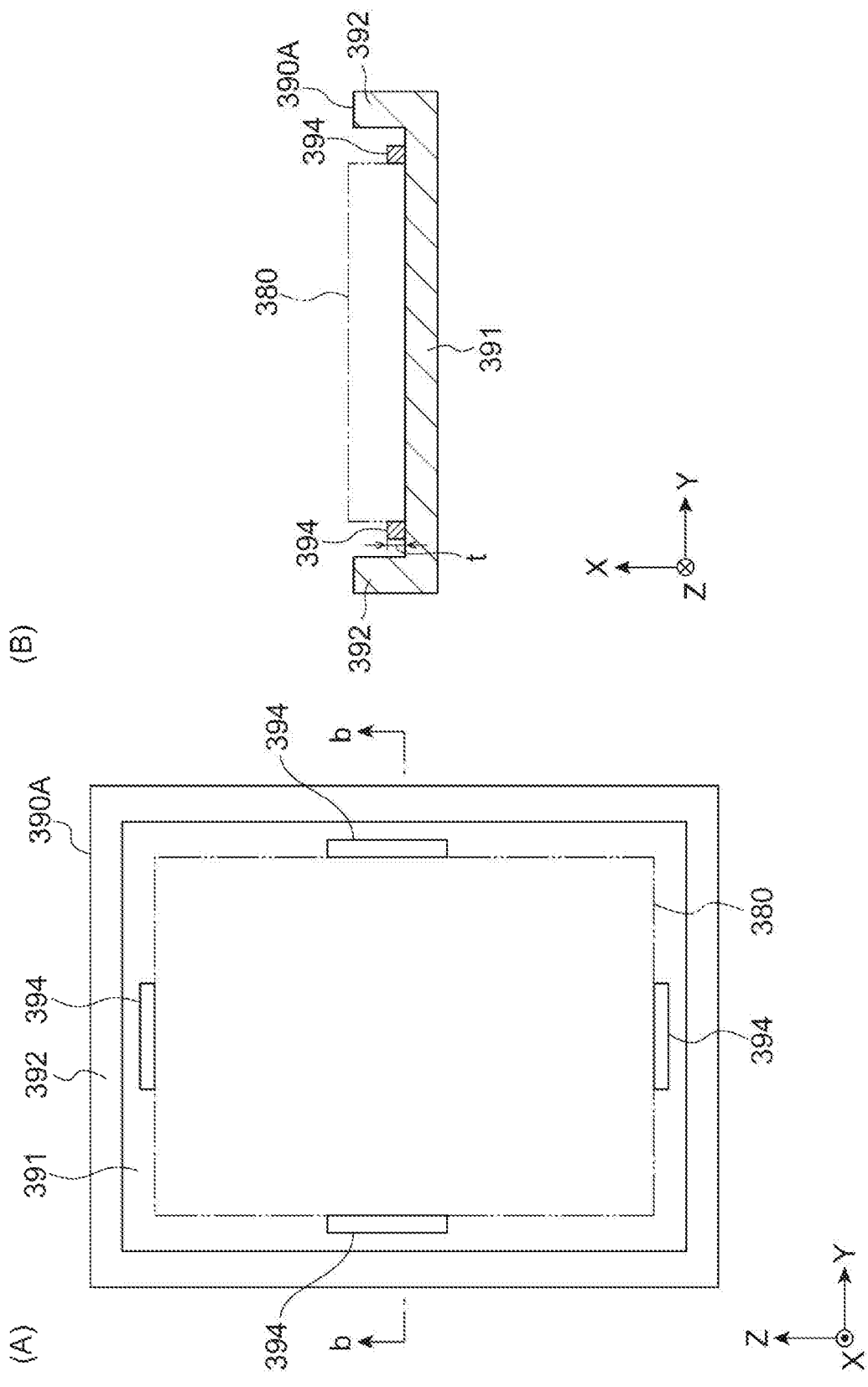
FIG. 31(A) is a diagram illustrating a modification example of a positioning portion.
FIG. 31(B) is a sectional view taken along line b-b of FIG. 31(A).

For example, the configuration of the positioning portion positioning the valve body 380, is not limited to the groove portion 393 described above. For example, as with a cover member 390A according to the modification example, illustrated in FIG. 31, four plate-like wall portions 394 erected to the inner surface of the bottom wall portion 391 may be provided as the positioning portion to be in contact with four sides of the valve body 380, instead of the groove portion 393. In this case, a thickness t of the wall portion 394 in the connection direction D2 (the X direction), is less than the thickness of the valve body 380 in a state where the valve body 380 is compressed by being interposed between the base member 370 and the cover member 390A. Accordingly, as with the embodiment described above, it is possible to realize a configuration in which the portion of the valve body 380 on the base member 370 side does not interfere with the wall portion 394. Furthermore, a plurality of wall portions 394 may be provided with respect to one side of the valve body 380. In addition, for example, a cylindrical pin member may be provided as the positioning portion, instead of the wall portion 394.

In addition, the shape of each unit of the power storage module 12C described above, may be suitably changed. For example, the shape of the cover member is not limited to the shape of a box. The cover member, for example, may be formed into the shape of a rectangular plate not including a portion corresponding to the lateral wall portion 392. In this case, the portion corresponding to the lateral wall portion 392, may be provided on the base member side. As with the embodiment described above, it is also possible to fix the base member and the cover member to each other.

Fifth Embodiment

Next, the power storage device 10D including the power storage module 12D of the fifth embodiment, will be described. The power storage device 10D is the same as the power storage device 10, except that the power storage module 12D is provided instead of the power storage module 12.

Figure 32:
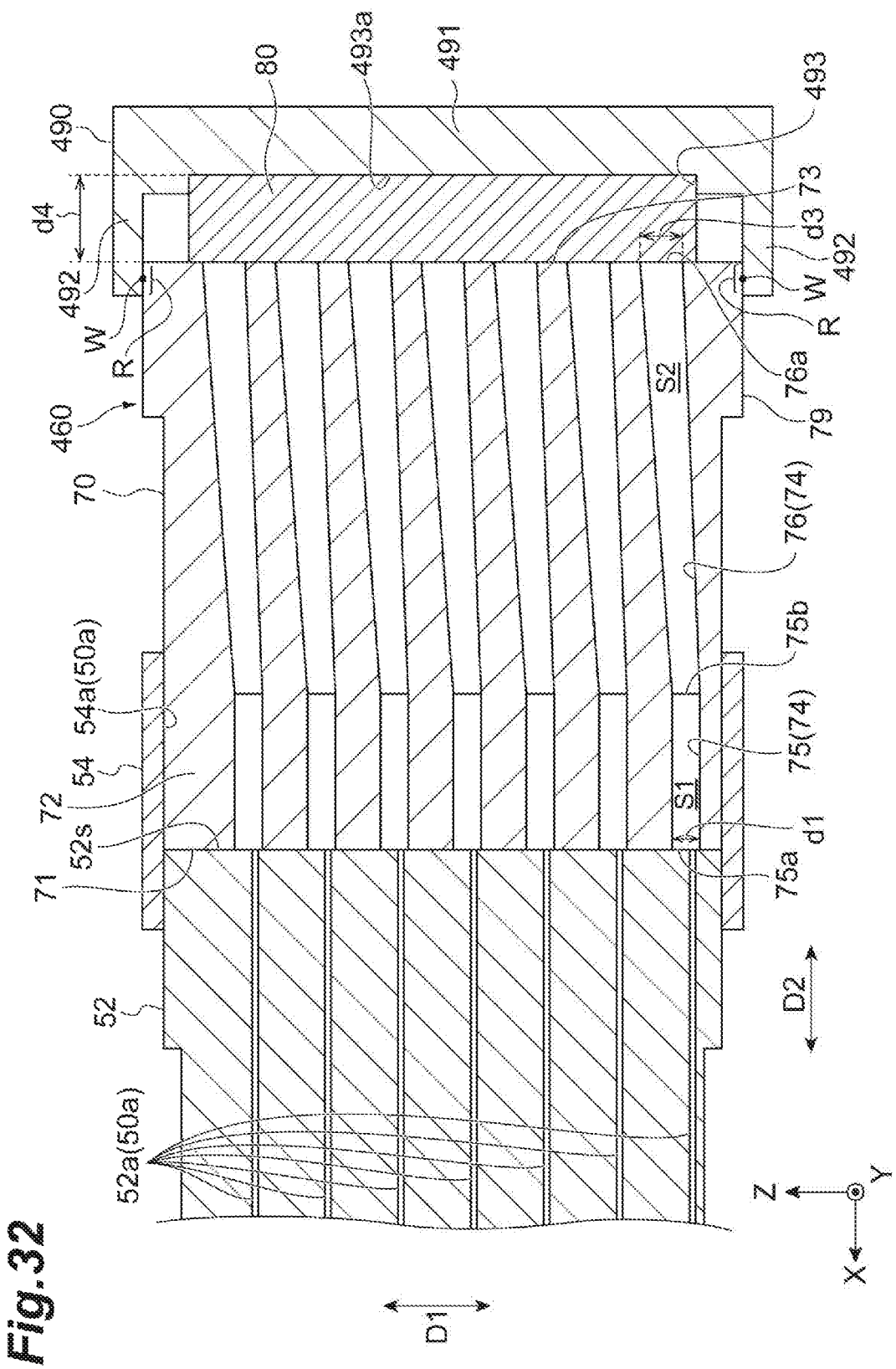
FIG. 32 is a schematic sectional view illustrating the configuration of the pressure adjustment valve of the power storage module of the fifth embodiment.

As illustrated in FIG. 32 and FIG. 33, the power storage module 12D is the same as the power storage module 12, except that a pressure adjustment valve 460 is provided instead of the pressure adjustment valve 60. In addition, the pressure adjustment valve 460 is the same as the pressure adjustment valve 60, except that a cover member 490 is provided instead of the cover member 90.

The cover member 490 is a box-like member including a rectangle plate-like bottom wall portion 491, and a lateral wall portion 492 erected to an edge portion of the bottom wall portion 491. The cover member 490, for example, is formed of polypropylene (PP), polyphenylene sulfide (PPS), modified polyphenylene ether (modified PPE), or the like. A concavely indented groove portion 493 for positioning the valve body 80, is provided inside the bottom wall portion 491. The cover member 490 contains the valve body 80 in the groove portion 493, and functions as the pressing member for pressing the valve body 80 against the lateral surface 73 of the base member 70.

As illustrated in FIG. 32, the base member 70 and the cover member 490 are fixed to each other in a region R in which the base member 70 and the cover member 490 overlap with each other (for example, only the region R) when seen from a direction orthogonal to the pressing direction (the connection direction D2 and the X direction) of the cover member 490 (for example, the Z direction). The lateral wall portion 492 of the cover member 490 is arranged to surround the periphery of the lateral surface 73 of the base member 70 when seen from the connection direction D2. The lateral wall portion 492 is arranged to cover the end portion (the region R) of the lateral surface 79 of the base member 70 on the lateral surface 73 side. In this embodiment, the region R is a contact surface on which the lateral surface 79 of the base member 70 and the lateral wall portion 492 of the cover member 490 are in contact with each other. The base member 70 and the cover member 490 are configured such that the cover member 490 can be relatively moved with respect to the base member 70 in the pressing direction (for example, can be relatively moved such that the base member 70 and the cover member 490 are close to each other) before the base member 70 and the cover member 490 are fixed to each other. For example, the base member 70 and the cover member 490 do not include a contact surface (the YZ plane) intersecting with (for example, orthogonal to) the pressing direction of the cover member 490. In this embodiment, a method of fixing the base member 70 and the cover member 490 to each other, is not particularly limited, and for example, laser welding, hot plate welding, fastening using a fastening member such as a bolt, or the like, can be used. In a case of using the laser welding, it is possible to increase a joining strength between the base member 70 and the cover member 490.

In this embodiment, the base member 70 and the cover member 490 are fixed to each other by a welding portion W provided in the region R. The welding portion W is continuously or discretely provided to surround the base member 70 once or a plurality of times when seen from the connection direction D2. In a case where the welding portion W is continuously provided on the entire circumference of the base member 70, it is possible to increase the joining strength between the base member 70 and the cover member 490. In a case where the welding portion W is discretely provided on the entire circumference of the base member 70, it is possible to form the welding portion W for a short period of time. For example, in a case where the base member 70 is in the shape of a rectangle when seen from the connection direction D2, the welding portion W may be provided in each corner portion of the rectangle. In addition, in a case where the dimension of the welding portion W in the connection direction D2 increases, it is possible to further increase the joining strength between the base member 70 and the cover member 490. In a case where the welding portion W is formed by the laser welding, the dimension of the welding portion W in the connection direction D2, can be controlled by the size of a spot diameter of a laser.

In a case where the welding portion W is formed by the laser welding, the cover member 490 has a first transmissivity with respect to the wavelength of the laser, and the base member 70 has a second transmissivity less than the first transmissivity, with respect to the wavelength. Accordingly, in a case where the region R is irradiated with the laser from the direction orthogonal to the pressing direction of the cover member 490 (for example, the Z direction), the laser is transmitted through the cover member 490, and reaches the base member 70. As a result thereof, the welding portion W is formed in the region R. The cover member 490 is formed of a laser transmissive resin, and the base member 70 is formed of a laser absorbing resin, and thus, it is possible to obtain the first transmissivity and the second transmissivity described above. In a case where the cover member 490 and the base member 70 are formed of the same resin, a pigment absorbing the laser is added to the cover member 490, and the pigment is not added to the base member 70, and thus, it is possible to obtain the first transmissivity and the second transmissivity described above.

As described above, the power storage module 12D of this embodiment includes the laminated body 30 in which the bipolar electrodes 32 including the electrode plate 34, the positive electrode 36 provided on one surface of the electrode plate 34, and the negative electrode 38 provided on the other surface of the electrode plate 34, are laminated, the frame body 50 retaining the edge portion 34a of the electrode plate 34, in which the openings 50a communicated with the plurality of internal spaces V between the adjacent bipolar electrodes 32 in the laminated body 30, are provided, the pressure adjustment valve 460 to be connected to the opening 50a. The pressure adjustment valve 460 includes the base member 70 to be connected to the opening 50a, in which the plurality of communication holes 74 respectively communicated with the plurality of internal spaces V through the opening 50a, are provided, the valve body 80 arranged to shut the opening ends 76a of the plurality of communication holes 74, positioned on a side opposite to the opening ends 75a on the opening 50a side, and the cover member 490 pressing the valve body 80 against the base member 70. The base member 70 and the cover member 490 are fixed to each other in the region where the base member 70 and the cover member 490 overlap with each other when seen from the direction orthogonal to the pressing direction of the cover member 490.

In the power storage module 12D, the base member 70 and the cover member 490 are fixed to each other in the region R. For this reason, it is possible to perform the fixing between the base member 70 and the cover member 490, after the cover member 490 is relatively moved to a desired position in the pressing direction, with respect to the base member 70. In a case where the cover member 490 is relatively moved in the pressing direction, it is possible to adjust the compression rate of the valve body 80 in the pressing direction. The valve opening pressure is determined in accordance with the compression rate, and thus, according to the power storage module 12D, it is possible to adjust a valve opening pressure of the pressure adjustment valve 460 to a desired value.

[Method for Manufacturing Power Storage Device]

Figure 34:
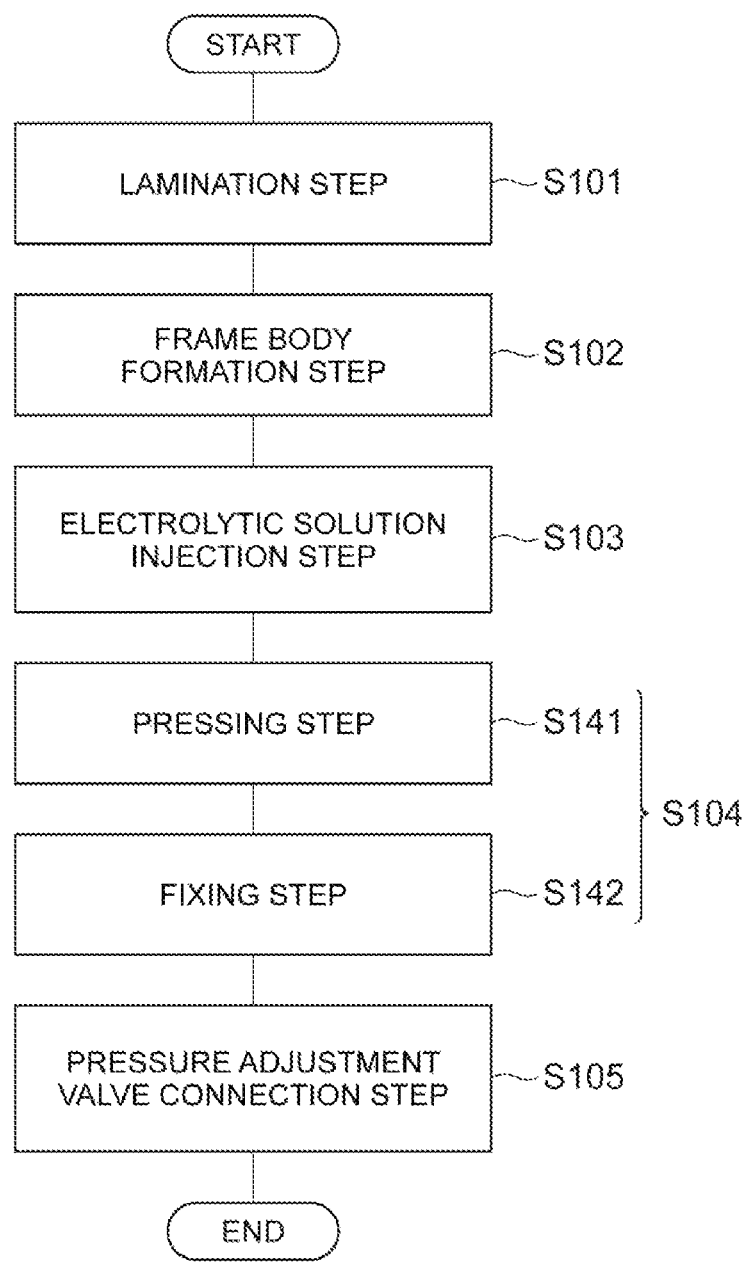
FIG. 34 is a flowchart illustrating an example of a method for manufacturing a power storage module of the fifth embodiment.

Hereinafter, an example of a method for manufacturing the power storage module 12D illustrated in FIG. 2, will be described with reference to FIG. 34.

(Lamination Step)

First, for example, the bipolar electrodes 32 are laminated through the separator 40, and thus, the laminated body 30 is obtained (a lamination step S101). In this embodiment, the first resin portion 52, for example, is formed on the edge portion 34a of the electrode plate 34 of each of the bipolar electrodes 32, by injection molding or the like, before the lamination step S101. According to the lamination step S101, a configuration excluding the second resin portion 54 from the configuration illustrated in FIG. 2, is obtained.

(Frame Body Formation Step)

Next, the second resin portion 54, for example, is formed by injection molding (refer to FIG. 2, a frame body formation step S102). As illustrated in FIG. 9, the resin material 54P of the second resin portion 54, having fluidity, flows in the mold M, and thus, the second resin portion 54 is formed. As a result thereof, as illustrated in FIG. 3 and FIG. 4, the frame body 50 including the first resin portion 52 and the second resin portion 54, is formed. The mold M includes the first portion M1 that forms the outer edge of the main body region 50s1 and the protruding region 50s2 on the lateral surface 50s of the frame body 50 (refer to FIG. 4), and the second portion M2 that is a nest for forming the second opening 54a of the opening 50a. The resin material 54P of the second resin portion 54 flows in the direction intersecting with the lamination direction D1 of the bipolar electrode 32. For example, the resin material 54P of the second resin portion 54 flows between the pair of first portions M1 arranged to face each other, and then, runs into the second portion M2 to be divided into two along the periphery of the second portion M2. Two divided resin materials 54P of the second resin portion 54 flow between the first portion M1 and the second portion M2, and then, are joined together, and thus, flow between the pair of first portions M1.

Furthermore, in this embodiment, the first resin portion 52 that is a part of the frame body 50, is formed before the lamination step S101, and the second resin portion 54 that is a remnant of the frame body 50, is formed after the lamination step S101, but the first resin portion 52 that is a part of the frame body 50, may be formed after the lamination step S101.

(Electrolytic Solution Injection Step)

Next, the electrolytic solution is injected into the frame body 50 from the opening 50a provided in the frame body 50 (an electrolytic solution injection step S103). The injection of the electrolytic solution is performed by using a dedicated jig or the like. Furthermore, the electrolytic solution may be injected from an opening different from the opening 50a to which the pressure adjustment valve 460 is connected.

(Preparation Step)

Next, the pressure adjustment valve 460 is prepared (a preparation step S104). The preparation step S104 may be performed before any one step of the lamination step S101, the frame body formation step S102, and the electrolytic solution injection step S103. For example, the lamination step S101 may be performed after the preparation step S104 is performed. As described below, the pressure adjustment valve 460 is formed by assembling the base member 70, the valve body 80, and the cover member 490 to each other.

Figure 35:
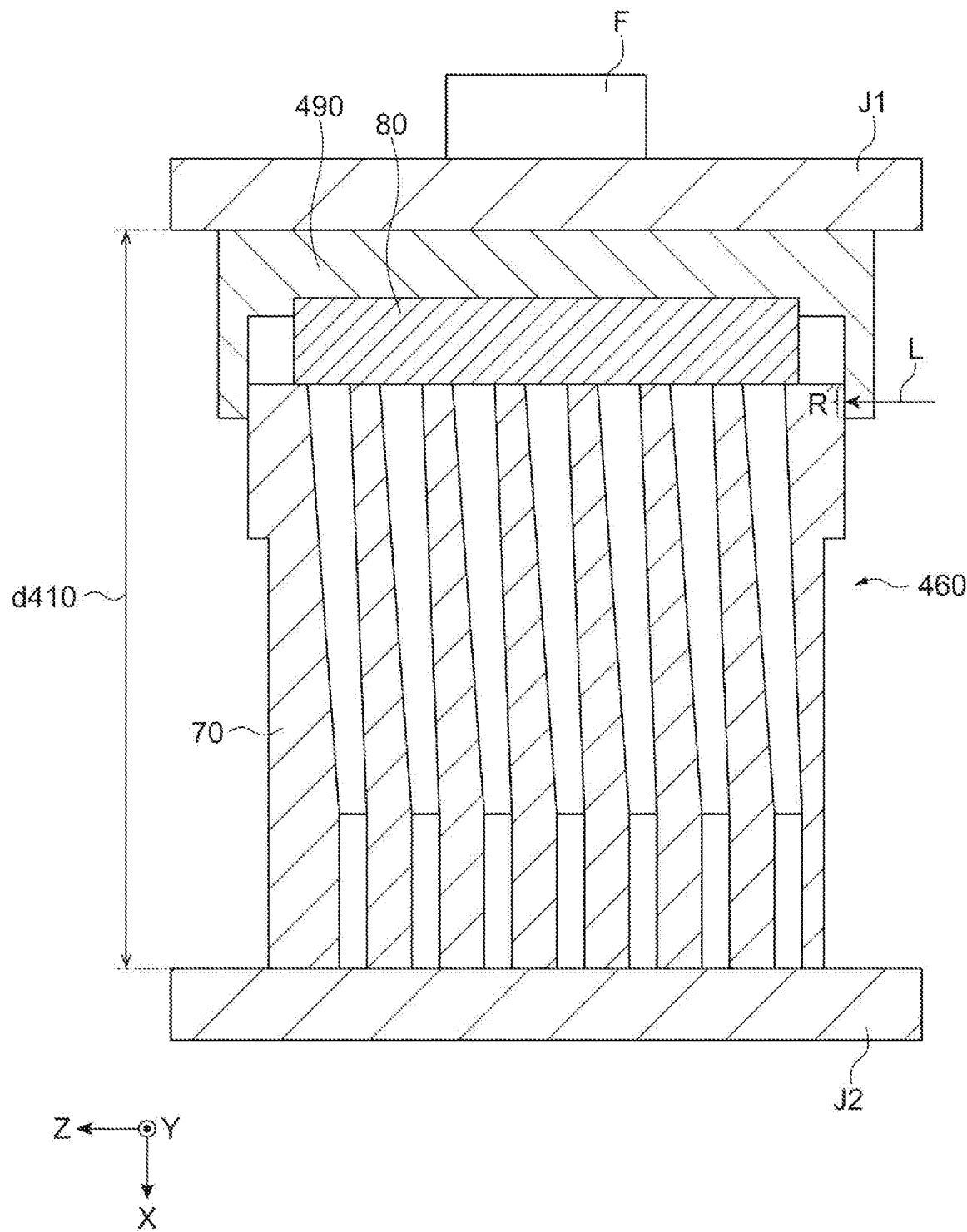
FIG. 35 is a schematic sectional view illustrating a preparation step in the method for manufacturing a power storage module of the fifth embodiment.

First, as illustrated in FIG. 35, the valve body 80 is pressed against the base member 70 by the cover member 490 (a pressing step S141). The base member 70, the valve body 80, and the cover member 490 are interposed between a pair of jigs J1 and J2, and a load is applied to the base member 70, the valve body 80, and the cover member 490 by using a pressing machine F. The pressing machine F, for example, presses the jig J1 arranged on the cover member 490 side.

Next, the cover member 490 and the base member 70 are fixed to each other (a fixing step S142), in the region R where the cover member 490 and the base member 70 overlap with each other when seen from the direction orthogonal to the pressing direction of the cover member 490 (the Z direction). In the fixing step S142, the cover member 490 is relatively moved to a desired position in the pressing direction, with respect to the base member 70, and then, the cover member 490 and the base member 70 are fixed to each other. In this embodiment, in the fixing step S142, the region R is irradiated with a laser L, and thus, the cover member 490 and the base member 70 are welded to each other, and the welding portion W (refer to FIG. 32) is formed. The laser L is transmitted through the cover member 490, and reaches the base member 70. Accordingly, in the region R, it is possible to rigidly fix the cover member 490 and the base member 70 to each other by the laser welding.

In the fixing step S142, the cover member 490 and the base member 70 are fixed to each other, in a state where the valve body 80 is pressed such that a value based on a load for pressing the valve body 80 by the cover member 490, is a value set in advance (a value set on the basis of a mutual relationship between the value based on the load and the valve opening pressure). In this case, the value based on the load, is changed in accordance with the compression rate of the valve body 80 in the pressing direction, and does not depend on a dimension tolerance of the cover member 490, the valve body 80, the base member 70, and the like. For example, the compression rate of the valve body 80 increases as the value based on the load increases. Accordingly, it is possible to adjust the valve opening pressure of the pressure adjustment valve 460 to a desired value, regardless of the dimension tolerance of the cover member 490, the valve body 80, the base member 70, and the like. The value based on the load, may be the value of the load itself, or may be a value calculated from the load (for example, the pressure value or the like).

Alternatively, in the fixing step S142, the cover member 490 and the base member 70 may be fixed to each other, in a state where the valve body 80 is pressed such that a dimension d410 of the pressure adjustment valve 460 in the pressing direction of the cover member 490, is a value set in advance (a value set on the basis of a mutual relationship between the dimension of the pressure adjustment valve and the valve opening pressure). The dimension d410 of the pressure adjustment valve 460 can be obtained by measuring a distance between the jigs J1 and J2. In this case, the dimension of the pressure adjustment valve 460, measured before being pressed (the total value of each of the dimensions of the cover member 490, and the valve body 80 and the base member 70 at the time of being uncompressed) is used as a reference value, and a difference between the reference value and the dimension d410 of the pressure adjustment valve 460 after being pressed, is a compression amount of the valve body 80 in the pressing direction. Accordingly, it is possible to calculate the compression rate of the valve body 80 in the pressing direction. Accordingly, the influence of the dimension tolerance of the cover member 490, the valve body 80, the base member 70, and the like, cancels out, and thus, it is possible to adjust the valve opening pressure of the pressure adjustment valve 460 to a desired value.

As described above, the pressure adjustment valve 460 having a configuration in which the base member 70, the valve body 80, and the cover member 490 are integrated (unitized), is obtained.

(Pressure Adjustment Valve Connection Step)

Next, the pressure adjustment valve 460 is connected to the opening 50a of the frame body 50 (a pressure adjustment valve connection step S105). Specifically, as described above, the portion 72 of the base member 70 is inserted into the second opening 54a. Then, a part or all of the contact portion between the lateral surface 71 and the lateral surface 52s of the first resin portion 52, for example, is welded by hot plate welding or the like. Accordingly, a state in which the pressure adjustment valve 460 is assembled to the opening 50a, is obtained. After that, as illustrated in FIG. 1, the plurality of power storage modules 12D are laminated through the conductive plate 14. The positive electrode terminal 24 and the negative electrode terminal 26 are respectively connected in advance to the conductive plates 14 positioned on both ends in the lamination direction D1. After that, the pair of binding plates 16A and 16B are respectively arranged on both ends in the lamination direction D1, through the insulating film 22. After that, the axis portion of the bolt 18 is inserted into the insertion hole 16A1 of the binding plate 16A, and is inserted into the insertion hole 16B1 of the binding plate 16B. After that, the nut 20 is screwed to the tip end of the bolt 18 protruding from the binding plate 16B. Thus, the power storage device 10D illustrated in FIG. 1, is manufactured.

As described above, the method for manufacturing a power storage module of this embodiment, includes the lamination step S101, the frame body formation step S102, the preparation step S104, and the pressure adjustment valve connection step S105. The preparation step S104 includes the pressing step S141 and the fixing step S142. In the method for manufacturing a power storage device, it is possible to fix the base member 70 and the cover member 490 to each other, after the cover member 490 is relatively moved to a desired position in the pressing direction, with respect to the base member 70. In a case where the cover member 490 is relatively moved in the pressing direction, it is possible to adjust the compression rate of the valve body 80 in the pressing direction. The valve opening pressure is determined by the compression rate, and thus, according to the method for manufacturing a power storage device described above, it is possible to adjust the valve opening pressure of the pressure adjustment valve 460 to a desired value.

Modification Example of Fifth Embodiment

Figure 36:
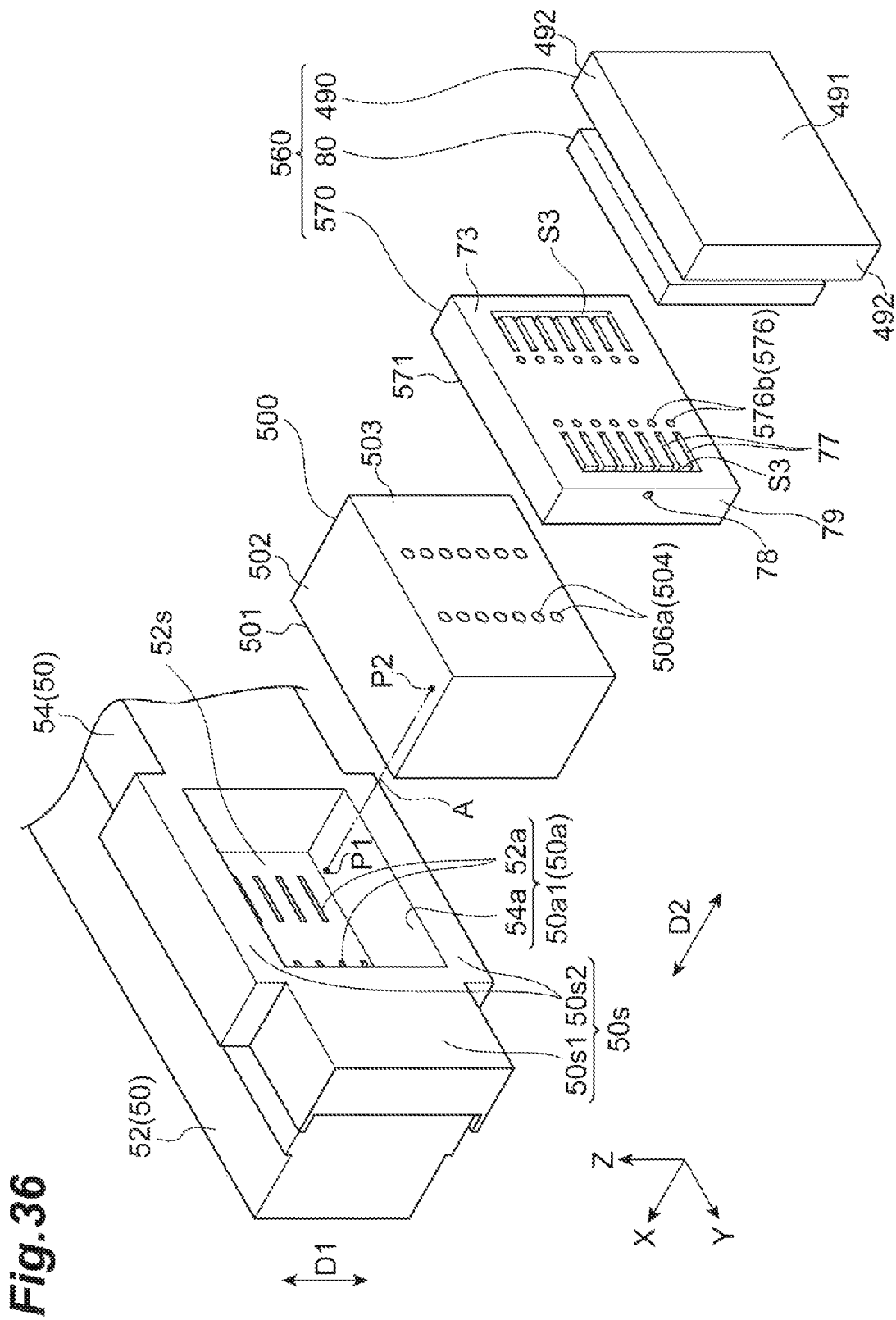
FIG. 36 is an exploded perspective view of the pressure adjustment valve to be connected to the opening of the frame body through a connection member.

Nest, another embodiment (a modification example of the fifth embodiment) will be described. In this embodiment, a connection member 500 and a pressure adjustment valve 560 are used instead of the pressure adjustment valve 460 described above. The others are the same as those of the fifth embodiment described above. FIG. 36 is an exploded perspective view of the pressure adjustment valve 560 to be connected to the opening 50a of the frame body 50 through the connection member 500. In addition, FIG. 37 is a schematic sectional view illustrating the configuration of the connection member 500 and the pressure adjustment valve 560 of FIG. 36.

The pressure adjustment valve 560 is the same as the pressure adjustment valve 460, except that a base member 570 is provided instead of the base member 70. A structure in which the connection member 500 and the base member 570 are combined, is the same as that of the base member 70 described above.

The connection member 500 is a member corresponding to the portion 72 of the base member 70 of the embodiment described above. The connection member 500 is a portion 502 including a lateral surface 501 facing the opening 50a, and a lateral surface 503 facing the base member 570. FIG. 38(A) is a plan view illustrating the lateral surface 501, and FIG. 38(B) is a plan view illustrating the lateral surface 503 facing the base member 570 of the connection member 500.

Figure 37:
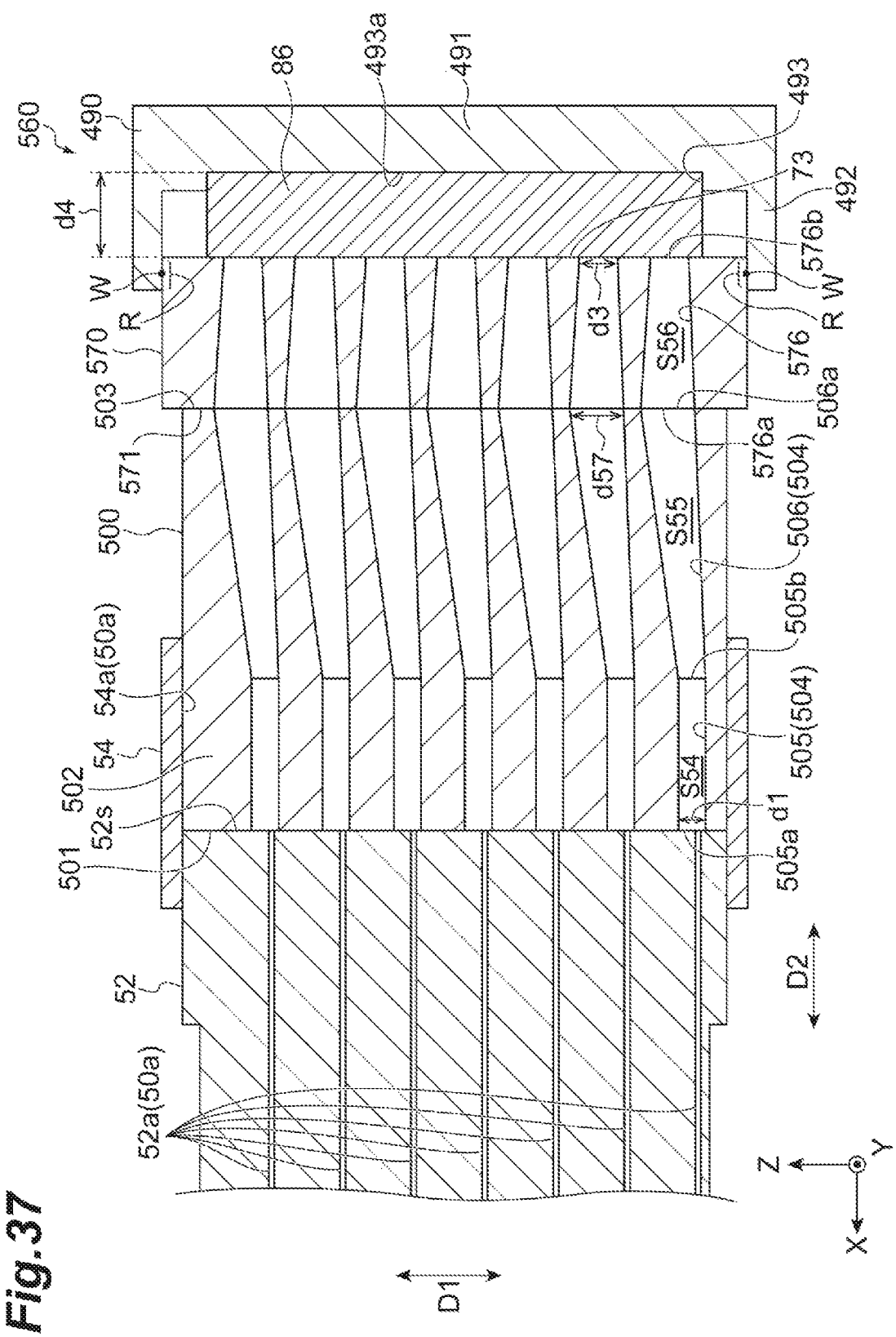
FIG. 37 is a schematic sectional view illustrating the configuration of the connection member and the pressure adjustment valve of FIG. 36.

As illustrated in FIG. 37 and FIG. 38, a plurality of (here, 14) communication holes 504 penetrating through the lateral surface 503 from the lateral surface 501, are provided in the connection member 500. Each of the communication holes 504 is communicated with one internal space V, through one corresponding first opening 52a. The communication hole 504 includes a first communication portion 505 that is a portion of the communication hole 504 on the lateral surface 501 side, and a second communication portion 506 that is a portion of the communication hole 504 on the lateral surface 503 side.

A sectional surface of the first communication portion 505 is formed into the shape of a rectangle. An approximately rectangular parallelepiped space S54 is formed by the first communication portion 505. An opening end 505a of the first communication portion 505 on the opening 50a side, has the same shape and the same dimension as those of the opening end 75a of the base member 70. An opening end 505b on a side connected to the second communication portion 506 of the first communication portion 505, has the same shape and the same dimension as those of the opening end 75b of the base member 70.

A sectional surface of the second communication portion 506 is formed into the shape of a circle. The second communication portion 506 penetrates through an opening end 506a of the second communication portion 506 on the lateral surface 503 side, from the opening end 505b of the first communication portion 505. The opening end 506a is formed into the shape of a circle. An inner diameter d57 of the opening end 506a is greater than an inner diameter of the opening end 505b (that is, the width d1 of the opening end 505a in the lamination direction D1) (d57>d1). That is, a space S55 in a tapered shape in which an inner diameter increases from the opening end 505b to the opening end 506a, is formed by the second communication portion 506. Such a second communication portion 506, for example, can be formed by injection molding or the like.

In addition, in this embodiment, as illustrated in FIG. 37, the second communication portions 506 to be connected to seven first openings 52a in the first column, extend such that the center position of the opening end 506a is positioned on an upper side from the center position of the opening end 505b. On the other hand, the second communication portions 506 to be connected to seven first openings 52a in the second column, extend such that the center position of the opening end 506a is positioned on a lower side from the center position of the opening end 505b. As a result thereof, as illustrated in FIG. 38(B), a plurality of opening ends 506a approach the central position of the lateral surface 503.

The base member 570 has an approximately rectangular parallelepiped outer shape, and is joined to the lateral surface 503 of the connection member 500 on a lateral surface 571 on one side. The lateral surface 571 and the lateral surface 503, for example, can be welded to each other by hot plate welding. Furthermore, in this embodiment, the base member 570 is formed to be slightly larger than the connection member 500 when seen from the connection direction D2, but the base member 570 may be formed to have the same size as that of the connection member 500, or may be formed to be smaller than the connection member 500.

FIG. 39(A) is a plan view illustrating the lateral surface 571, and FIG. 39(B) is a plan view illustrating the lateral surface 73 of the base member 570 facing the valve body 80. As illustrated in FIG. 38 and FIG. 39, a plurality of (here, 14) communication holes 576 penetrating through the lateral surface 73 from the lateral surface 571, are provided in the base member 570. A sectional surface of the communication hole 576 is formed into the shape of a circle. Each of the communication holes 576 is communicated with one internal space V, through one corresponding communication hole 504. An inner diameter of an opening end 576a (the first opening end) of the communication hole 576 on the connection member 500 side, is coincident with the inner diameter d57 of the opening end 506a of the communication hole 504. The connection member 500 and the base member 570 are joined to each other such that the opening end 506a and the opening end 576a corresponding to each other, overlap with each other when seen from the connection direction D2. The inner diameter d3 of the opening end 576b (the second opening end) of the communication hole 576 on the valve body 80 side is less than the inner diameter of the opening end 576a (that is, the inner diameter d57 of the opening end 506a) (d3<d57). That is, a space S56 in a tapered shape in which an inner diameter decreases from the opening end 576a to the opening end 576b, is formed by the communication hole 576. Such a communication hole 576, for example, can be formed by injection molding or the like. Furthermore, the inner diameter of the opening end 576a and the inner diameter d57 of the opening end 506a may not be coincident with each other. For example, in a case where the inner diameter of the opening end 576a is less than the inner diameter d57, it is possible to obtain the effect of allowing a positional shift at the time of joining.

As illustrated in FIG. 38(B) and FIG. 39(A), all of a plurality of opening ends 506a and a plurality of opening ends 576a are arranged point-symmetrically with respect to the axis A. According to such a configuration, in both of two states (postures) of the connection member 500 (or the base member 570) in an inversion relationship with respect to the axis A, the arrangement of the plurality of opening ends 576a with respect to the plurality of opening ends 506a is the same. For this reason, in both of two states described above, it is possible to normally join the base member 570 to the connection member 500. That is, even in a case where the base member 570 is inverted up and down (is rotated around the axis A by 180 degrees) with respect to the connection member 500, it is possible to normally join the base member 570 to the connection member 500. As a result thereof, it is possible to easily perform the joining of the base member 570 with respect to the connection member 500. In addition, it is possible to prevent the occurrence of misassembly such as joining the base member 570 to the connection member 500 in an incorrect direction.

Even in a case of using the connection member 500 and the base member 570, it is possible to manufacture the power storage device, as with a case of using the base member 70. The lamination step S101 and the frame body formation step S102 are the same as those of a case of using the base member 70. For example, the connection member 500 is connected to the opening 50a by hot plate welding or the like, after the frame body formation step S102 and before the electrolytic solution injection step S103. Accordingly, in the electrolytic solution injection step S103, it is possible to inject the electrolytic solution into the frame body 50 from the communication hole 504 of the connection member 500, in a state where the connection member 500 is connected to the opening 50a.

Figure 40:
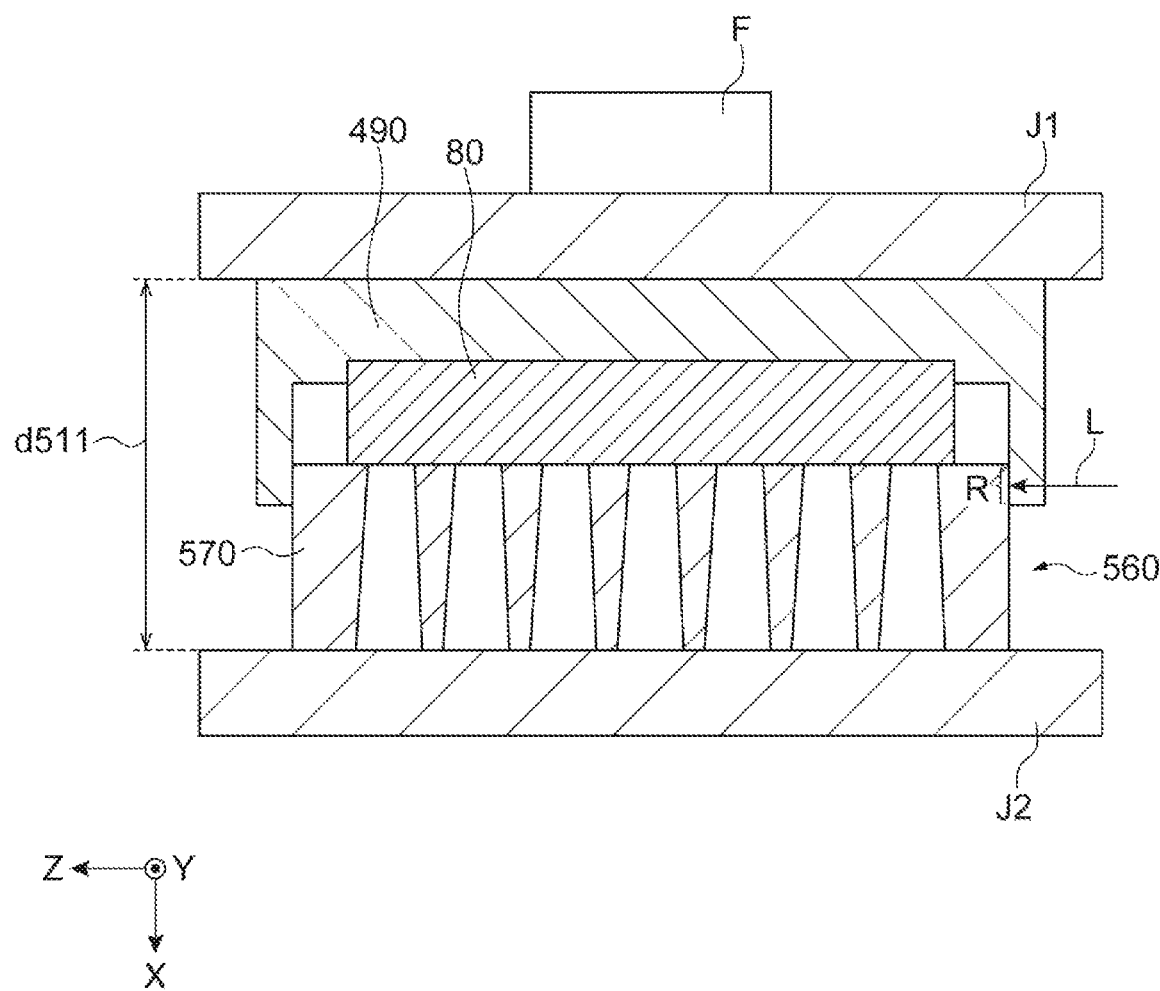
FIG. 40 is a schematic sectional view illustrating a preparation step of the pressure adjustment valve of FIG. 36.

In the preparation step S104, the pressure adjustment valve 560 having a configuration in which the base member 570, the valve body 80, and the cover member 490 are integrated (unitized), is prepared. In the pressing step S141, as illustrated in FIG. 40, the valve body 80 is pressed against the base member 570 by the cover member 490. The base member 570, the valve body 80, and the cover member 490 are interposed between the pair of jigs J1 and J2, and a load is applied to the base member 570, the valve body 80, and the cover member 490 by using the pressing machine F.

Next, the cover member 490 and the base member 570 are fixed to each other, in the region R where the cover member 490 and the base member 570 overlap with each other when seen from the direction orthogonal to the pressing direction of the cover member 490 (the Z direction) (fixing step S142). In this embodiment, in the fixing step S142, the region R is irradiated with the laser L, and thus, the cover member 490 and the base member 570 are welded to each other, and the welding portion W (refer to FIG. 37) is formed. The laser L is transmitted through the cover member 490, and reaches the base member 570. Accordingly, in the region R, it is possible to rigidly fix the cover member 490 and the base member 570 to each other by the laser welding.

In the fixing step S142, the cover member 490 and the base member 570 are fixed to each other, in a state where the valve body 80 is pressed such that a value based on a load for pressing the valve body 80 by the cover member 490, is a value set in advance. In this case, it is possible to adjust a valve opening pressure of the pressure adjustment valve 560 to a desired value, regardless of a dimension tolerance of the cover member 490, the valve body 80, the base member 570, and the like.

Alternatively, in the fixing step S142, the cover member 490 and the base member 570 may be fixed to each other, in a state where the valve body 80 is pressed such that a dimension d511 of the pressure adjustment valve 560 in the pressing direction of the cover member 490, is a value set in advance. The dimension d511 of the pressure adjustment valve 560 can be obtained by measuring the distance between the jigs J1 and J2. In this case, the influence of the dimension tolerance of the cover member 490, the valve body 80, the base member 570, and the like, cancels out, and thus, it is possible to adjust the valve opening pressure of the pressure adjustment valve 560 to a desired value.

In the fixing step S142, in a state where the valve body 80 is pressed against the base member 570 by the cover member 490, the cover member 490 and the base member 570 are fixed to each other in the region R where the cover member 490 and the base member 570 overlap with each other when seen from the direction orthogonal to the pressing direction of the cover member 490 (the Z direction). In the fixing step S142, the region R is irradiated with the laser L, and thus, the cover member 490 and the base member 570 are welded to each other, and the welding portion W (refer to FIG. 37) is formed. The laser L is transmitted through the cover member 490, and reaches the base member 570. Accordingly, in the region R, it is possible to rigidly fix the cover member 490 and the base member 570 to each other by the laser welding.

In the pressure adjustment valve connection step S105, the pressure adjustment valve 560 is connected to the opening 50a of the frame body 50 through the connection member 500. For example, the pressure adjustment valve 560 is connected to the connection member 500 by hot plate welding or the like.

As described above, the fifth embodiment has been described in detail, but the configuration of the power storage module is not limited to the embodiment described above.

Figure 41:
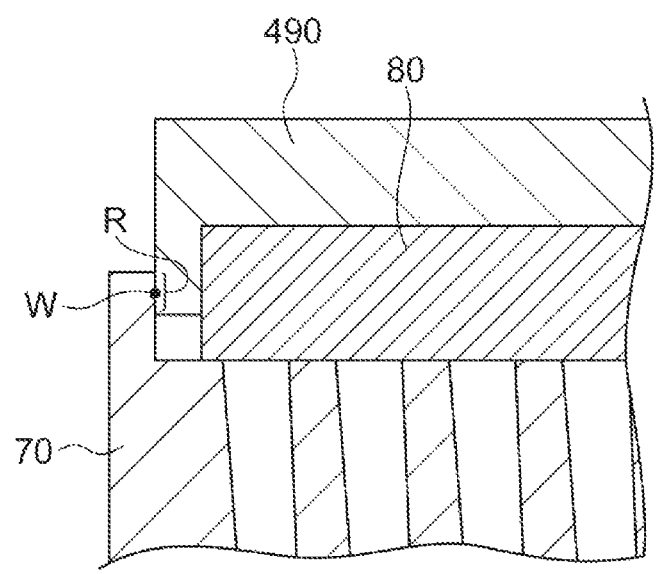
FIG. 41 is a schematic sectional view illustrating a part of the pressure adjustment valve according to the modification example.

For example, as illustrated in FIG. 41, the base member 70 may be positioned outside, and the cover member 490 may be positioned inside, in the region R where the base member 70 and the cover member 490 overlap with each other when seen from the direction orthogonal to the pressing direction (the X direction) of the cover member 490 (for example, the Z direction). In a case where the welding portion W is formed by the laser welding, the base member 70 has the first transmissivity with respect to the wavelength of the laser, and the cover member 490 has the second transmissivity less than the first transmissivity, with respect to the wavelength. Accordingly, in a case where the region R is irradiated with the laser from the direction orthogonal to the pressing direction of the cover member 490 (for example, the Z direction), the laser is transmitted through the base member 70, and reaches the cover member 490. As a result thereof, the welding portion W is formed in the region R. Similarly, in a case of using the base member 570, the base member 570 may be positioned outside, and the cover member 490 may be positioned inside.

REFERENCE SIGNS LIST 12, 12A, 12B, 12C, 12D: power storage module, 30: laminated body, 30a: lateral surface, 32: bipolar electrode, 34: electrode plate, 34a: edge portion, 34c: first surface, 34d: second surface, 36: positive electrode, 38: negative electrode, 40: separator, 40d: outer circumferential end, 50: frame body, 50a, 50a1, 50a2, 50a3, 50a4: opening, 50s: lateral surface, 52: first resin portion, 52a: first opening, 54: second resin portion, 54a: second opening, 60, 160, 280, 360, 460, 560: pressure adjustment valve, 70, 370, 570: base member, 71, 171: lateral surface (first lateral surface), 72, 172: portion, 74, 374, 576: communication hole, 75a, 375a, 576a: opening end (first opening end), 76a, 376a, 576b: opening end (second opening end), 77, 184, 377: groove portion, 78, 185, 378: exhaust port, 80, 190, 380: valve body (elastic member), 90, 390, 390A, 490, 1100: cover member (pressing member), 170: first base member, 173: lateral surface, 174: first communication hole, 175a: opening end, 176: second communication portion (portion on second base member side), 176a: opening end, 180: second base member, 182: lateral surface (second lateral surface), 183: second communication hole, 183a, 183b: opening end, 250: resin portion, 252: first seal portion, 252a: outer circumferential surface, 252c: inner circumferential end, 252d: outer circumferential end, 254: second seal portion, 254b: opening, 260, 260A: frame body, 260a: first end surface, 260b: second end surface, 261: inner circumferential portion, 262: outer circumferential portion, 268: step portion, 270, 270A: groove portion, 270a: bottom portion, 271: protrusion, 381: lateral surface, 393: groove portion (positioning portion), 394: wall portion (positioning portion), A: axis, D1: lamination direction, D2: connection direction, P1, P2: center, S3, S14, S33: circulation space, R: region, V: internal space.

The invention claimed is:

1. A power storage module, comprising:
a laminated body in which a plurality of bipolar electrodes are laminated, wherein each of the plurality of bipolar electrodes includes an electrode plate having a first surface and a second surface on a side opposite to the first surface, a positive electrode provided on the first surface, and a negative electrode provided on the second surface;
a frame body retaining an edge portion of the electrode plate and provided with an opening communicated with a plurality of internal spaces between the adjacent bipolar electrodes in the laminated body;
a pressure adjustment valve to be connected to the opening;
wherein the pressure adjustment valve includes,
a base member to be connected to the opening and provided with a plurality of communication holes respectively communicated with the plurality of internal spaces through the opening, wherein the plurality of communication holes have first opening ends on the opening side and second opening ends positioned on a side opposite to the first opening ends,
an elastic member arranged to shut the second opening ends of the plurality of communication holes, and
a pressing member pressing the elastic member against the base member; and
a plurality of the pressure adjustment valves,
wherein a plurality of the openings are provided in the frame body,
the pressure adjustment valves are respectively connected to the plurality of the openings, and
the plurality of openings are respectively communicated with sets of the internal spaces, wherein the sets are different for each of the openings.

2. The power storage module according to claim 1,
wherein a width of the first opening end in a lamination direction of the bipolar electrodes, is greater than or equal to a multiplication value of a width of one of the internal spaces and one of the electrode plates in the lamination direction, and the number of openings.

3. The power storage module according to claim 1,
wherein a plurality of groove portions are provided on a lateral surface of the base member facing the elastic member,
the plurality of groove portions respectively correspond to a plurality of the second opening ends, and
the second opening end of the communication hole and the groove portion corresponding to the second opening end are arranged to be communicated with each other by separating a part of the elastic member from the second lateral surface, in accordance with an increase in a pressure of the internal space communicated with the communication hole.

4. The power storage module according to claim 3,
wherein a distance between the second opening end and the groove portion corresponding to the second opening end, is shorter than a distance between the said second opening end and the other second opening end adjacent to the second opening end.

5. The power storage module according to claim 3,
wherein a circulation space connected to the plurality of groove portions is partitioned in the pressure adjustment valve,
the circulation space is configured to circulate gas discharged from the internal space, and
an exhaust port communicating the circulation space with the outside of the base member, is provided in the pressure adjustment valve.

6. The power storage module according to claim 1,
the pressing member is configured to press the elastic member against the base member, from a side opposite to a side of the elastic member facing the base member, and
the pressing member includes a positioning portion positioning the elastic member with respect to the pressing member.

7. The power storage module according to claim 6,
wherein the positioning portion is a concave groove portion to which the elastic member is fitted.

8. The power storage module according to claim 6,
wherein the lateral surface of the base member and a surface of the pressing member, facing each other through the elastic member, are parallel to each other.

9. The power storage module according to claim 1,
wherein the base member and the pressing member are fixed to each other, in a region in which the base member and the pressing member overlap with each other when seen from a direction orthogonal to a pressing direction of the pressing member.

10. The power storage module according to claim 9,
wherein one of the pressing member and the base member, positioned outside in the region when seen from the direction orthogonal to the pressing direction of the pressing member, has a first transmissivity with respect to a wavelength of a laser for welding the pressing member and the base member to each other, and
one of the pressing member and the base member, positioned inside in the region when seen from the direction orthogonal to the pressing direction of the pressing member, has a second transmissivity less than the first transmissivity, with respect to the wavelength.

11. A power storage module, comprising:
a laminated body in which a plurality of bipolar electrodes are laminated, wherein each of the plurality of bipolar electrodes includes an electrode plate having a first surface and a second surface on a side opposite to the first surface, a positive electrode provided on the first surface, and a negative electrode provided on the second surface;
a frame body retaining an edge portion of the electrode plate and provided with an opening communicated with a plurality of internal spaces between the adjacent bipolar electrodes in the laminated body; and
a pressure adjustment valve to be connected to the opening,
wherein
the pressure adjustment valve includes,
    a base member to be connected to the opening and provided with a plurality of communication holes respectively communicated with the plurality of internal spaces through the opening, wherein the plurality of communication holes have first opening ends on the opening side and second opening ends positioned on a side opposite to the first opening ends,
    an elastic member arranged to shut the second opening ends of the plurality of communication holes, and
    a pressing member pressing the elastic member against the base member; and
the base member includes:
    a first base member to be connected to the opening and provided with a plurality of first communication holes respectively communicated with the plurality of internal spaces through the opening; and
    a second base member to be connected to a lateral surface of the first base member on a side opposite to the opening side and provided with a plurality of second communication holes respectively communicated with the plurality of first communication holes,
    the elastic member is arranged to shut opening ends of the plurality of second communication holes, positioned on a side opposite to opening ends on the first base member side of the plurality of second communication holes, and
    the pressing member is configured to press the elastic member against the second base member.

12. The power storage module according to claim 11,
wherein at least a portion of the first communication hole on the second base member side, is formed in a tapered shape in which a sectional area increases from the opening side to the second base member side, and
the second communication hole is formed in a tapered shape in which a sectional area decreases from the first base member side to the elastic member side.

13. The power storage module according to claim 12,
wherein an opening area of the opening end of the second communication hole on the elastic member side, is greater than an opening area of the opening end of the portion of the first communication hole on the opening side, formed in the tapered shape.

14. The power storage module according to claim 11,
wherein at least a portion of the first communication hole on the second base member side, is formed in a tapered shape in which a sectional area increases from the opening side to the second base member side, and
the second communication hole is formed in a tapered shape in which a sectional area increases from the first base member side to the elastic member side.

15. The power storage module according to claim 11,
wherein a width of the opening end of the first communication hole on the second base member side in the lamination direction of the bipolar electrodes, is greater than a width of the opening end of the first communication hole on the opening side in the lamination direction.

16. A power storage module in which a plurality of bipolar electrodes are laminated through a separator, wherein each of the plurality of bipolar electrodes includes an electrode plate, a positive electrode provided on a first surface of the electrode plate, and a negative electrode provided on a second surface of the electrode plate, the module comprising:
- a tubular seal portion which extends in a lamination direction of the plurality of bipolar electrodes, and contains the plurality of bipolar electrodes,
wherein an internal space is formed between the plurality of bipolar electrodes and the seal portion,
the seal portion includes a tubular first seal portion joined to a circumferential edge portion of the electrode plate, and a tubular second seal portion provided outside the first seal portion in a direction intersecting with the lamination direction, wherein the first seal portion and the second seal portion are formed by resin and the second seal portion is welded to an outer circumferential surface of the first seal portion,
the first seal portion has a structure in which a frame body is laminated in the lamination direction, wherein the frame body is joined to the circumferential edge portion of the electrode plate,
the frame body includes:
- a first end surface and a second end surface which are respectively in contact with two other frame bodies adjacent in the lamination direction; and
- a groove portion which is formed on at least one of the first end surface and the second end surface, extends in the direction intersecting with the lamination direction, and penetrates the inside and the outside of the frame body, wherein an end portion of the groove portion is along the outer circumferential surface of the first seal portion, the second seal portion includes an opening provided in a position corresponding to the groove portion of the frame body,
a pressure adjustment valve is provided in the opening of the second seal portion, wherein the pressure adjustment valve is connected to the internal space through the groove portion, and is configured to adjust a pressure of the internal space,
the groove portion is a communication flow path that is communicated with the internal space,
the groove portion has a width in a direction orthogonal to the lamination direction and a depth in the lamination direction, and
the groove portion is in the shape of a rectangle in which the width is greater than the depth, and an aspect ratio between the width and the depth of the groove portion is greater than or equal to 5, on a vertical sectional surface in the direction intersecting with the lamination direction.

17. The power storage module according to claim 16,
wherein the separator is provided such that an outer circumferential end of the separator is positioned outside an inner circumferential end of the first seal portion,
the frame body has a thickness greater than a thickness of the separator in the lamination direction,
a step portion is formed in the frame body for arranging the outer circumferential end of the separator on at least one of the first end surface and the second end surface, and
a depth of the groove portion in the lamination direction, is greater than a depth of the step portion in the lamination direction.

18. The power storage module according to claim 16,
wherein one or a plurality of protrusions are provided in a bottom portion of the groove portion.

* * * * *